US007313602B2

United States Patent
Ono et al.

(10) Patent No.: US 7,313,602 B2
(45) Date of Patent: Dec. 25, 2007

(54) SERVER, MANAGEMENT SYSTEM, AND MANAGEMENT CONTROL METHOD

(75) Inventors: Yasuhiko Ono, Kanagawa (JP); Rikio Shiba, Kanagawa (JP); Kazuma Sato, Kanagawa (JP); Kotaro Takada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 10/278,871

(22) Filed: Oct. 24, 2002

(65) Prior Publication Data

US 2003/0097310 A1 May 22, 2003

(30) Foreign Application Priority Data

| Oct. 26, 2001 | (JP) | ............................. 2001-330043 |
| Oct. 26, 2001 | (JP) | ............................. 2001-330044 |
| Oct. 21, 2002 | (JP) | ............................. 2002-305928 |
| Oct. 21, 2002 | (JP) | ............................. 2002-305929 |

(51) Int. Cl.
*G06F 15/16* (2006.01)
*G06Q 30/00* (2006.01)

(52) U.S. Cl. ...................... 709/219; 709/217; 709/218; 370/1; 370/14; 370/26

(58) Field of Classification Search ........ 709/217–219; 705/1, 14, 26
See application file for complete search history.

(56) References Cited

U.S. PATENT DOCUMENTS

| 5,979,240 A | * | 11/1999 | Rix et al. ...................... 73/602 |
| 6,416,413 B1 | * | 7/2002 | Yoo ............................. 436/42 |
| 6,718,343 B2 | * | 4/2004 | Kamata ................... 707/104.1 |
| 6,907,432 B1 | * | 6/2005 | Szmanda et al. ........ 707/104.1 |
| 2002/0002480 A1 | * | 1/2002 | Sato et al. ...................... 705/8 |
| 2002/0022990 A1 | * | 2/2002 | Kurata et al. ................. 705/14 |
| 2002/0032577 A1 | * | 3/2002 | Yamamoto et al. ............ 705/1 |
| 2002/0032612 A1 | * | 3/2002 | Williams et al. .............. 705/26 |
| 2002/0052756 A1 | * | 5/2002 | Lomangino ................. 705/1 |
| 2002/0062220 A1 | * | 5/2002 | Wakai et al. .................. 705/1 |
| 2002/0072970 A1 | * | 6/2002 | Miller et al. .................. 705/14 |

(Continued)

FOREIGN PATENT DOCUMENTS

EP 1 031 519 8/2000

(Continued)

OTHER PUBLICATIONS

W. Wysopal, "Economic Incentives Improve Voluntary Efforts", Biocycle, JG Press, Emmaus, PA, US., vol. 30, No. 6, pp. 32-33, Jun. 1989.

(Continued)

*Primary Examiner*—Nathan Flynn
*Assistant Examiner*—Joshua Joo
(74) *Attorney, Agent, or Firm*—Fitzpatrick, Cella, Harper & Scinto

(57) ABSTRACT

A requester accesses a collection center system (4) and requests collection of expendables (S302). The collection center system (4) confirms actually collected expendables (S312) and gives a point to the user as the requester. For lump-sum collection using a predetermined container, a bonus point is also given. The point is also given for purchase. For the next purchase, the requester can receive an incentive in accordance with the point and enjoy a special service such as a discount.

13 Claims, 60 Drawing Sheets

U.S. PATENT DOCUMENTS

2002/0091585 A1* 7/2002 Asauchi et al. ............... 705/26
2002/0107731 A1* 8/2002 Teng ........................... 705/14
2003/0026620 A1* 2/2003 Gallivan ...................... 399/24
2003/0046171 A1* 3/2003 Whale .......................... 705/26
2003/0065560 A1* 4/2003 Brown et al. ................. 705/14

FOREIGN PATENT DOCUMENTS

| | | |
|---|---|---|
| EP | 1 215 611 | 6/2002 |
| JP | 2002-297840 | 10/2002 |
| WO | WO 01/59638 | 8/2001 |
| WO | WO 01/61599 | 8/2001 |

OTHER PUBLICATIONS

U.S. Appl. No. 09/866,666, filed May 30, 2001.
U.S. Appl. No. 10/093,931, filed Mar. 11, 2002.

* cited by examiner

FIG. 4

EXPENDABLES ORDER/RECYCLE WEBSITE

INPUT YOUR CUSTOMER NUMBER AND PASSWORD.
IF IT IS YOUR FIRST VISIT, CLICK ON "REGISTER"

CUSTOMER NUMBER [          ] ~401
PASSWORD [          ] ~402

[ REGISTER ]   ( Cancel )   ( OK )
     |
    403

FIG. 5

EXPENDABLES ORDER/RECYCLE WEBSITE

YOU CAN REGISTER HERE YOURSELF AS USER OF THIS WEBSITE. FILL OUT THE FORM BELOW AND CLICK ON "OK".
(FOR PERSONAL REGISTRATION, ITEMS MARKED WITH * NEED NOT BE FILLED OUT)

COMPANY NAME
(FOR PERSONAL REGISTRATION, YOUR NAME)
* DEPARTMENT
POSTAL CODE
ADDRESS
* NAME OF PERSON IN CHARGE
E-MAIL ADDRESS
TELEPHONE
FAX
YOUR MODELS

[ Cancel ]  [ OK ]

FIG. 6

EXPENDABLES ORDER/RECYCLE WEBSITE

CONFIRM INPUT CONTENTS.
IF THE CONTENTS ARE RIGHT, CLICK ON "OK". TO RE-INPUT,
CLICK ON "CORRECT PART".
WHEN YOU CLICKS ON "OK", A SELECTION WINDOW WILL BE DISPLAYED

* COMPANY NAME : □□□□KK
* DEPARTMENT : PATENT DEPARTMENT
POSTAL CODE : 146-XXXX
ADDRESS : X-X-X, SHIMOMARUKO, OTA-KU
NAME OF PERSON IN CHARGE : MR.△△△△
E-MAIL ADDRESS : XXXX@□□□□.co.jp
TELEPHONE : 03-3758-XXXX
FAX : 03-3758-XXXX
YOUR MODELS : LBP-A, LBP-B, · · · ·

Cancel   CORRECT PART (601)   OK (602)

FIG. 7

EXPENDABLES
ORDER/RECYCLE WEBSITE

IF YOU PURCHASE EXPENDABLES OR REQUEST COLLECTION OF EXPENDABLES ON THIS WEBSITE, WE OFFER SPECIAL BENEFITS TO YOU IN CORRESPONDENCE WITH YOUR USE FREQUENCY. WE CALL THIS SERVICE "INCENTIVE".
YOU CAN SELECT ONE SERVICE FROM THE FOLLOWING CHOICES. THE SERVICE IS CHANGEABLE EVEN AFTER REGISTRATION.
CHECK DESIRED SERVICE AND CLICK ON "REGISTER".
WHEN YOU CLICKS ON "REGISTER", A REGISTRATION CONFIRMATION WINDOW WILL BE DISPLAYED

---

- ☐ RECEIVE A DISCOUNT AT A DISCOUNT RATE (%) CORRESPONDING TO YOUR SALES/COLLECTION RESULT
- ☐ ACCUMULATE POINTS AND APPLY THE POINTS TO PURCHASE MERCHANDISE
- ☐ ACCUMULATE POINTS AND RECEIVE CASH AT A PREDETERMINED AMOUNT

701

[ Cancel ]          [ REGISTER ]

EXPENDABLES ORDER/RECYCLE WEBSITE

CONFIRM REGISTERED CONTENTS. IF THE CONTENTS ARE RIGHT, CLICK ON "CONFIRM AND PRINT SCREEN". PLEASE KEEP THE PRINTED REGISTERED CONTENTS BECAUSE THEY WILL BE NECESSARY LATER. TO RE-INPUT, CLICK ON "RETRY"

146-XXXX X-X-X, SHIMOMARUKO, OTA-KU
☐☐☐☐KK. PATENT DEPARTMENT, MR.△△△△
E-MAIL ADDRESS : XXXX@☐☐☐☐.co.jp
TELEPHONE : 03-3758-XXXX   FAX : 03-3758-XXXX
INCENTIVE PROVIDING METHOD : RECEIVE A DISCOUNT FOR EACH USE AT RATE (%) CORRESPONDING TO INCENTIVE

\*\*IMPORTANT\*\* YOU MUST INPUT THE FOLLOWING NUMBERS TO LOG IN TO OUR SITE OR USE THE INCENTIVE.
CUSTOMER NUMBER : XXXXXXXXXX
PASSWORD : XXXXXXXXXX

[ Cancel ]   [ RETRY ]   [ CONFIRM AND PRINT SCREEN ]
                 802              801

FIG. 9

**EXPENDABLES
ORDER/RECYCLE WEBSITE**

THE FOLLOWING PROCESSING OPERATIONS ARE AVAILABLE IN THIS WEBSITE. CLICK ON DESIRED PROCESSING

901 — ● PURCHASE EXPENDABLES

902 — ● REQUEST COLLECTION OF WASTE EXPENDABLES

903 — ● REQUEST COLLECTION CONTAINERS

904 — ● CONFIRM COLLECTION RATIO AND INCENTIVE

TO LOG OUT, CLICK ON "LOGOUT"

[ logout ]
905

FIG. 10

**EXPENDABLES
ORDER/RECYCLE WEBSITE**

PURCHASE EXPENDABLES

WELCOME TO OUR SITE, MESSRS. ABC OFFICE.
PLEASE SELECT MODELS OF MERCHANDISE ITEMS
AND INPUT QUANTITIES

| MODEL | UNIT PRICE | QUANTITY | |
|---|---|---|---|
| CRG-1 ▼ | 20,000 | 2 | ⟵1001 |
| CRG-2 ▼ | 15,000 | 1 | DISCOUNT RATE 2% (INCLUDING INCENTIVE) |
| ▼ | | | |

TOTAL AMOUNT 55,000   DISCOUNT 1,100

CHARGE AMOUNT 53,900

Cancel    TRANSMIT
                      |
                    1002

FIG. 11

**EXPENDABLES
ORDER/RECYCLE WEBSITE**

COLLECTION OF WASTE EXPENDABLES

WELCOME TO OUR SITE, MESSRS. ABC OFFICE.
PLEASE SELECT DESIRED COLLECTION METHOD

1101
- ● LUMP-SUM COLLECTION
WE SEND YOU A COLLECTION CONTAINER WITH A CAPACITY
FOR X EXPENDABLES. YOU CAN RETURN THE COLLECTION
1102 CONTAINER WHEN IT IS FILLED WITH X EXPENDABLES
- ● SEPARATE COLLECTION
YOU CAN SEND WASTE EXPENDABLES EVERY TIME

FIG. 12

EXPENDABLES ORDER/RECYCLE WEBSITE

REQUEST COLLECTION CONTAINERS

WELCOME TO OUR SITE, MESSRS. ABC OFFICE.
THANK YOU FOR YOUR COOPERATION.
YOU WANT LUMP-SUM COLLECTION.
IF YOU NEED COLLECTION CONTAINERS,
PLEASE INPUT QUANTITY

| CONTAINER | QUANTITY 1202 |
|---|---|
| 4-PIECE CASE | ▼ 1 |
| 8-PIECE CASE | ▼ |

1201

Cancel    TRANSMIT

EXPENDABLES ORDER/RECYCLE WEBSITE

LUMP-SUM COLLECTION OF WASTE EXPENDABLES

WELCOME TO OUR SITE, MESSRS. ABC OFFICE.
PLEASE SELECT ARTICLE MODEL FOR LUMP-SUM COLLECTION

| MODEL | QUANTITY |
|---|---|
| CRG-1 ▼ | 2 |
| CRG-3 ▼ | 2 |
| ▼ | |

1301 — MODEL column
1302 — QUANTITY column
1303 — TRANSMIT

[ Cancel ]  [ TRANSMIT ]

FIG. 14

**EXPENDABLES
ORDER/RECYCLE WEBSITE**

REQUEST COLLECTION OF
COLLECTION CONTAINER

WELCOME TO OUR SITE, MESSRS. ABC OFFICE.
    THANK YOU FOR YOUR COOPERATION.
    YOU WANT LUMP-SUM COLLECTION

WE ARE SORRY TO SAY THAT YOUR ORDER DOES
NOT MATCH THE CAPACITY (FOUR OR EIGHT PIECES)
OF THE CONTAINER, AND YOU CANNOT RECEIVE
POINT FOR LUMP-SUM COLLECTION

DO YOU WANT TO PLACE AN ORDER
    (COLLECTION REQUEST) AGAIN?

[ NO ]  [ YES ]
 1402    1401

FIG. 15

EXPENDABLES ORDER/RECYCLE WEBSITE

SEPARATE COLLECTION OF WASTE EXPENDABLES

WELCOME TO OUR SITE, MESSRS. ABC OFFICE.
PLEASE SELECT ARTICLE MODEL FOR SEPARATE
COLLECTION AND INPUT QUANTITY

| MODEL | QUANTITY 1502 |
|---|---|
| CRG-1 ▼ | 3 |
| CRG-3 ▼ | 1 |
| ▼ | |

1501 PLEASE INPUT DESIRED COLLECTION DATE AS YYYY.MM.DD

[           ] 1503

[ Cancel ]  [ TRANSMIT ]

[Left label]

ADDRESS:
〒261-XXXX
X-X-X NAKASE, MIHAMA-KU, CHIBA-SHI
○○○○ KK. COLLECTION CENTER
TELEPHONE 043-211-XXXX

COLLECTED ARTICLE, TONER CARTRIDGE CRG-1

COLLECTION CODE    1 9 2 0 0 5 5 0 4 4 0 0 4

SENDER: 〒146-XXXX
X-X-X, SHIMOMARUKO, OTA-KU
□□□□KK. PATENT DEPARTMENT
PERSON IN CHARGE: MR. △△△△

TELEPHONE: 03-3758-XXXX

DATE OF RECEPTION, APRIL 28, 2000
EXPECTED COLLECTION DATE, MAY 1, 2000
USER CODE, 154649

...

PLEASE CUT OFF THIS INVOICE AND PASTE IT TO AN ARTICLE TO BE COLLECTED

[Right label]

ADDRESS:
〒261-XXXX
X-X-X NAKASE, MIHAMA-KU, CHIBA-SHI
○○○○ KK. COLLECTION CENTER
TELEPHONE 043-211-XXXX

COLLECTED ARTICLE, TONER CARTRIDGE CRG-2

COLLECTION CODE    9 7 8 4 8 9 0 5 2 3 8 4 9

SENDER: 〒146-XXXX
X-X-X, SHIMOMARUKO, OTA-KU
□□□□KK. PATENT DEPARTMENT
PERSON IN CHARGE: MR. △△△△

TELEPHONE: 03-3758-XXXX

DATE OF RECEPTION, APRIL 28, 2000
EXPECTED COLLECTION DATE, MAY 1, 2000
USER CODE, 154649

...

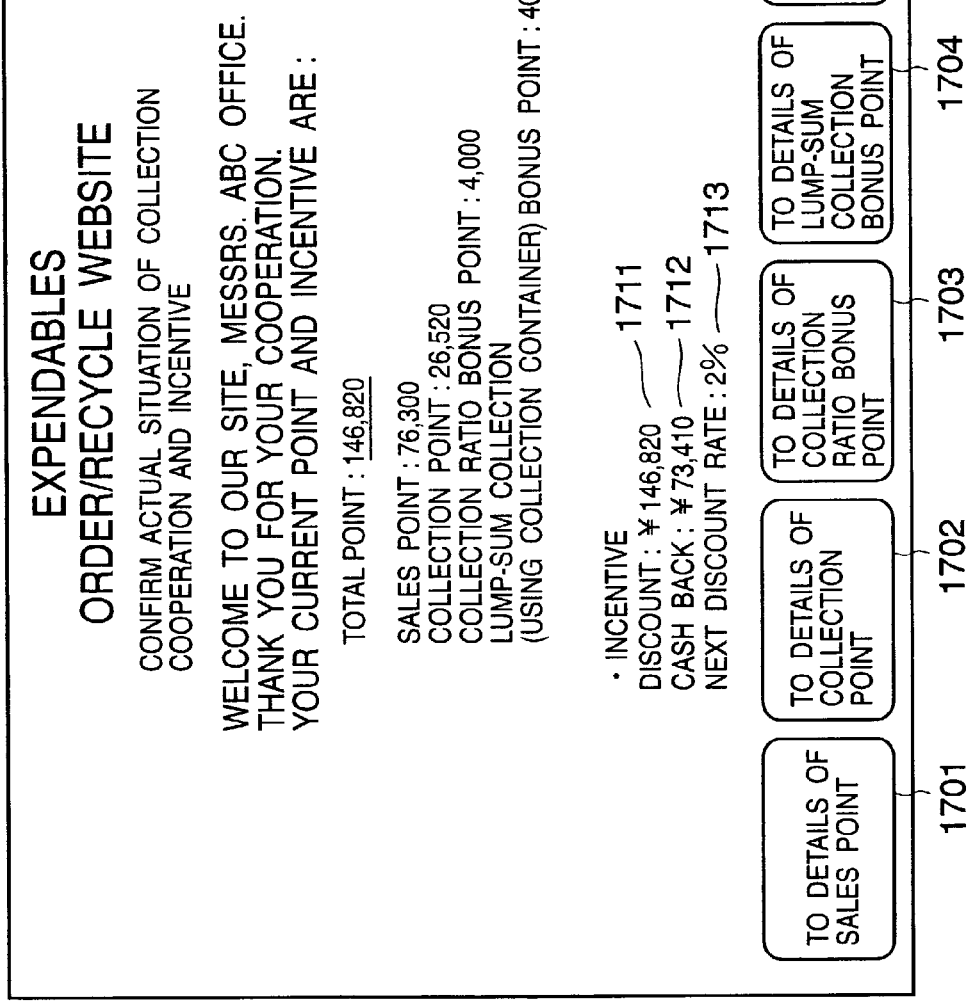

FIG. 18

EXPENDABLES ORDER/RECYCLE WEBSITE (1) SALES POINT

DETAILS OF SALES POINT
MESSRS. ABC OFFICE

| MODEL | SALES QUANTITY | SALES DATE | POINT PER UNIT | SUBJECT OF CAMPAIGN | TOTAL SALES POINT |
|---|---|---|---|---|---|
| CRG A | 3 | 2001/3/31 | 100 | — | 300 |
| CRG B | 1 | 2001/5/5 | 30 | — | 30 |
| CRG C | 2 | 2001/7/1 | 120 | ○ | 240 |
| CRG A | 1 | 2001/7/10 | 200 | ○ | 200 |
| CRG D | 4 | 2001/7/10 | 20 | — | 80 |
| ⋯ | ⋯ | ⋯ | ⋯ | ⋯ | ⋯ |
| TOTAL | 1,256 | | | | 76,300 |

[TO DETAILS OF COLLECTION POINT] [TO DETAILS OF COLLECTION RATIO BONUS POINT] [TO DETAILS OF LUMP-SUM COLLECTION BONUS POINT] [RETURN]

FIG. 19

EXPENDABLES ORDER/RECYCLE WEBSITE (2) COLLECTION POINT

DETAILS OF COLLECTION POINT
MESSRS. ABC OFFICE

| MODEL | COLLECTION QUANTITY | COLLECTION DATE | POINT PER UNIT | SUBJECT OF CAMPAIGN | TOTAL COLLECTION POINT |
|---|---|---|---|---|---|
| CRG A | 2 | 2001/6/29 | 100 | — | 100 |
| CRG C | 1 | 2001/6/2 | 30 | — | 30 |
| CRG C | 1 | 2001/7/30 | 60 | ○ | 240 |
| CRG A | 1 | 2001/7/2 | 200 | ○ | 200 |
| CRG D | 4 | 2001/7/2 | 20 | — | 80 |
| ⋮ | ⋮ | ⋮ | ⋮ | ⋮ | ⋮ |
| TOTAL | 879 | | | | 26,520 |

[TO DETAILS OF SALES POINT] [TO DETAILS OF COLLECTION RATIO BONUS POINT] [TO DETAILS OF LUMP-SUM COLLECTION BONUS POINT] [RETURN]

FIG. 20

EXPENDABLES ORDER/RECYCLE WEBSITE (3) COLLECTION RATIO

DETAILS OF COLLECTION RATIO
MESSRS. ABC OFFICE

| MODEL | SALES QUANTITY | SALES DATE | MODEL | COLLECTION QUANTITY | COLLECTION DATE |
|---|---|---|---|---|---|
| CRG A | 3 | 2001/3/31 | CRG A | 2 | 2001/6/29 |
| CRG B | 1 | 2001/5/5 | CRG C | 1 | 2001/6/2 |
| CRG C | 2 | 2001/7/1 | CRG C | 1 | 2001/7/30 |
| CRG A | 1 | 2001/7/10 | CRG A | 1 | 2001/7/2 |
| CRG D | 4 | 2001/7/10 | CRG D | 4 | 2001/7/2 |
| . . . | | | . . . | | |
| TOTAL | 1,256 | | | 879 | COLLECTION RATIO : 70% |

[TO DETAILS OF SALES POINT] [TO DETAILS OF COLLECTION POINT] [TO DETAILS OF LUMP-SUM COLLECTION BONUS POINT] [RETURN]

FIG. 21

EXPENDABLES
ORDER/RECYCLE WEBSITE

DETAILS OF LUMP-SUM COLLECTION BONUS POINT (4) LUMP-SUM COLLECTION    MESSRS. ABC OFFICE

| COLLECTION CONTAINER | CONTAINER QUANTITY | COLLECTION DATE | CONTAINER POINT | CONTAINER TOTAL POINT |
|---|---|---|---|---|
| 4 PIECES | 1 | 2001/3/31 | 100 | 100 |
| 8 PIECES | 3 | 2001/5/5 | 300 | 900 |
| 8 PIECES | 2 | 2001/7/1 | 300 | 600 |
| 4 PIECES | 1 | 2001/7/10 | 100 | 100 |
| 4 PIECES | 1 | 2001/7/10 | 100 | 100 |
| · · · | · · · | · · · | · · · | · · · |
| TOTAL | 200 | | | 40,000 |

[TO DETAILS OF SALES POINT]  [TO DETAILS OF COLLECTION POINT]  [TO DETAILS OF COLLECTION RATIO BONUS POINT]

[RETURN]

FIG. 22

**EXPENDABLES
ORDER/RECYCLE WEBSITE**

DURING A CAMPAIGN UNTIL MAY 17, YOU WILL GET A DOUBLE
INCENTIVE FOR COOPERATION IN COLLECTING EXPENDABLES OF
THE FOLLOWING MODELS. WE ASK FOR YOUR COOPERATION

MODELS FOR CAMPAIGN
LBP-1/LBP-2/LBP-3

PLEASE INPUT YOUR CUSTOMER NUMBER AND PASSWORD.
IF IT IS YOUR FIRST VISIT, CLICK ON "REGISTER"

CUSTOMER NUMBER [ ]
PASSWORD [ ]

[ REGISTER ]   [ Cancel ]   [ OK ]

FIG. 33

| COLLECTION RATIO (%) \ MODEL | 0~10 | ~30 | ~50 | | ~100 |
|---|---|---|---|---|---|
| CRG A | 0% | −1% | −1% | | −3% |
| CRG B | 0% | −0.5% | −1% | | −1.5% |
| CRG C | 0% | −2% | −3% | | −5% |
| CRG D | 0% | −1% | −1% | | −3% |
| ⋮ | ⋮ | ⋮ | ⋮ | | ⋮ |

F I G. 34

| SALES QUANTITY (%) / MODEL | 1~50 | ~200 | ~500 | | 1001~ |
|---|---|---|---|---|---|
| CRG A | 0% | 0% | 0% | | −5% |
| CRG B | 0% | 0% | 0% | | −5% |
| CRG C | 0% | 0% | 0% | | −3% |
| CRG D | 0% | −0.5% | −1% | | −7% |
| ⋮ | ⋮ | ⋮ | ⋮ | | ⋮ |

FIG. 35

| COLLECTION RATIO (%) / MODEL | 0~10 | ~30 | ~50 | | ~100 |
|---|---|---|---|---|---|
| CRG A | 0% | −2% | −2% | | −6% |
| CRG B | 0% | −0.5% | −1% | | −1.5% |
| CRG C | 0% | −2% | −4% | | −10% |
| CRG D | 0% | −1% | −1% | | −3% |
| ⋮ | ⋮ | ⋮ | ⋮ | | ⋮ |

FIG. 36

| MODEL | SALES POINT | CAMPAIGN POINT | SUBJECT OF SALES CAMPAIGN | CAMPAIGN PERIOD |
|---|---|---|---|---|
| CRG A | 100 point | +100 point | ○ | APRIL 1 2001 TO MARCH 31 2002 |
| CRG B | 30 point | — | — | — |
| CRG C | 60 point | +60 point | ○ | JULY 1 2001 TO DECEMBER 31 2001 |
| CRG D | 20 point | — | — | — |
| ...... | ...... | ...... | ...... | ...... |

| MODEL | COLLECTION POINT | CAMPAIGN POINT | SUBJECT OF COLLECTION CAMPAIGN | CAMPAIGN PERIOD |
|---|---|---|---|---|
| CRG A | 50 point | +50 point | ○ | JANUARY 1 2001 TO DECEMBER 31 2001 |
| CRG B | 15 point | — | — | — |
| CRG C | 30 point | +30 point | ○ | JULY 1 2001 TO DECEMBER 31 2001 |
| CRG D | 10 point | — | — | — |
| ...... | | | ...... | ...... |

FIG. 38

| COLLECTION RATIO | COLLECTION RATIO BONUS POINT |
|---|---|
| 0~30% | 0 |
| 30~40% | 500 |
| 41~50% | 1,000 |
| 51~60% | 2,000 |
| 61~70% | 4,000 |
| 71~80% | 7,000 |
| 81~90% | 10,000 |
| 91~99% | 15,000 |
| 100% | 20,000 |

| CONTAINER TYPE | LUMP-SUM COLLECTION BONUS POINT |
|---|---|
| 4 PIECES | 100 |
| 8 PIECES | 300 |
| OTHERS | 0 |

EXAMPLE OF CONVERSION TABLE FOR USE OF ACCUMULATED POINTS (ORDINARY PERIOD)

| USE POINTS TO PURCHASE MERCHANDISE | 100 YEN/POINT | ~4001 |
|---|---|---|
| CASH BACK TO USER | 60 YEN/POINT | ~4002 |

FIG. 41

EXAMPLE OF CONVERSION TABLE FOR USE OF ACCUMULATED POINTS (DURING CAMPAIGN)

| USE POINTS TO PURCHASE MERCHANDISE | 200 YEN/POINT |
|---|---|
| CASH BACK TO USER | 70 YEN/POINT |

FIG. 46A

| CUSTOMER NUMBER | PASSWORD | NAME | ADDRESS | MAIL ADDRESS ETC. | MODEL OF USE DEVICE | AVERAGE COLLECTION RATIO | POINTER TO SALES TABLE | POINTER TO COLLECTION TABLE | POINTER TO LUMP-SUM COLLECTION TABLE | POINTER TO COLLECTION RATIO TABLE | INCENTIVE PROVIDING METHOD |
|---|---|---|---|---|---|---|---|---|---|---|---|
| 4601 | 4602 | 4603 | 4604 | 4605 | 4606 | 4607 | 4608 | 4609 | 4610 | 4611 | 4617 |
| RECYCLED ARTICLE RATIO | QUANTITY OF RECYCLED ARTICLES | OTHER MAKER PRODUCT RATIO | QUANTITY OF OTHER MAKER PRODUCTS | INCENTIVE | | | | | | | |
| 4613 | 4614 | 4615 | 4616 | 4612 | | | | | | | |

FIG. 46B (4620)

| MODEL | QUANTITY | SALES DATE |
|---|---|---|
| CRG-A | 2 | 2001/6/29 |
| CRG-C | 1 | 2001/6/2 |
| ... | ... | ... |

| MODEL | QUANTITY | COLLECTION DATE |
|---|---|---|
| CRG-A | 3 | 2001/3/31 |
| CRG-B | 1 | 2001/5/5 |
| ... | ... | ... |

| MODEL | QUANTITY | COLLECTION DATE |
|---|---|---|
| 4 PIECES | 1 | 2001/3/31 |
| 8 PIECES | 3 | 2001/5/5 |
| ... | ... | ... |

| MODEL | AVERAGE COLLECTION RATIO |
|---|---|
| CRG-A | XXXX |
| ... | ... |

EXPENDABLES ORDER/RECYCLE WEBSITE

CONFIRM COLLECTION RATIO AND INCENTIVE

WELCOME TO OUR SITE, MESSRS. ABC OFFICE.
THANK YOU FOR YOUR COOPERATION.
YOUR COLLECTION RATIO AND INCENTIVE ARE:

- COLLECTION RATIO 60% ~4703
  - SALES QUANTITY 1256 — 4704
  - VALID COLLECTION QUANTITY 754 ~4705
  - COLLECTION QUANTITY OF RECYCLED ARTICLES/OTHER MAKER PRODUCTS 125 ~4706

- INCENTIVE  AVERAGE DISCOUNT RATE 1.5% ~4707

"RECYCLED ARTICLES/OTHER MAKER PRODUCTS" MEANS OTHER MAKER PRODUCTS AND RECYCLED EXPENDABLES
(20 RECYCLED ARTICLES/OTHER MAKER PRODUCTS ARE COLLECTED THIS TIME, AND THE TOTAL NUMBER IS 125)
WE CANNOT RECYCLE THESE PRODUCTS, AND THEREFOR, THE INCENTIVE IS ZERO OR MINUS. PLEASE USE A COLLECTION ROUTE DESIGNATED BY EACH MAKER OR USE GENUINE CARTRIDGES

[ DETAILS ] 4701    [ RETURN ] 4702

FIG. 48

EXPENDABLES ORDER/RECYCLE WEBSITE

CONFIRM COLLECTION RATIO AND INCENTIVE

MESSRS. ABC OFFICE

| MODEL | SALES QUANTITY | COLLECTION QUANTITY | | VALID COLLECTION RATIO (%) | RECYCLED ARTICLE RATIO (%) | INCENTIVE (%) | |
|---|---|---|---|---|---|---|---|
| | | VALID | RECYCLED ARTICLE | | | VALID | RECYCLED ARTICLE |
| CRG-1 | 250 | 200 | 23 | 80.0 | 10.3 | −3.0 | 0 |
| CRG-2 | 126 | 112 | 0 | 88.8 | 0 | −1.5 | 0 |
| CRG-3 | 620 | 310 | 65 | 50.0 | 17.3 | −3.0 | 0.5 |
| ... | ... | ... | ... | ... | ... | ... | ... |
| OTHER MAKER PRODUCT | — | — | 20 | — | 2.3 | — | 0 |
| TOTAL/ AVERAGE | 1256 | 754 | 125 | 60.0 | 14.2 | −1.5 | |

* "RECYCLED ARTICLES/OTHER MAKER PRODUCTS" MEANS OTHER MAKER PRODUCTS AND RECYCLED EXPENDABLES
(20 RECYCLED ARTICLES/OTHER MAKER PRODUCTS ARE COLLECTED THIS TIME, AND THE TOTAL NUMBER IS 125)
WE CANNOT RECYCLE THESE PRODUCTS, AND THEREFOR, THE INCENTIVE IS NULLIFIED OR DECREASED. PLEASE USE A COLLECTION ROUTE DESIGNATED BY EACH MAKER OR USE GENUINE CARTRIDGES

[RETURN]

FIG. 49

MESSRS. ABC OFFICE.
THANK YOU FOR USE OF EXPENDABLES ORDER/RECYCLE WEBSITE.
LATEST INCENTIVE ON WHICH ORDER AND COLLECTION RESULT IN
(MONTH)(DAY) IS REFLECTED ARE AS FOLLOWS

| MODEL | SALES QUANTITY | COLLECTION QUANTITY | | COLLECTION RATIO (%) | RECYCLED ARTICLE RATIO (%) | INCENTIVE (%) | |
|---|---|---|---|---|---|---|---|
| | | VALID | OTHERS | | | VALID | OTHERS |
| THIS TIME | 100 | 54 | 20 | | | | |
| TOTAL/ AVERAGE | 1256 | 754 | 125 | 60.0 | 14.2 | -2.0 | 5.0 |

LATEST INCENTIVE=−1.5%

WASTE CARTRIDGES COLLECTED FROM YOU INCLUDE OTHER MAKER PRODUCTS AND RECYCLED CARTRIDGES
(20 RECYCLED CARTRIDGES/OTHER MAKER PRODUCTS ARE COLLECTED THIS TIME, AND THE TOTAL NUMBER IS 125)
WE CANNOT RECYCLE THESE PRODUCTS, AND THEREFOR, THE INCENTIVE IS ZERO OR MINUS. PLEASE USE A COLLECTION ROUTE DESIGNATED BY EACH MAKER OR USE GENUINE CARTRIDGES

FIG. 50

MESSRS. DEF KK.
THANK YOU FOR USE OF EXPENDABLES ORDER/RECYCLE WEBSITE.
LATEST INCENTIVE ON WHICH ORDER AND COLLECTION RESULT IN
(MONTH)(DAY) IS REFLECTED ARE AS FOLLOWS

| MODEL | SALES QUANTITY | COLLECTION QUANTITY | | COLLECTION RATIO (%) | RECYCLED ARTICLE RATIO (%) | INCENTIVE (%) | |
| --- | --- | --- | --- | --- | --- | --- | --- |
| | | VALID | OTHERS | | | VALID | OTHERS |
| THIS TIME | 140 | 110 | 0 | | | | |
| TOTAL/ AVERAGE | 1750 | 1460 | 0 | 83.4 | 0 | −2.5 | |
| LATEST INCENTIVE=−2.5% | | | | | | | |

FIG. 52

| RECYCLED ARTICLE RATIO (%) MODEL | 0~10 | ~30 | ~50 | ~100 |
|---|---|---|---|---|
| CRG A | 0% | 0% | 1% | 1% |
| CRG B | 0% | 0% | 1% | 1% |
| CRG C | 0% | 0.5% | 1% | 2% |
| CRG D | 0% | 0.5% | 1% | 1.5% |
| ⋮ | ⋮ | ⋮ | ⋮ | ⋮ |

FIG. 53

| OTHER MAKER PRODUCT RATIO (%) / MODEL | 0~10 | ~30 | ~50 | ~100 |
|---|---|---|---|---|
| MAKER A | 0% | 0% | 0.5% | 1% |
| MAKER B | 0% | 0% | 0.5% | 1% |
| MAKER C | 0% | 0.5% | 1% | 2% |
| MAKER D | 0% | 0.5% | 1% | 1.5% |
| ⋮ | ⋮ | ⋮ | ⋮ | ⋮ |

F I G. 54

| COLLECTION RATIO (%) / MODEL | 0~10 | ~30 | ~50 | ~100 |
|---|---|---|---|---|
| CRG A | 0% | 1% | 2% | 3% |
| CRG B | 0% | 1% | 1% | 2% |
| CRG C | 0% | 3% | 4% | 6% |
| CRG D | 0% | 1% | 2% | 3% |
| ⋮ | ⋮ | ⋮ | ⋮ | ⋮ |

F I G. 55

| RECYCLED ARTICLE RATIO (%) / MODEL | 0~10 | ~30 | ~50 | ~100 |
|---|---|---|---|---|
| CRG A | 0% | 0% | 0% | −1% |
| CRG B | 0% | 0% | 0% | −1% |
| CRG C | 0% | 0% | −1% | −2% |
| CRG D | 0% | 0% | −1% | −1% |
| ⋮ | ⋮ | ⋮ | ⋮ | ⋮ |

F I G. 56

| OTHER MAKER PRODUCT RATIO (%) <br> MODEL | 0~10 | ~30 | ~50 | | ~100 |
|---|---|---|---|---|---|
| MAKER A | 0% | 0% | −1% | | −1% |
| MAKER B | 0% | 0% | −1% | | −1% |
| MAKER C | 0% | 0% | −1% | | −1% |
| MAKER D | 0% | 0% | −1% | | −2% |
| ⋮ | ⋮ | ⋮ | ⋮ | | ⋮ |

FIG. 57

EXAMPLE OF CONVERSION TABLE FOR USE OF ACCUMULATED POINTS (ORDINARY PERIOD)

| USE POINTS TO PURCHASE MERCHANDISE | 100 YEN/POINT |
|---|---|
| CASH BACK TO USER | 60 YEN/POINT |

FIG. 58

EXAMPLE OF CONVERSION TABLE FOR USE OF ACCUMULATED POINTS (CAMPAIGN PERIOD)

| USE POINTS TO PURCHASE MERCHANDISE | 200 YEN/POINT |
|---|---|
| CASH BACK TO USER | 70 YEN/POINT |

FIG. 60A

| CUSTOMER NUMBER | PASS-WORD | NAME | ADDRESS | MAIL ADDRESS ETC. | MODEL OF USE DEVICE | AVERAGE COLLECTION RATIO | POINTER TO SALES TABLE |
|---|---|---|---|---|---|---|---|
| 6001 | 6002 | 6003 | 6004 | 6005 | 6006 | 6007 | 6008 |

| POINTER TO COLLECTION TABLE | POINTER TO OTHER MAKER PRODUCT TABLE | INCENTIVE |
|---|---|---|
| 6009 | 600A | 600B |

| MODEL | QUANTITY |
|---|---|
| 6011 | 6012 |
| CRG-1 | XX |
| ... | ... |

| MODEL | VALID QUANTITY | RECYCLED ARTICLE QUANTITY | COLLECTION RATIO |
|---|---|---|---|
| 6021 | 6022 | 6023 | 6024 |
| CRG-1 | 200 | 23 | XX |
| CRG-2 | 112 | 6 | XX |
| ... | ... | ... | ... |

| TYPE | QUANTITY |
|---|---|
| 6031 | 6032 |
| XXX | XX |
| ... | ... |

# SERVER, MANAGEMENT SYSTEM, AND MANAGEMENT CONTROL METHOD

FIELD OF THE INVENTION

The present invention relates to a server, management system, and management control method and, for example, collection of expendables such as cartridges.

BACKGROUND OF THE INVENTION

Cartridges which store toner and are used for printers of electrophotographic scheme, ink cartridges used for inkjet printers, and the like can be collected as waste parts to recycle plants and recycled. Such an activity is supposed to be very important from the viewpoint of saving resources and environment protection.

As a waste expendable collection method to promote the above-described recycle activity, a mechanism has been implemented in which a user requests a collection container by using a FAX, places waste expendables in the received collection container, and sends it to a collector such as a maker or collection agency. When collected articles are actually collected to a recycle plant, the waste expendables are recycled and shipped as new products by a system installed in the recycle plant. Such a collection system is expected to make a further progress in the future.

However, the conventional collection system has been unable to provide a system advantageous (incentive) to users.

Additionally, in the conventional collection system for waste expendables of office equipments, even when the collector sends a collection container in response to a request from a user, the collection container does not always store waste expendables in type/quantity that should be stored in the collection container. For example, only five waste expendables may sometimes be stored in a container for eight items. This is not effective for the collecting side in terms of transportation cost and the like.

Furthermore, a user does not always actually request collection of waste that is presumed on the collecting side. Hence, even items whose collection is not presumed, e.g., a waste rubber tire, may be collected to the recycle plant. If inappropriate items are collected, appropriate recycle operation is impeded.

SUMMARY OF THE INVENTION

The present invention has been made in consideration of the above problems, and has as its object to provide a mechanism capable of promoting the recycle activity by optimally managing recycle cooperation of users and providing advantages based on appropriate management to the users.

The present invention has the following arrangements.

According to the first arrangement, there is provided an information processing apparatus for managing information related to collection of waste expendables used in an office device, comprising:

determination means for determining different incentives on the basis of a type of a collection container which stores collected articles including the waste expendables and is collected from a specific user; and management means for storing, in a database, information containing the incentives determined by the determination means as management information in correspondence with user information of the specific user.

According to the second arrangement, the apparatus further comprises first providing means for providing collection request window information which causes a terminal apparatus communicable through a predetermined communication line to display a collection request window, and issue means for issuing identification information based on collection request information input through the collection request window based on the collection request window information provided by the first providing means, and the management means updates the database on the basis of the identification information attached to the collected articles.

According to the third arrangement, the apparatus further comprises first discrimination means for discriminating a collection method instructed through the collection request window, and the first providing means provides to the terminal apparatus collection request window information according to the collection method discriminated by the first discrimination means.

According to the fourth arrangement, the apparatus further comprises second providing means for providing purchase window information which causes the terminal apparatus to display a purchase window to request purchase of merchandise including expendables, the second providing means providing the purchase window information containing the management information containing the incentives.

According to the fifth arrangement, the apparatus further comprises reception means for receiving an instruction of selection of a use form of the incentive sent from the terminal apparatus through the predetermined communication line, the management means stores, in the database, the use form of the incentive, which is received by the reception means, in correspondence with the specific user information, and the second providing means causes the purchase window information corresponding to the user information sent from the terminal apparatus to contain the management information based on the use form of the incentive.

According to the sixth arrangement, the apparatus further comprises third providing means for providing to the terminal apparatus incentive confirmation window information corresponding to a specific customer managed in the database, the third providing means providing the confirmation window information which displays the incentives determined in accordance with the type of the collection container to be discriminable from incentives determined on the basis of another information.

According to the seventh arrangement, the incentives determined on the basis of another information include an incentive given in accordance with a purchase result of the user and an incentive given in accordance with a collection result of the waste expendables of the user.

According to the eighth arrangement, the apparatus further comprises recognition means for recognizing whether the collected articles are specific articles, and warning means for notifying an address contained in the user information of a warning, the management means updates the database in accordance with recognition by the recognition means, and the warning means notifies the address of the warning information on the basis of contents of the database updated in accordance with recognition by the recognition means.

According to the ninth arrangement, the apparatus further comprises specifying means for specifying the user information corresponding to a login, and control means for causing the terminal apparatus to display with a priority a lump-sum collection request window to request lump-sum collection of the waste expendables, on the basis of the user information specified by the specifying means.

According to the 10th arrangement, the determination means determines the different incentives in accordance with a type of the collected waste expendables.

According to the 11th arrangement, the determination means determines the different incentives in accordance with whether the type of the collected waste expendables is a type to be recycled, which is stored in the database in advance, or a type not to be recycled.

According to the 12th arrangement, information representing the expendables of the type to be recycled is transmitted to the terminal apparatus communicable through the predetermined communication line.

According to the 13th arrangement, the incentive is a point or a discount rate which can be used to acquire merchandise.

According to the 14th arrangement, there is provided a management system constituted by an information processing apparatus for managing information related to collection of waste expendables used in an office device and a terminal apparatus capable of communicating with the information processing apparatus, wherein the information processing apparatus comprises:

determination means for determining different incentives on the basis of a type of a collection container which stores the waste expendables collected from a specific user; and management means for storing, in a database, information containing the incentives determined by the determination means as management information in correspondence with user information of the specific user, and the terminal apparatus comprises:

display means for displaying the information managed by the management means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing the login window of a sales/collection system;

FIG. 5 is a view showing the user registration window;

FIG. 6 is a view showing the user registration confirmation window;

FIG. 7 is a view showing an incentive providing method selection window;

FIG. 8 is a view showing the final confirmation window of user registration;

FIG. 9 is a view showing a processing selection window;

FIG. 10 is a view showing an expendable sales window;

FIG. 11 is a view showing a collection method selection window;

FIG. 12 is a view showing a collection container request window;

FIG. 13 is a view showing a window displayed when the user desires lump-sum collection;

FIG. 14 is a view showing a request confirmation window displayed when the user desires lump-sum collection;

FIG. 15 is a view showing a window displayed when the user desires separate collection;

FIG. 16 is a view showing a collection slip;

FIG. 17 is a view showing a confirmation window;

FIG. 18 is a view showing a sales point detail window;

FIG. 19 is a view showing a collection point detail window;

FIG. 20 is a view showing a collection ratio bonus point detail window;

FIG. 21 is a view showing a lump-sum collection bonus point detail window;

FIG. 22 is a view showing the sales/collection system login window during a promotion period to promote collection of specific expendables;

FIG. 33 is a table showing the relationship between the collection ratio and the incentive;

FIG. 34 is a table showing the relationship between the sales quantity and the discount rate;

FIG. 35 is a table showing the relationship between the collection ratio and the incentive during the promotion period;

FIG. 36 is a table showing the correspondence between sold expendables and given points;

FIG. 37 is a table showing the correspondence between collected expendables and given points;

FIG. 38 is a table showing the relationship between the collection ratio and the incentive (point);

FIG. 39 is a table showing the correspondence between points and containers for lump-sum collection;

FIG. 40 is a table showing the conversion rate between the incentive (point) and the amount;

FIG. 41 is a table showing the conversion rate between the incentive (point) and the amount;

FIGS. 46A, 46B, 46C, 46D, and 46E are views showing the structures of user records;

FIG. 47 is a view showing a confirmation window of the second embodiment;

FIG. 48 is a view showing a detail window of the second embodiment;

FIG. 49 is a view showing an incentive notification (including products of other companies or recycles articles) transmitted from the collection server to the customer terminal in the second embodiment;

FIG. 50 is a view showing an incentive notification transmitted from the collection server to the customer terminal in the second embodiment;

FIG. 52 is a table showing the relationship between the incentive and the ratio of recycled articles included in the collected expendables in the second embodiment;

FIG. 53 is a table showing the relationship between the incentive and the ratio of products of other makers included in the collected expendables in the second embodiment;

FIG. 54 is a table showing the relationship between the incentive (point) and the collection ratio in the second embodiment;

FIG. 55 is a table showing the relationship between the incentive (point) and the ratio of recycled article included in the collected expendables in the second embodiment;

FIG. 56 is a table showing the relationship between the incentive (point) and the ratio of products of other makers included in the collected expendables in the second embodiment;

FIG. 57 is a table showing the conversion rate between the incentive (point) and the amount;

FIG. 58 is a table showing the conversion rate between the incentive (point) and the amount;

FIGS. 60A, 60B, 60C, and 60D are views showing the structure of a user record in the second embodiment.

DETAILED DESCRIPTION OF THE PREFERRED EMBODIMENTS

First Embodiment

The first embodiment of a collection system for collecting expendables used in an office equipment according to the present invention will be described below in detail with reference to the accompanying drawings. In this embodiment, cartridges used in devices such as printers, copying machines, or facsimile apparatuses of electrophotographic scheme will be exemplified as expendables. However, the present invention can also be applied to any other expendables. For example, toner containers, photosensitive drums and other service parts, and paper sheets or OHP sheets for copying machines, or ink containers, cartridges, and printheads for inkjet printers can be exemplified as expendables. For many of them, collection of empty containers and the like is required. For, e.g., toners for a copying machine, collection of toner containers and package cases is desired.

[Outline of Collection System]

Figure 3:
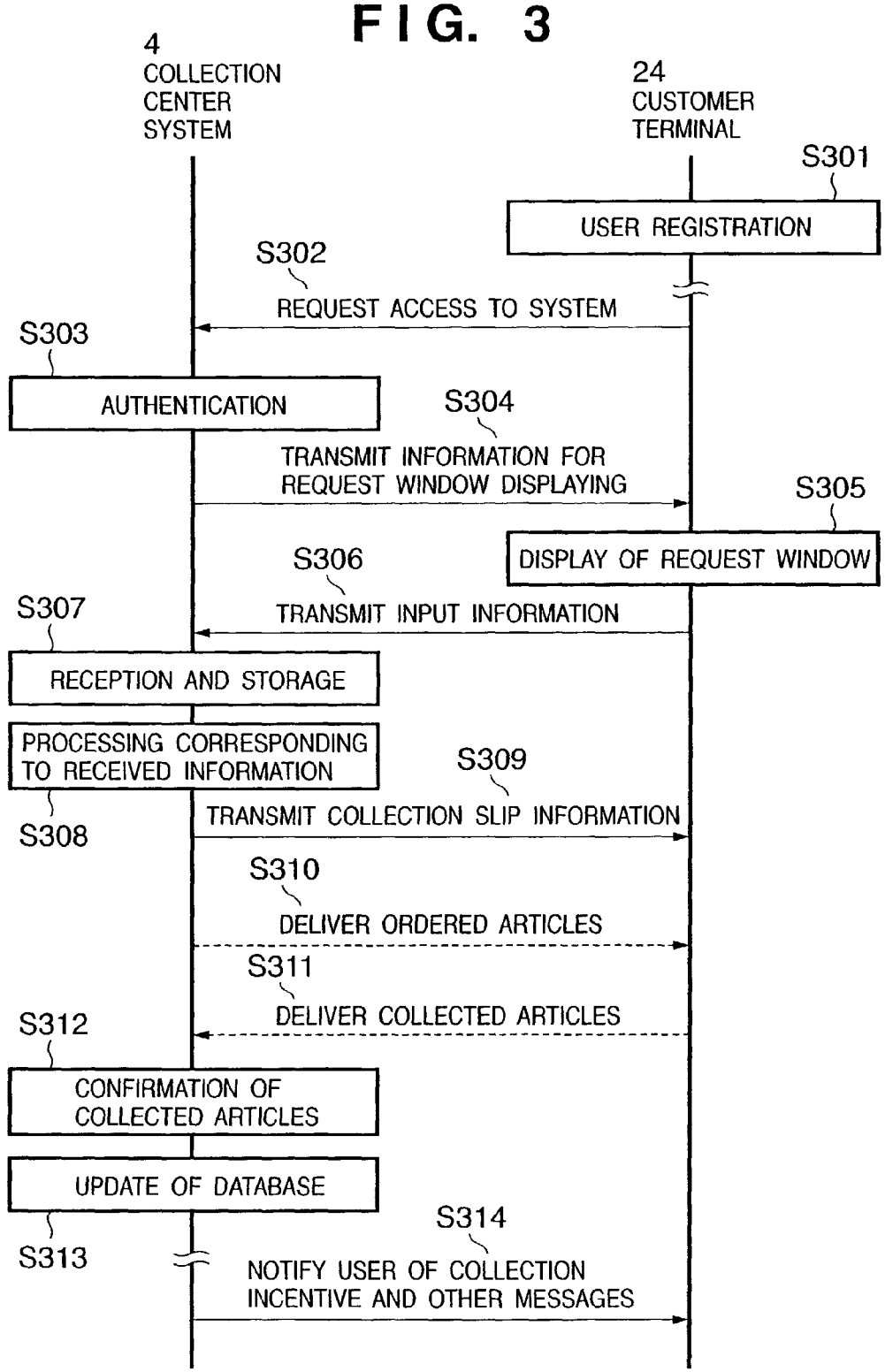
FIG. 3 is a sequence chart showing the outline of expendable collection in the collection system of the embodiment.

FIG. 3 is a sequence chart showing the outline of expendable collection in the collection system of this embodiment. First, the outline of the operation and function of the collection system of this embodiment will be described with reference to FIG. 3. Referring to FIG. 3, a collection center system 4 and customer terminal 24 are computers connected to each other through a communication network. To implement the collection system of this embodiment, the communication network may construct either a closed system or an open system. A closed system is a so-called intranet system which uses a LAN, dedicated line, or public telephone network as a communication line. The collection center system 4 allows only terminals in the closed area to access. A representative open system is the Internet. The collection center system 4 and user system 5 are connected through the Internet. In this embodiment, to widely provide the service to general users, the latter Internet connection is used to connect the collection center system 4 and customer terminal 24. For this reason, the collection center system 4 and customer terminal 24 support protocols such as TCP/IP, HTTP, and e-mail.

The collection center system 4 is not always a single computer. The collection center system 4 has not only the function of, e.g., a web server but also the functions of an e-mail server, a database server for managing transaction results of customers, and an authentication server for executing user authentication. The collection center system 4 may be either a server which implements these functions by a single computer or a network system in which the individual functions are implemented by separate computers that are connected through communication. In this embodiment, all these arrangements will be referred to as a collection center system. A Web server 13, database server 14, and application server 15 illustrated in FIG. 1 (to be described later) corresponds to these servers that execute the functions of the collection center system 4.

Figure 1:
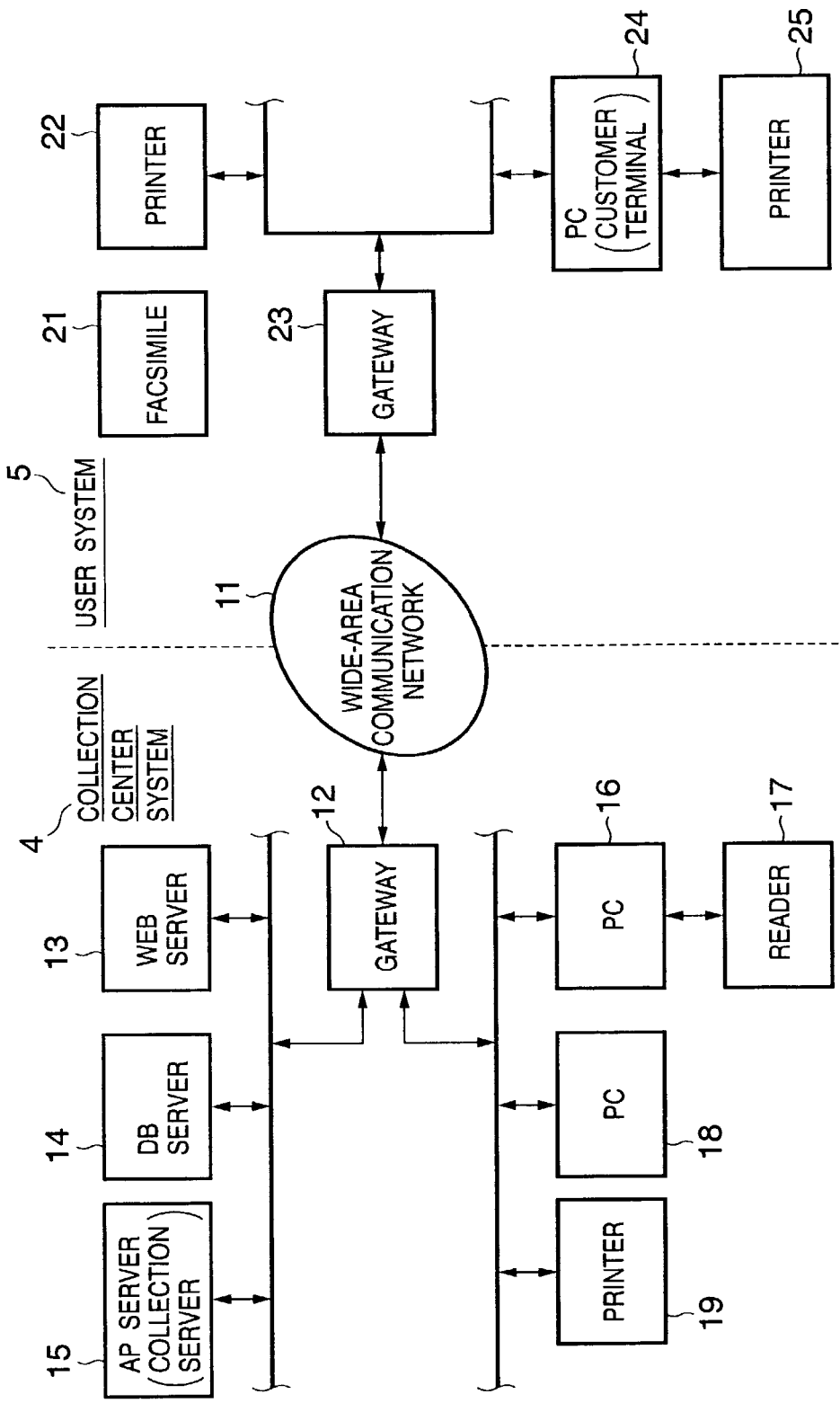
FIG. 1 is a block diagram showing the network configuration and connection between a collection center and users.

The customer terminal 24 can be implemented by a single computer connected by a modem through, e.g., a telephone line. In this embodiment, however, the customer terminal 24 is implemented by the personal computer 24 connected to a LAN system, as shown in FIG. 1. In this embodiment, the customer terminal 24 will also be referred to as the PC 24. The customer terminal 24 will also be referred to as a user system regarded as the same as the LAN connected to the terminal 24.

In the system of this embodiment, upon receiving collection request information transmitted in accordance with pressing a button on the user's customer terminal 24, the collection center system 4 stores, in the database, a user ID and the information of articles to be collected, which are contained in the received collection information.

In collection, a user who wants to use the collection system accesses from the customer terminal 24 installed in the user's office or the like to the collection center system 4 through a Web site page (user registration page) which is published on the collection center system 4 installed in the collection center system 4 so as to do user registration in advance (S301: to be described later with reference to FIGS. 4 to 6). Only users who have been registered in advance can execute subsequent procedures.

The registered user accesses the collection center system 4 through a Web site page (order page) which is also published on the collection center system 4 so as to request authentication (S303). The collection center system 4 authenticates the user who is accessing the system 4 as a registered user (S302) and transmits to the customer terminal 24 information for display of a merchandise/service order window (S304). The authentication processing executed between the customer terminal 24 and the collection center system 4 is realized by a known technique, and a detailed description thereof will be omitted.

At the customer terminal 24, when the user executes input operation for requesting collection of waste expendables while seeing the window displayed on the basis of the information transmitted in step S304, various kinds of information are input in accordance with the input operation (S305), and the pieces of input information are transmitted (S306). The pieces of information input in step S304 include, in addition to information related to order of merchandise, information representing the type and number (quantity) of expendables whose collection is wanted by the user, information representing whether an incentive given for each customer is to be used, and the like. Information related to the expected collection date and collection region may be contained in accordance with user designation.

When the information transmitted for the customer terminal 24 through the communication line in step S306 is information representing a waste expendable collection request, the collection center system 4 receives the collection request. Data that associates the type and number (quantity) of expendables whose collection is wanted by the user with the user is stored in a storage device (S307), and processing is executed in accordance with the received data (S308). After that, collection slip information (e.g., information that allows printing of a collection slip) to be used to generate a collection slip such as a collection code in correspondence with the received data is transmitted to the customer terminal 24 of the user as a requester (S309). If the information transmitted from the customer terminal 24 through the communication line in step S306 is not information representing a collection request, and for example, if the information is information representing an article purchase request or collection container distribution request, the collection center system 4 executes processing corresponding to the received information type in step S308 (details will be described later).

In step S310, when merchandise, packing material, or the like (to be referred to as merchandise or the like hereinafter) should be sent to the customer in accordance with the information transmitted from the customer terminal 24, the merchandise center sends them to the requester. If the merchandise or the like to be handled in the system of this embodiment is an article, the merchandise or the like is not sent by communication. This also applies to S311 indicated by a dotted arrow in FIG. 3.

At the customer terminal 24 of the request who has received the collection slip information, a collection slip containing at least a collection code and the like is generated on the basis of the received information, and expendables with the collection slip attached are sent to the collection center where the collection center system 4 is installed (S311).

At the collection center, the collection code recorded on the collection slip attached to the received waste expendables is read to confirm whether expendables that coincide with the collection data corresponding to the collection code have been collected (S312). For each user and each expendable, the collection result such as the collection ratio and the number of collected expendables is calculated, and an incentive corresponding to the collection result is set. The results are stored in the database (S313). The customer terminal 24 of the requester is notified of the collection ratio and incentive as needed (S314). The incentive is not always given in accordance with the collection ratio. It may be set in accordance with the collection quantity or sales quantity.

The collection slip information generated in the collection center system 4 in S309 in FIG. 3 is transmitted to the customer terminal 24 through the communication line. As another preferred embodiment, the collection center system 4 may receive the collection request, then generate a collection slip containing at least a collection code, and send a collection container with the collection slip attached to a requester 6. The above-described collection system can also be implemented even by causing the requester who has received a collection container to pack in the collection container the expendables whose collection is being requested and to send the collection container to the collection center.

That is, as long as a collection code such as a bar code or an alphanumeric character string, which is used to access information (collection data) related to the type and number (quantity) of expendables to be collected and/or the user, is readably attached or recorded on the expendables to be collected or their package container, the object of the present invention to manage the collection result for each user and manage the incentive based on the collection result for each user can be achieved.

The type and number (quantity) of expendables to be collected, which are indicated by the collection data read out from the storage device are compared with those of the actually collected expendables. If the type or number (quantity) is different, or an unrecyclable expendable such as a recycled article or a product of another maker is present, the collection data is corrected. Subsequently, on the basis of the user's collection data (already confirmed corrected) stored in the storage device and the data of order reception (sales) record from the user, the collection ratio of recyclable expendables and the collection ratio of unrecyclable expendables are calculated. An incentive is set by looking up (or calculating) a separately prepared table on the basis of the calculated collection ratios.

In the series of collection processes in the collection center system 4, in the operation related to confirmation of collected articles in step S312, the data read from the collection code may be manually compared with the actually collected articles. Alternatively, this operation may be automated using image recognition or an apparatus for automatically reading a bar code or the like which contains data such as the type of expendables and is adhered to the expendables in advance. Alternatively, the comparison and recording operation may be done by causing a person to compare the collected articles with a list on which the types of expendables are described and causing an apparatus to read a bar code attached to the list. This will be described in detail as "Processing (2) After Collection".

[Arrangement of Collection System]

FIG. 1 is a block diagram showing the network configuration and connection between the collection center system 4 and the user system 5. FIGS. 23 to 31 are flow charts for explaining the processing of a sales/collection system that operates in the collection center system 4. In this embodiment, a system which executes lump-sum management of sales and collection of expendables will be described. However, a form may also be assumed in which the sales system or collection system 5 is separated from the sales/collection system such that the individual functions are separately achieved.

Each of the personal computer (customer terminal) 24, Web server 13, database (DB) server 14, application (AP) server (also referred to as a collection server) 15, personal computer (PC) 16, and PC 18 shown in FIG. 1 has the same arrangement as that of a general computer including at least a CPU (Central Processing Unit), memory, and communication section. The steps of the flow charts shown in FIGS. 23 to 31 to be described later are executed by causing the CPU arranged in each apparatus to read out and execute program codes stored in the memory. Referring to FIG. 1, the function of the collection center system 4 is distributed to a plurality of server apparatuses. Each step of the flow charts shown in FIGS. 23 to 31 is executed by any one of the servers. As a matter of course, either a physically single apparatus or a plurality of apparatuses can realize the processes in the steps of the flow charts shown in FIGS. 23 to 31 if the apparatus or apparatuses logically have the function of the Web server 13, DB server 14, AP server 15, PC 16, and PC 18.

FIG. 46A is a view showing a record (user table) for each user, which is used in this embodiment and stored in the database server 14. The user table contains the following data:
(a) a customer number 4601 unique to each user
(b) a password 4602 designated by the user
(c) a user name 4603
(d) a user address 4604
(e) a contact address 4605 such as an e-mail address
(f) a type (a plurality of fields as needed) 4606 of the device which is used by the user and uses expendables to be managed in this embodiment
(g) an average collection ratio 4607 of expendables sold to the user
(h) a pointer 4608 to a sales table
(i) a pointer 4609 to a collection table
(j) a pointer 4610 to a collection container table
(k) a pointer 4611 to a collection ratio table
(l) an incentive providing method 4612 selected by the user
(m) a ratio 4613 of recycled articles (recycled article ratio) with respect to the total number of collected expendables
(n) the number 4614 of collected recycled articles
(o) a ratio 4615 of products of other makers (other maker product ratio) to the total number of collected expendables
(p) the number 4616 of collected products of other makers
(q) an incentive (discount rate) 4617 given to the user The sales table, collection table, collection container table, and collection ratio table are tables that correspond to each user and have variable lengths because their sizes can considerably change. FIG. 46B shows the contents of a sales table 4620. The sales table 4620 is a table used to record the date of sales of expendables. When expendables are sold, a model 4621, sales quantity 4622, and sales date 4623 of the sold expendables are recorded on the sales table 4620 in correspondence with the date.

FIG. 46C shows the contents of a collection table 4630. The collection table 4630 is a table used to record the date of collection of waste expendables. When waste expendables are collected, a model 4631, collection quantity 4632, and collection date 4633 of the collected products are recorded on the collection table 4630 in correspondence with the date.

The collection table is updated not only when expendables are collected but also when the user sends a collection request to the collection center. This processing will be described later.

FIG. 46D shows the contents of a lump-sum collection table 4640. The lump-sum collection table 4640 is a table used to record the date of lump-sum collection of waste expendables using a dedicated container. When waste expendables are lump-sum-collected using a collection container, a type 4641 and capacity 4642 of the collected container, and a collection date 4643 are recorded on the lump-sum collection table 4640 in correspondence with the date.

The lump-sum collection table is updated not only when expendables are collected but also when the user sends a lump-sum collection request to the collection center. This processing will be described later.

FIG. 46E shows the contents of a collection ratio table 4650. The collection ratio table 4650 is a table used to record the collection ratio of sold expendables of each product for each user. The collection ratio table 4650 corresponds to a table that is generated on the basis of the sales table 4620 shown in FIG. 46B and the collection table 4630 shown in FIG. 46C. When waste expendables are collected, a type 4651 of the collected expendables and a collection ratio 4652 calculated from the sold quantity and collected quantity of the expendables are recorded on the collection ratio table 4650. In addition to the collection ratio for each type of expendables, the collection ratio irrespective of the expendable type is also recorded in the collection ratio table 4650. The collection ratio irrespective of the expendable type corresponds to information that represents the ratio (or percentage) of the number of collected merchandise items to the total number of merchandise items sold to a predetermined user.

The sales table, collection table, lump-sum collection table, and collection ratio table may have point columns for the respective records to record points every time the tables are updated. In this embodiment, however, the points are not recorded on the tables. Instead, the points are calculated at the time of point calculation by looking up a separately prepared point table. In addition, to employ a discount rate (%) as an incentive providing method, a discount rate table corresponding to the point table is prepared.

Figure 2:
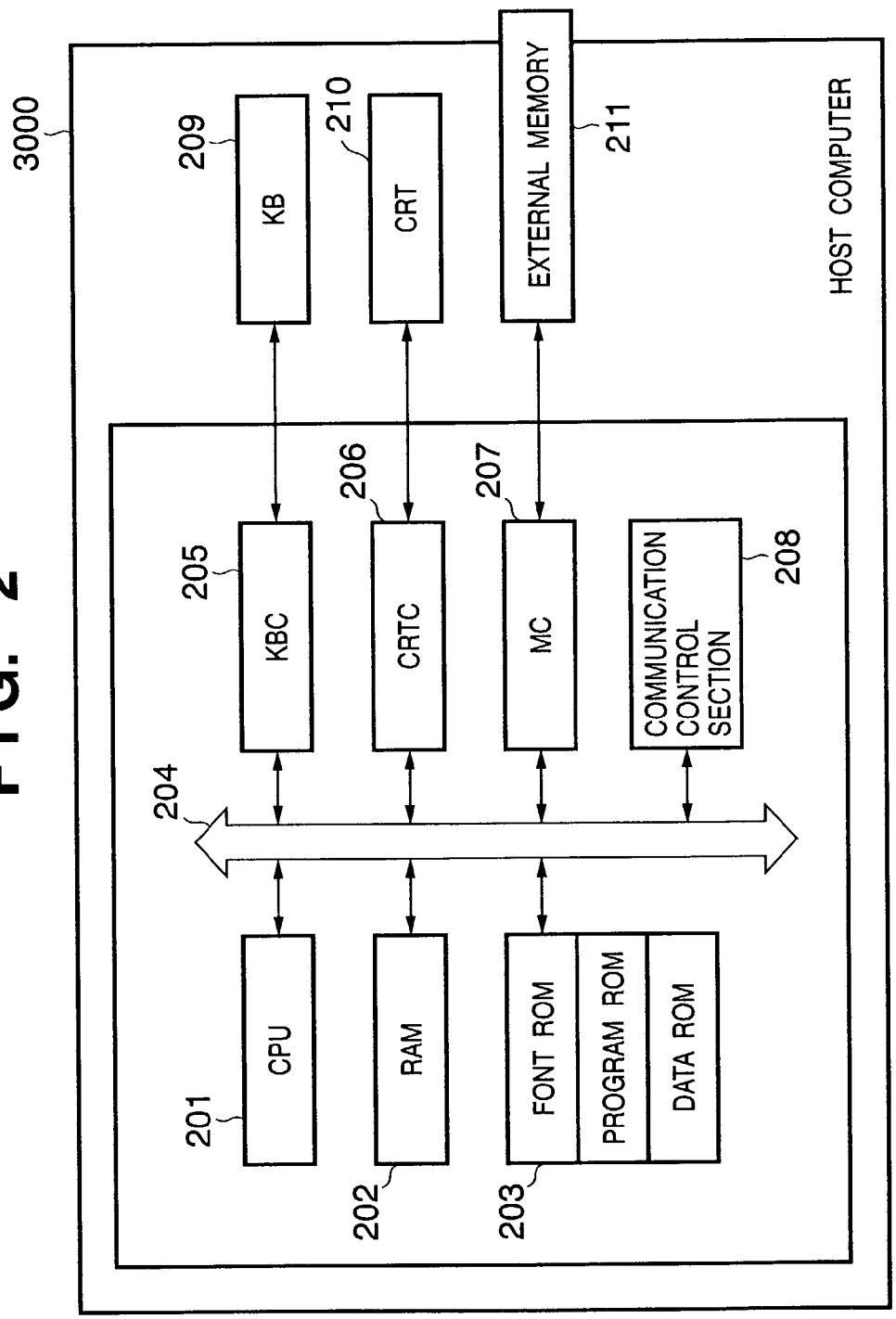
FIG. 2 is a block diagram of a general-purpose computer.

FIG. 2 is a block diagram showing the arrangement of the server or personal computer shown in FIG. 1. Referring to FIG. 2, a computer 3000 has a CPU 201 and executes a program stored in the program ROM of a ROM 203 or in a RAM 202. This program includes the communication control program for a procedure to be described later. When this program is executed, a procedure for controlling transmission of designated data to an external device or reception of data from an external device, and the like are executed. The CPU 201 systematically controls devices connected to a system bus 204. The RAM 202 functions as the main memory and work area of the CPU 201. A keyboard controller (KBC) 205 controls key input from a keyboard 209 or a pointing device (not shown). A CRT controller (CRTC) 206 controls display on a CRT display 210. A disk controller (DKC) 207 controls access to an external memory 211 such as a hard disk (HD) or floppy disk (FD) which stores a boot program, various kinds of applications, font data, user files, edit files (to be described later), and the like. A communication control section 208 is connected to an external network to execute communication control processing with other devices connected to the network.

The contents of processing executed in correspondence with each user operation will be described next with reference to the flow charts and user interface windows.

(1) Login

Figure 23:
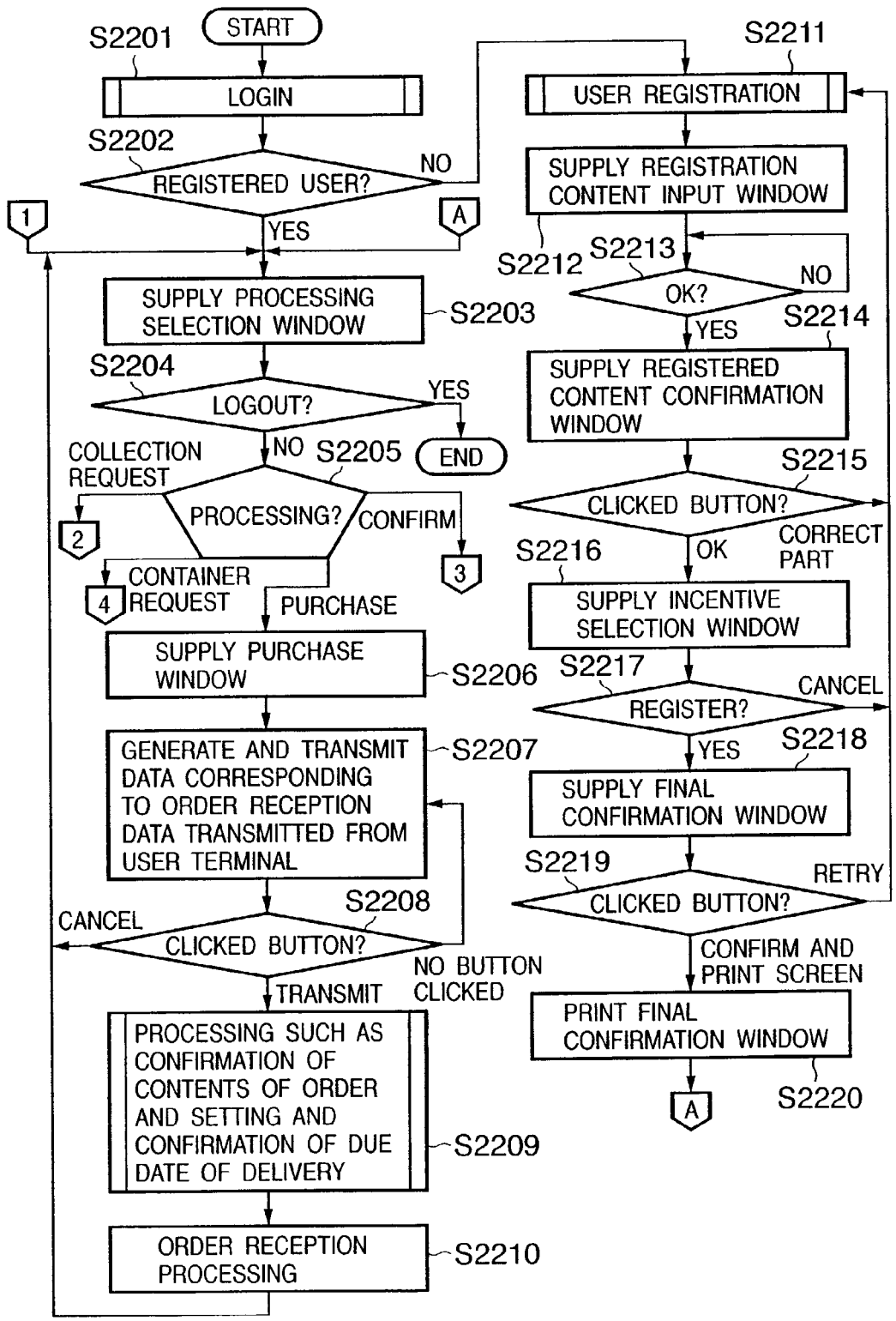
FIG. 23 is a flow chart for explaining the processing of the sales/collection system.

The left side of FIG. 1 shows the collection center system 4. FIG. 23 is a flow chart showing the processing procedure in the PC 24 when the user accesses from the PC 24 to the collection center system 4.

The user accesses the Web server 13 serving as the window of the sales/collection system using the personal computer (PC) 24 through gateways 23 and 12 connected to a wide-area communication network 11 such as the Internet, thereby logging in to the Web server 13 (S2201 in FIG. 23). The Web server 13 supplies the information of the login window shown in FIG. 4 to the PC 24 operated by the user. This can be more precisely expressed as "HTML (Hyper Text Markup Language) data used to display a window is supplied to the PC 24". However, it will be described as "window information is supplied" for the descriptive convenience. The user input at the PC 24 is transmitted to the collection center system 4. Processing corresponding to the input is executed in the collection center system 4. Data is transmitted from the collection center system 4 to the PC 24 as needed. In the following description, however, data transmission from the PC 24 to the collection center system 4 and data transmission from the collection center system 4 to the PC 24 will be omitted. That is, the operations of the PC 24 and collection center system 4 will sometimes be described as if no communication were present therebetween. This is because the communication itself has no characteristic features. For example, when a description indicates that the collection center system 4 operates in accordance with the input at the PC 24, the collection center system 4 and PC 24 actually communicate with each other.

The Web server 13 requests the user to input a "customer number (user code)" 401 and "password" 402 through the PC 24. The Web server 13 receives the input user code and password and transfers them to the application (AP) server 15 where main software of the collection center system 4 runs. The AP server 15 compares the input user code and password with the customer number 4601 and password 4602 contained in user data (FIG. 46A) obtained from the database (DB) server 14, thereby authenticating whether the user is a registered user (S2202 in FIG. 23). If YES in step S2202, information of a processing selection window shown in FIG. 9 is supplied to the PC 24 through the Web server 13 (S2203 in FIG. 23). The window shown in FIG. 9 corresponds to the display window in step S305 in FIG. 3. The user can select a desired menu from this window and input data corresponding to the menu to place an order for merchandise or the like or refer to various data. Processing to be described below is executed for the user record of the authenticated user.

When the user is an unregistered user, user registration can be performed by clicking on a [register] button 403 on the window shown in FIG. 4 (S2211 in FIG. 23).

When the user clicks on the [register] button 403 on the window shown in FIG. 4, the AP server 15 accordingly supplies information of the registration window shown in FIG. 5 to the PC 24 (S2212 in FIG. 23). The user inputs necessary matters such as the name of a person in charge for a corporation, postal code, address, telephone number, facsimile number, e-mail address, and use device. When the user clicks on the [OK] button on the window shown in FIG. 5 after he/she has input the necessary information (S2213), the AP server 15 supplies information of the input content confirmation window shown in FIG. 6 to the PC 24 (S2214 in FIG. 23).

If the user wants to correct some items, the registration window shown in FIG. 5 can be displayed again to re-input the information by clicking on a [correct part] button 601 on the window shown in FIG. 6 (S2215 in FIG. 23).

If the input contents have no problem, the user clicks on an [OK] button 602 on the window shown in FIG. 6. Then, the AP server 15 supplies to the PC 24 information of the selection window shown in FIG. 7, which makes the user to select an incentive providing method (S2216 in FIG. 23). The user can select a desired incentive providing method on the window. To assist user selection, another window may be opened to explain each choice. For example, the following subsidiary explanation may be made. However, the explanation need not always be limited to these specific contents.

"(1) "Apply a Discount Rate (%) Corresponding to the Sales/Collection Result for Each Use"

Every time you ask us to sell or collect articles, we average discount rates calculated for products on the basis of the past result, including the transaction of this time, and set an average discount rate for you. The discount rate is applied to the next purchase of merchandise. You can easily receive the price advantage on average because the discount rate is updated every time a purchase or collection occurs.

(2) "Accumulate Points and Use Them for a Purchase of Merchandise"

Points for a purchase and collection are set for each product, and the points are accumulated. You can partially or totally pay the purchase amount using the points. As the basic amount, one point equals XXX yen. The amount may be increased during a campaign or the like (or the basic amount may be changed in accordance with a change in environment in the future). This method can be recommended to users who have a relatively small transaction quantity or individual users.

(3) "Accumulate Points and Receive Cash at Predetermined Amount"

The standard and scheme of point accumulation are the same as in (2). When the accumulated points have reached a predetermined value, you can receive cash back, though the exchange standard amount is smaller than (2)."

When the user selects one of the choices by checking a check box 701 on the window shown in FIG. 7 and then clicks on a [register] button 702, these pieces of information are transmitted to the collection center system 4 and stored in the incentive providing method field 4612, shown in FIG. 46A, in the DB server 14. The AP server 15 issues the user code and password and also supplies information of the final confirmation window shown in FIG. 8 to the PC 24 (S2218 in FIG. 23).

When the user clicks on a [confirm and print screen] button 801 on the window shown in FIG. 8, which is displayed on the PC 24 (S2219), the contents displayed on the final confirmation window shown in FIG. 8 are printed by the printer connected to the PC 24 (S2220 in FIG. 23).

If the user wants to correct the contents on the window shown in FIG. 8, the registration window shown in FIG. 5 can be displayed again to re-input the matters by clicking on a [retry] button 802 on the window shown in FIG. 8 (S2212 in FIG. 23).

The issue of the user code and password to the user may be done on the final confirmation window shown in FIG. 8 or by e-mail or mail.

(2) Sales of Expendables

When the user is authenticated, information of the window shown in FIG. 9 is transmitted to the PC 24, and the window is displayed.

When [purchase expendables] 901 is clicked on through the window shown in FIG. 9, which is displayed on the PC 24 (customer terminal), a signal indicating it is transmitted to the Web server 13 through the communication line. When the signal is supplied to the AP server 15, it recognizes the contents of the input instruction (S2205 in FIG. 23). When the instruction is "purchase expendables", the AP server 15 supplies information of the expendable purchase window shown in FIG. 10 to the PC 24 through the Web server 13 (S2206 in FIG. 23). The user selects the models of expendables to be purchased from the merchandise items (expendables) displayed on the window and inputs their quantities to the PC 24.

FIG. 10 shows an example in which cartridge models "CRG-1" and "CRG-2" are input to the PC 24 and displayed on the display section. The AP server 15 acquires from the DB server 14 the unit price corresponding to each input model and the discount rate for the total amount in accordance with the information received from the PC 24, and transmits the acquired information to the PC 24. Hence, the unit prices and discount rate are displayed on the sales window in real time (S2207 in FIG. 23). For a user who has selected "accumulate points and use them as a discount for a purchase of merchandise" through the window shown in FIG. 7, the accumulated point is displayed in place of "discount rate 2%" in FIG. 10. The unit price corresponding to each input model and the discount rate corresponding to each model may be acquired from the DB server 14. Note that the discount rate includes the incentive corresponding to the login user, which is registered in the AP server 15 through the above-described window shown in FIG. 7.

The user inputs quantities 1001 of the desired merchandise items on the window shown in FIG. 10 and confirms the charge amount. If correction is necessary, the user does it and then clicks on a [transmit] button 1002 shown in FIG. 10. The collection center system 4 receives the [transmit] button click signal through a predetermined communication line (transmit in S2208 in FIG. 23), thus ending order for expendables (S2209 in FIG. 23). After that, the AP server 15 confirms the contents of the order, sets and confirms the due date of delivery (S2209 in FIG. 23) and executes sales processing (order reception processing: S2210 in FIG. 23) including the sales result for each customer. These processes are not directly related to the present invention, and a detailed description thereof will be omitted.

In step S2209, sales data containing the types and quantities of ordered merchandise items is accumulated in the database server 14 for each user. The database to be updated is the sales table 4620 shown in FIG. 46B. A new record is added to the sales table 4620. As the record, the current date is recorded in the sales date field 4623, and the models and quantities of the sold articles are recorded in the model field 4621 and quantity field 4622, respectively. If a single user has made a purchase of products of the same model in one day, the quantity in an existing corresponding record may be updated instead of generating a new record. The accumulated sales data is used to calculate the incentive by looking up conversion tables shown in FIGS. 33 to 36 (to be described later).

The processing returns to step S2203. The information of the processing selection window shown in FIG. 9 is supplied to the PC 24 through the Web server 13 again. When the desired processing is ended, the user clicks on a [logout] button 905 to log out (YES in S2204 in FIG. 23).

(3) Collection Request

When the user instructs [request collection of waste expendables] 902 through the window shown in FIG. 9, which is displayed at the PC 24 (customer terminal), a signal representing the instruction is transmitted to the Web server 13 through a predetermined communication line. When the signal is supplied to the AP server 15, it recognizes the contents of the input instruction (collection request in S2205 in FIG. 23). When the instruction is "collection of waste expendables", the AP server 15 supplies information of the collection method selection window shown in FIG. 11 to the PC 24 through the Web server 13 (S2301 in FIG. 24). The user can select a desired method from lump-sum collection 1101 and separate collection 1102 on the window. When the user selects one of the collection methods, a signal that designates lump-sum collection or separate collection is input to the PC 24 in accordance with the selection. The information representing the selection result is transmitted from the customer terminal to the AP server 15 through the Web server 13 of the collection center. The AP server 15 has a recognition function for recognizing whether the user has selected lump-sum collection or separate collection. The AP server 15 recognizes the information representing that the user has selected lump-sum collection or separate collection (S2302 in FIG. 24) and provides information of a window corresponding to the selection to the user through the Web server 13 (S2303 and S2312).

When lump-sum collection is selected, the AP server 15 transmits to the PC 24 window information used to select a collection container (S2303).

FIG. 12 shows a window that is supplied in step S2303 and displayed on the display section of the PC 24 when the user desires lump-sum collection. The user who desires lump-sum collection designates a type 1201 and quantity 1202 of collection containers for storing waste expendables on the window shown in FIG. 12. Referring to FIG. 12, two kinds of collection containers, i.e., collection containers for four pieces or those for eight pieces can be selected. After input, when the user clicks on a [transmit] button 1203, the input information is transmitted from the customer terminal to the AP server 15 through the Web server 13 of the collection center. The AP server 15 receives the information and temporarily stores it (step S2304). The collection center sends collection containers to the requester in accordance with the type and quantity of collection containers received at this time. In addition, the kind of collection containers is not limited to two kinds.

When the collection container is designated, the AP server 15 transmits window information (FIG. 13) to cause the customer terminal to designate the model and quantity of expendables to be collected (S2305). The requester selects a model 1301 and quantity 1302 on the display window at the customer terminal and then clicks on a "transmit" button 1303.

The AP server 15 determines whether the pieces of information of the model and quantity of the expendables are received (S2306). If YES in step S2306, the capacity of the collection container stored in step S2304 is compared with the quantity of the expendables received in step S2306 (S2307). If they equal, the collection information, i.e., the received model and quantity of the expendables are stored in the DB server 14 in association with the user (the user is associated with, e.g., the login information) of the customer terminal 24 (S2310).

The database to be updated at this time is the collection table 4630 shown in FIG. 46C. A new record is added to the collection table 4630. As the record, the current date is recorded in the collection date field 4633, and the models and quantities of expendables to be collected are recorded in the model field 4631 and quantity field 4632, respectively.

In the example shown in FIG. 13, the AP server 15 shown in FIG. 1 stores "CRG-1, 2" and "CRG-3, 2" in the DB server 14 shown in FIG. 1 as collection data of designated expendables in association with the user (the user is associated with, e.g., the login information) of the customer terminal 24. Note that "2" corresponding to the models indicate the quantities of the expendables CRG-1 and CRG-3 that should be placed in the collection containers. In this case, information representing "lump-sum collection" is also stored in the database because "lump-sum collection" is handled as a condition for the incentive.

The database to be updated at this time is the lump-sum collection table 4640 shown in FIG. 46D. A new record is added to the lump-sum collection table 4640. As the record, the current date is recorded in the collection date field 4643, and the types and quantities of designated containers are recorded in the type field 4641 and quantity field 4642, respectively.

On the other hand, if the capacity of the container does not match the designated quantity of expendables, information for displaying a warning window is transmitted to the customer terminal in step S2308. FIG. 14 shows the warning window. To retry the collection request, the requester clicks on a "yes" button 1401 on the window shown in FIG. 14. In that case, information representing that the "yes" button is pressed is transmitted to the AP server 15, and the above-described processing is repeated again from step S2301.

To continue the collection request, the requester clicks on a "no" button 1402. In that case, information representing that the "no" button is pressed is transmitted to the AP server 15. The AP server 15 stores the collection information received in step S2306 in the database server 14 in association with the user information (S2310). In this case, control is performed not to store information representing "lump-sum collection" in the database as information for incentive calculation because "lump-sum collection" is not handled as a condition for the incentive. At this time, the lump-sum collection table 4640 is not updated. However, the collection table 4630 is updated like when the lump-sum collection is recognized.

The AP server 15 shown in FIG. 1 makes a preparation to send a collection container corresponding to the selected expendables to the user (S2311). More specifically, a printer 19 shown in FIG. 1 prints an invoice and the above-described collection slip, and a collection container to which the collection slip is attached is sent to the user in accordance with the invoice. In addition, a notification that instructs delivery in another form is transmitted to an information processing apparatus installed in a facility that is in charge of collection container delivery service (S2311). In accordance with the notification, the collection container is actually delivered to the user.

The user stores waste expendables in the delivered collection container and requests collection of the collection center.

A case wherein the user desires lump-sum collection has been described above. If the user who has logged in is a customer with a large transaction, such as a dealer, the window corresponding to lump-sum collection shown in FIG. 13 may be directly displayed after the user clicks on the [request collection of waste expendables] on the window shown in FIG. 9. This reduces the load on the requester side. To do this, the pieces of customer information including the "customer number" and "password" corresponding to the dealer are stored in the DB server 14 in advance in correspondence with a flag (information) for direct display of the lump-sum collection request. When the flag stored in correspondence with the customer information of the user who has logged in is referred to, and it is confirmed that setting has been done to display the lump-sum collection request window, control for directly displaying the lump-sum collection request is realized.

On the other hand, when separate collection is selected, the AP server 15 transmits to the PC 24 window information used to select expendables to be collected (S2312).

FIG. 15 shows window information supplied (displayed) from the AP server 15 to the PC 24 in step S2312 when the PC 24 has notified the AP server that the user desires separate collection. The user selects a model 1501 of expendables for which separate collection is requested, inputs a quantity 1502 and desired collection date 1503, and then clicks on a [transmit] button 1504. The AP server 15 shown in FIG. 1 receives "CRG-1, 1", "CRG-1, 1", "CRG-1, 1", and "CRG-3, 1" as collection information (S2313) and stores the information in the DB server 14 shown in FIG. 1 in association with the user (S2314). At this time, the lump-sum collection table 4640 is not updated. However, the collection table 4630 is updated as in the case of lump-sum collection.

In addition, the AP server 15 searches for a collectable date close to the desired collection date on the basis of data in the DB server 14. If the desired collection date does not match the collectable date, the AP server 15 executes a procedure for, e.g., transmitting a list of collectable dates close to the desired collection date to the PC 24 and causing the user to select a date, thereby determining the collection date. The database server 14 stores a collection schedule in which, e.g., addresses for collection are listed in the order of dates. It is determined on the basis of the collection schedule whether collection is possible at the input desired collection date. If it is impossible, it is determined when collection is possible. A detailed description of this procedure will be omitted.

When the expected collection date is determined, the AP server 15 shown in FIG. 1 transmits to the PC 24 collection slip data to make the user print the above-described collection slip (S2315). When this collection slip data is formed from HTML data and GIF (Graphics Interchange Format) image, which are displayable on a browser, the collection slip can be printed by a printer 22 or 25 using the browser that runs on the PC 24. However, if printing at a high resolution is necessary because the collection data is represented as a bar code or the like, the collection slip data is preferably sent to the PC 24 as, e.g., PDF (Portable Document Format) data and printed. The above procedure assumes that the user has a printing output apparatus. If the user has no printing output apparatus, the collection center system 4 can provide a selection window to the PC 24 to make the user select the collection slip acquisition method so that the user can select whether the collection slip data should be transmitted through the Internet or a collection slip prepared on the collection center side should be sent to the user by mail. The user's selection on the selection window is transmitted to the AP server 15. The AP server 15 recognizes the user's selection and causes the user to acquire the collection slip by any one of the methods in accordance with the recognition.

After that, the processing returns to step S2203 in FIG. 23, and the processing selection window shown in FIG. 9 is supplied to the PC 24 through the Web server 13 again. When the desired processing is ended, the user clicks on the [logout] button 905 to log out (S2204).

FIG. 16 is a view showing the collection slip printed on the collection center side or on the user side in correspondence with the collection request shown in FIG. 15. In the example shown in FIG. 15, the center is requested to collect three cartridges CRG-1 and one cartridge CRG-3. Hence, in FIG. 16, three collection slips for CRG-1 and one collection slip for CRG-1 are printed. When the user side should print collection slips, it is effective for printing of the collection slips to contain A4 printing paper sheets having reverse surfaces applied with an adhesive in the package cases of expendables. The printing paper size is not limited to A4. Any other printing paper size such as B4 or A5 can be used as long as the printer can output it.

On each collection slip, the type and collection code of the collection article, the address and name of the user (sender) who has requested collection, the request reception date, the expected collection date, and the like are described. These are generated on the basis of FIGS. 46A, 46C, and 46D. The collection code contains at least information capable of specifying the registered user (user name, user code, or the like). The collection code may also contain pieces of information that specify the user address, collection request reception date, expected collection date, and the type and quantity of collection articles (waste expendables), and the like. For lump-sum collection, the collection code also contains information that specifies the type and quantity of containers. The pieces of information indicated on the collection slip issued (generated) by the collection center system 4 are used to efficiently manage the collection result of each user when the collection articles are actually collected to the collection center or an agency that is in charge of collection service. How to use the collection slip will be described not here but later in more detail.

The user separates the printed collection slips and appropriately sticks the separated collection slips to the expendables to be collected or their package cases. Thus, preparation for separate collection is completed.

In the above description, the contents of collection slips are determined assuming that the collection center prepares a transportation means for collection. In this case, the waste expendables can be collected by effectively using the transportation means which is also used to delivery expendables. The method of transporting the waste expendables is not limited to this, as a matter of course.

As described above, since the user notifies, through the PC 24, the management server such as the DB server 14 in the collection center system 4 in advance of the expendables to be collected, the management server can make a detailed operation plan related to collection in advance.

(4) Request of Collection Container

The user can also request delivery of collection containers independently of the collection request for waste expendables. In this case, when "request collection containers" 903 shown in FIG. 9 is selected from the customer terminal 24, information representing it is transmitted to the AP server 15. The AP server 15 determines "container request" in step S2205 in FIG. 23 and executes the procedure shown in FIG. 26.

Figure 26:
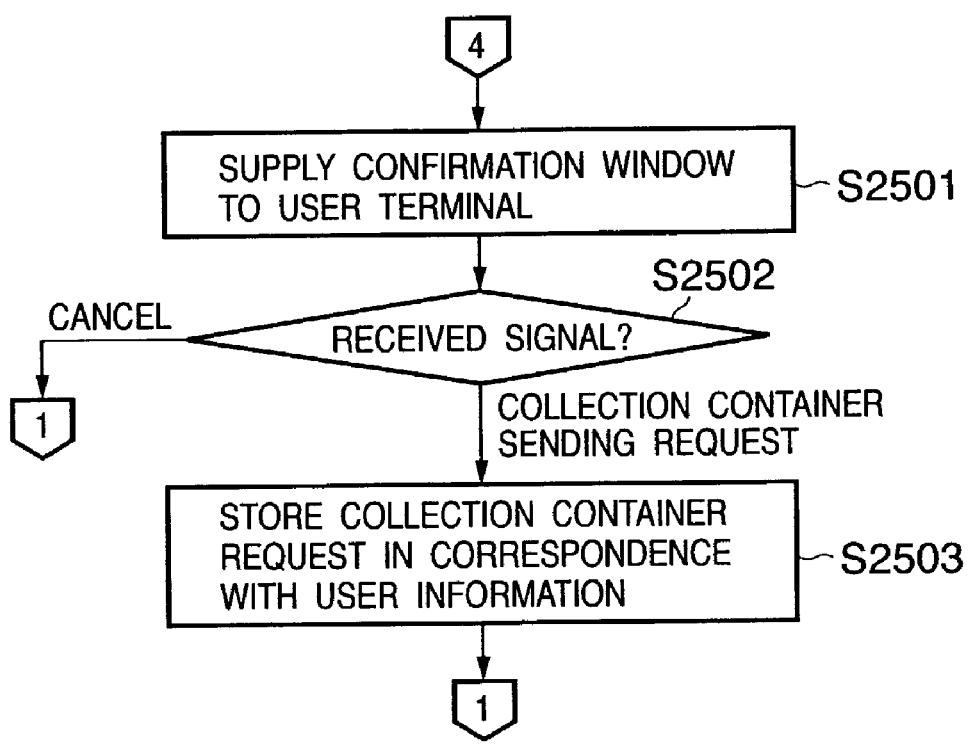
FIG. 26 is a flow chart for explaining collection container request processing in an AP server.

Referring to FIG. 26, the AP server 15 transmits window information for collection container order confirmation shown in FIG. 12 to the customer terminal (S2501). The window for order confirmation is displayed on the PC 24. When the requester inputs the type 1201 and quantity 1202 of collection containers and clicks on the [transmit] button 1203, the input information is transmitted to the AP server 15. In step S2502, the AP server 15 determines the received data. If the received information represents the type and quantity of collection containers, collection container information containing the type and quantity of collection containers is stored in the database server 14 in correspondence with the user information of the requester in step S2502. This operation is done in accordance with the same procedure as that used to update the lump-sum collection table 4640 in the above-described lump-sum collection procedure. Then, the flow returns to step S2203 in FIG. 23. After that, the collection center sends the requested collection containers to the requester. The collection containers have the indicator of a collection code containing user information that specifies the requester.

Figure 24:
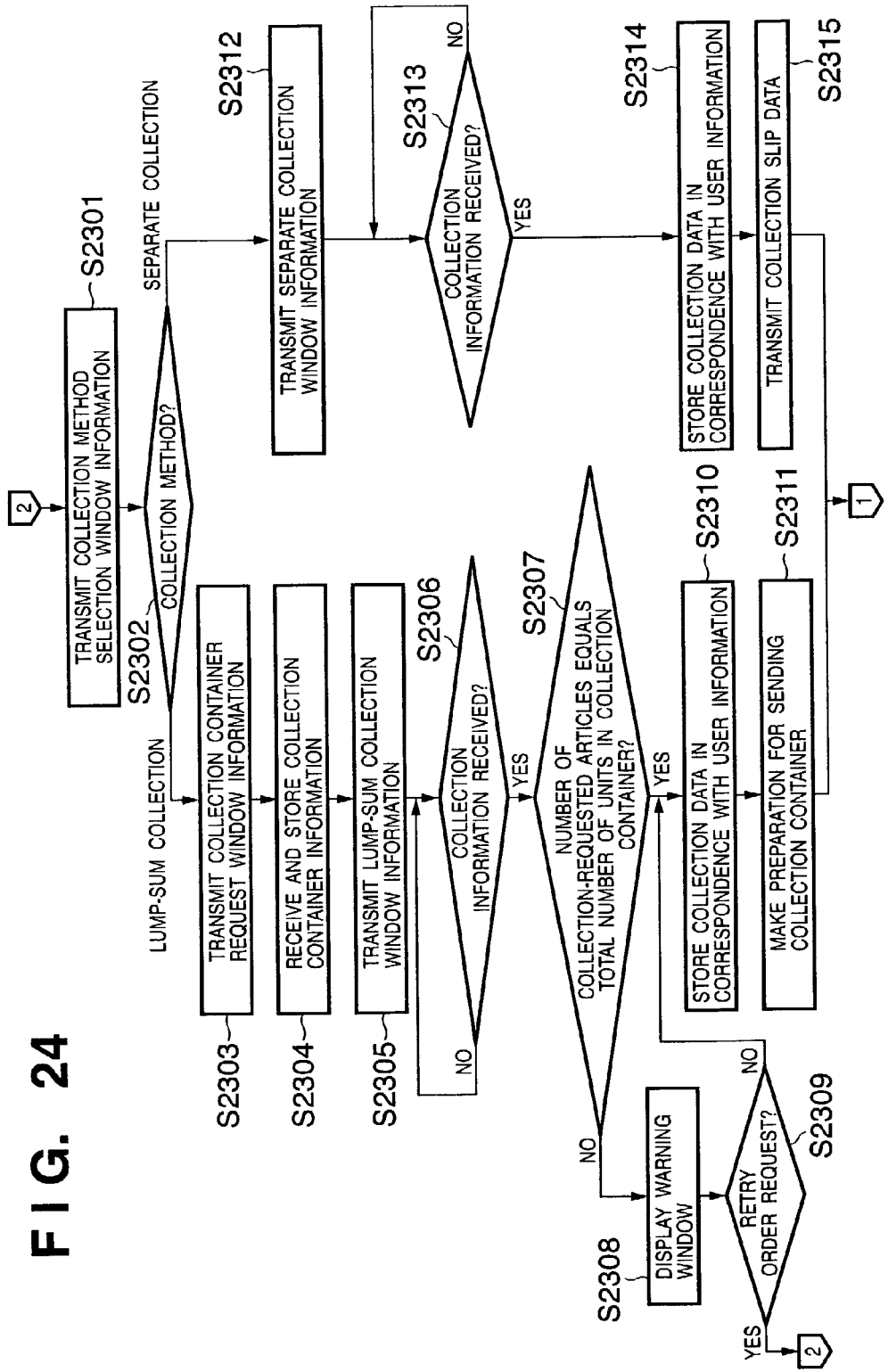
FIG. 24 is a flow chart for explaining the processing of the sales/collection system.

When collection containers may be sent to the user in advance in the above-described manner, no container request may be necessary in the procedure of lump-sum collection of expendables. Hence, when [request collection of waste expendables] shown in FIG. 9 is selected by the user, a button for skipping input on the window shown in FIG. 12 may be added to the window shown in FIG. 12. When the "skip" button is selected, steps S2304 and S2307 in FIG. 24 are skipped. For this reason, when input in FIG. 12 is skipped, the warning window shown in FIG. 14 is not displayed at the customer terminal.

(5) Confirmation of Incentive or the Like

When [confirm collection ratio and incentive] 904 is selected on the window shown in FIG. 9, which is displayed on the display section of the customer terminal 24, the Web server receives information representing the selection through the communication line (S2205). Upon receiving the information, the AP server 15 shown in FIG. 1 recognizes that the [confirm collection ratio and incentive] is selected ("confirm" in step S2205). The AP server 15 obtains the discount amount and discount rate corresponding to the user who is logging in from collection data and sales date accumulated in the database server 14. The obtained data are edited into a display window, transmitted to the customer terminal, and displayed (step S2401 in FIG. 25).

For example, a bonus point (collection ratio bonus point) corresponding to the discount rate or collection ratio in the future is calculated for the collection ratio accumulated in the database. In addition, a collection point given every time expendables are collected, a sales point every time expendables are sold, and a lump-sum collection bonus point given for lump-sum collection, which are also accumulated in the database server 14, are read out from the database, and the total point is calculated as needed. For example, the types and quantities of expendables or collection containers are stored in the sales table 4620, collection table 4630, and lump-sum collection table 4640. A point table prepared for each table is searched for each type of expendables or containers in each record of each table, thereby obtaining a point per unit quantity. The obtained point is multiplied by the quantity, and the results of all records are integrated to obtain the sum of points. These points are converted into an amount by looking up the tables shown in FIGS. 40 and 41, and the amount is presented to the user as the discount amount. FIG. 17 shows an example.

Note that calculation of the point and incentive is done even after expendables are collected. The calculation processing is common to both the point and the incentive. The calculation procedure will be described in the description of processing after collection.

The AP server 15 generates informant of the confirmation window shown in FIG. 17 on the basis of the information of the calculated point. The AP server 15 supplies the confirmation window shown in FIG. 17 to the PC 24 through the Web server 13 shown in FIG. 1 (S2401 in FIG. 25). The window shown in FIG. 17 contains (1) user identifier, (2) total point acquired by the user, (3) sales point, collection point, collection ratio bonus point, and lump-sum collection bonus point as the items of the total point, and (4) incentive obtained from the acquired point and its items.

To confirm the detailed incentive, i.e., points acquired by the user, he/she clicks on a desired one of a [details of sales point] button 1701, [details of collection point] button 1702, [details of collection ratio bonus point] button 1703, and [details of lump-sum collection bonus point] button 1704, which are arranged on the lower side of the window shown in FIG. 17 to display details. When one of these buttons is clicked on ("details" in S2402 in FIG. 25), the AP server 15 supplies information of one of the detail window shown in FIGS. 18 to 21 to the PC 24 through the Web server 13 (S2404 in FIG. 25).

FIG. 18 is a view showing a window transmitted from the AP server 15 to the customer terminal 24 and displayed at the customer terminal when the [to details of sales point] button 1701 is clicked on. On this window, the particulars of the sales point "76,300" displayed in FIG. 17 are displayed for each type of expendables together with the sales quantity, sales date, point per unit quantity, and the like. "Subject of campaign" is an item representing whether expendables are the "subject of purchase campaign" shown in FIG. 36. The data of the display contents are obtained on the basis of the sales data accumulated in step S2209 in FIG. 23. In addition, a "return" button for displaying the window shown in FIG. 17 again and buttons for displaying other detail window are also displayed.

FIG. 19 is a view showing a window transmitted from the AP server 15 to the customer terminal 24 and displayed at the customer terminal when the [to details of collection point] button 1702 is clicked on. On this window, the particulars of the collection point "26,320" displayed in FIG. 17 are displayed for each type of expendables together with the collection quantity, collection date, point per unit quantity, and the like. "Subject of campaign" is an item representing whether expendables are the "subject of collection campaign" shown in FIG. 37. The data of the display contents are obtained on the basis of the collection data accumulated in steps S2311 and S2314 in FIG. 24 and corrected in step S83 in FIG. 27. On the window shown in FIG. 19, a "return" button for displaying the window shown in FIG. 17 again and buttons for displaying other detail window are also displayed.

FIG. 20 is a view showing a window transmitted from the AP server 15 to the customer terminal 24 and displayed at the customer terminal when the [to details of collection ratio bonus point] button 1703 is clicked on. On this window, the collection ratio (70% in FIG. 20) as the base of the collection ratio bonus point "4,000" displayed in FIG. 17 is displayed together with the particulars of collected expendables. The data of the display contents are obtained on the basis of the collection data accumulated in steps S2311 and S2314 in FIG. 24 and corrected in step S83 in FIG. 27. On the window shown in FIG. 20, a "return" button for displaying the window shown in FIG. 17 again and buttons for displaying other detail window are also displayed.

FIG. 21 is a view showing a window transmitted from the AP server 15 to the customer terminal 24 and displayed at the customer terminal when the [to details of lump-sum collection bonus point] button is clicked on. On this window, the particulars of the lump-sum collection bonus point "40,000" displayed in FIG. 17 are displayed for each type of collection containers of expendables together with the quantity, collection date, container point per unit quantity, and the like. The data of the display contents are obtained on the basis of the lump-sum collection data such as the quantity of containers, which is contained in the collection data accumulated in step S2314 in FIG. 24 and corrected in step S83 in FIG. 27. On the window shown in FIG. 21, a "return" button for displaying the window shown in FIG. 17 again and buttons for displaying other detail window are also displayed.

Figure 25:
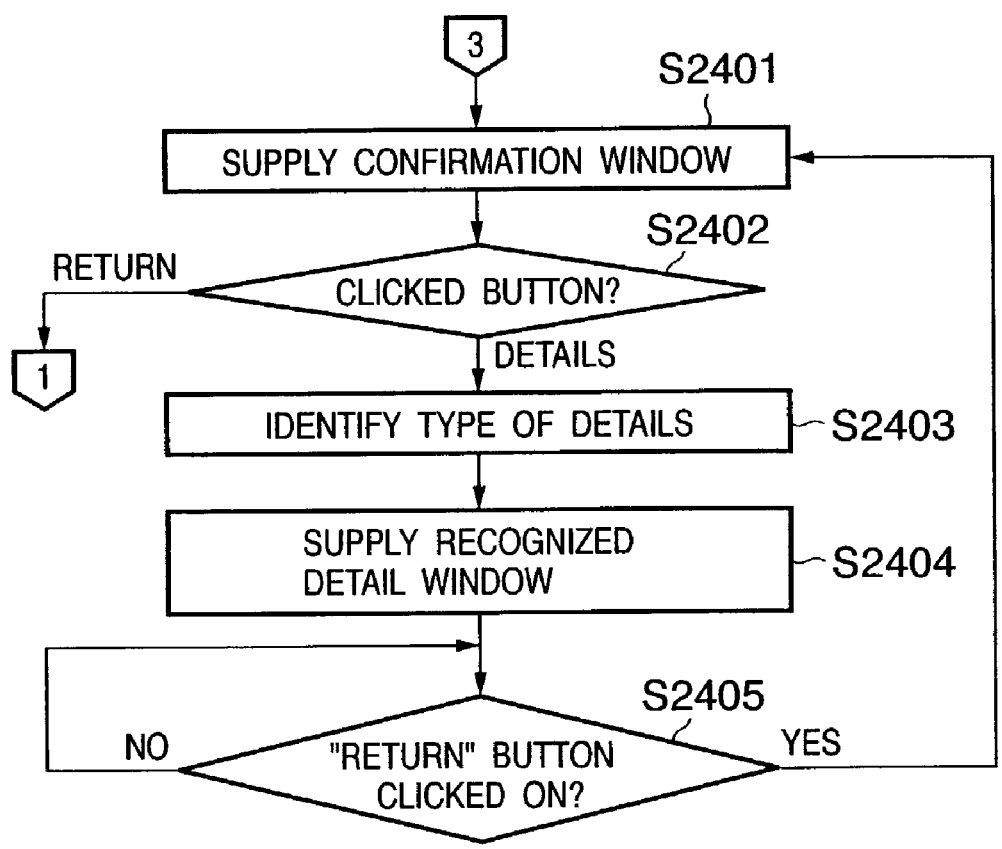
FIG. 25 is a flow chart for explaining the processing of the sales/collection system.

In the windows shown in FIGS. 18 to 21, when the "return" button is clicked on, the flow returns to step S2401 in FIG. 25, and the window shown in FIG. 17 is supplied from the server to the customer terminal and displayed.

When the "return" button is clicked on in the window shown in FIG. 17, the processing returns to step S2203 in FIG. 23, and the information of the processing selection window shown in FIG. 9 is supplied to the PC 24 through the Web server 13 again. When the desired processing is ended, the user clicks on the [logout] button to log out (S2205).

The incentives (points) displayed on the windows shown in FIGS. 17 to 21 are determined on the basis of the collection data managed by the database server 14 shown in FIG. 42 (to be described later). These tables will be described later. The collection data is accumulated in the database server 14 in accordance with the procedure shown in FIGS. 27 to 31, which is executed by the AP server 15. Note that the AP server 15 also serves as a computer for executing the program for processing the collection data. For this reason, the AP server 15 will be sometimes called a collection server in the description of operation processing in the collection center.

In the above way, the total point acquired and its items are displayed on the confirmation window shown in FIG. 17. In addition, the quantity, collection ratio, point, and the like of each type of expendables that are actually purchased by the user are displayed on the detail windows shown in FIGS. 18 to 21.

Note that the points are determined on the basis of the collection result (FIGS. 46B, 46C, 46D, and 46E) of each user, which is managed by the database server 14, and the tables shown in FIGS. 36, 37, 38, and 39 (to be described later). In addition, the incentive to be actually given to the user, such as the discount amount, is determined from the points on the basis of the tables shown in FIGS. 40 and 41. The tables used to determine the points for the collection result will be described later in detail. The collection result is managed in accordance with the processing procedure by the AP server 15 shown in FIGS. 26, 27, 28, 29, and 30.

This embodiment may employ a procedure of directly calculating the incentive such as the discount rate using the tables shown in FIGS. 32, 33, 34, and 35 instead of obtaining the points.

[Processing after Collection (1)]

Figure 27:
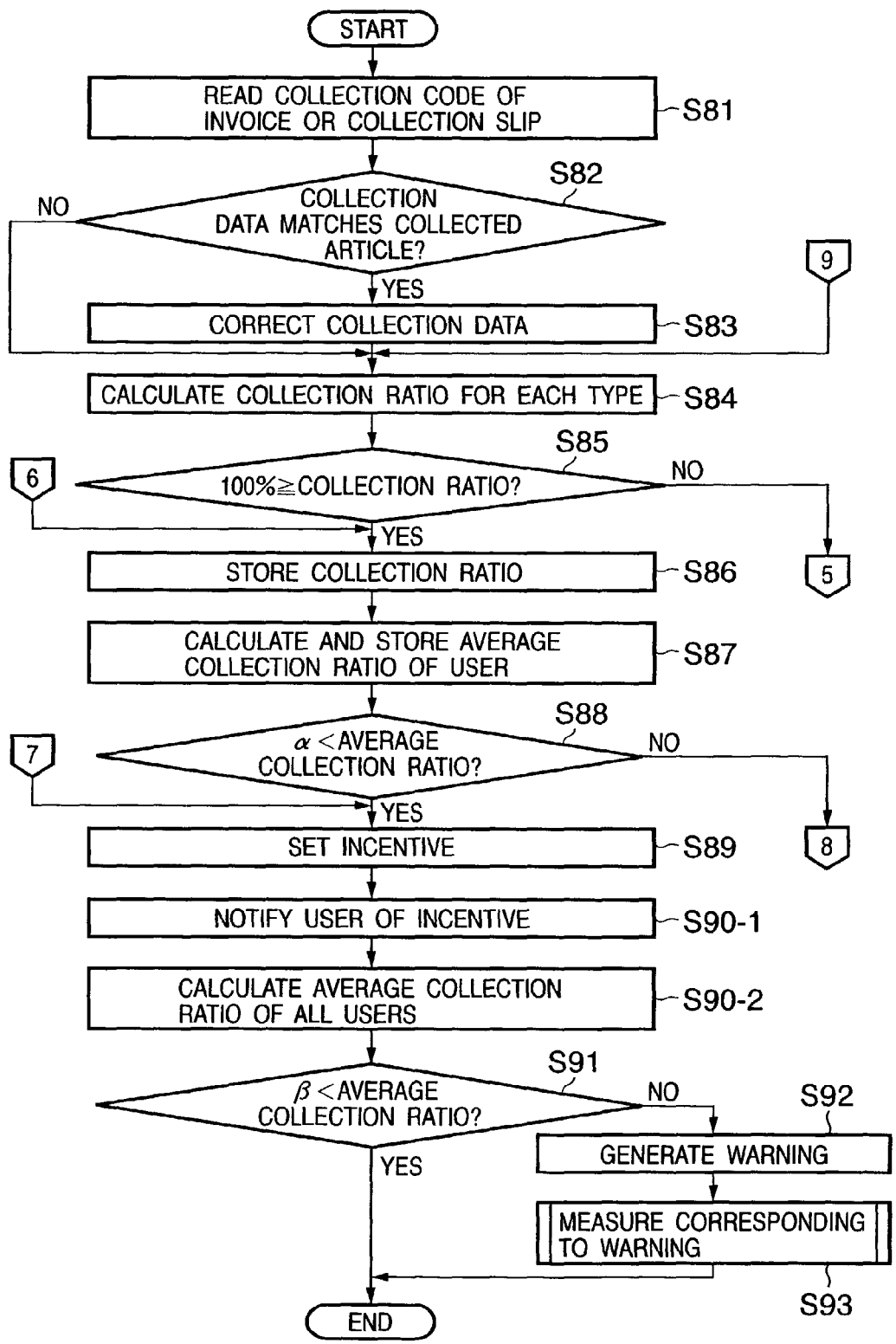
FIG. 27 is a flow chart showing the processing of the collection system after waste expendables have arrived.

FIG. 27 is a flow chart showing the processing of the collection server (AP server) 15 shown in FIG. 3 after waste expendables have arrived. The processing of each step shown in FIG. 27 is implemented by causing the CPU arranged in the collection server apparatus 15 to execute processing based on program codes stored in the nonvolatile memory in the collection server apparatus 15 installed in the collection center. The collection server apparatus is assumed to be the same as the AP server 15. However, one of the Web server 13, DB server 14, and PCs 16 and 18 may be used. Alternatively, a single server apparatus logically having the functions of the Web server 13, DB server 14, AP server 15, and PC 16 may be used. A server that can access the DB server 14 may be separately prepared.

Figure 28:
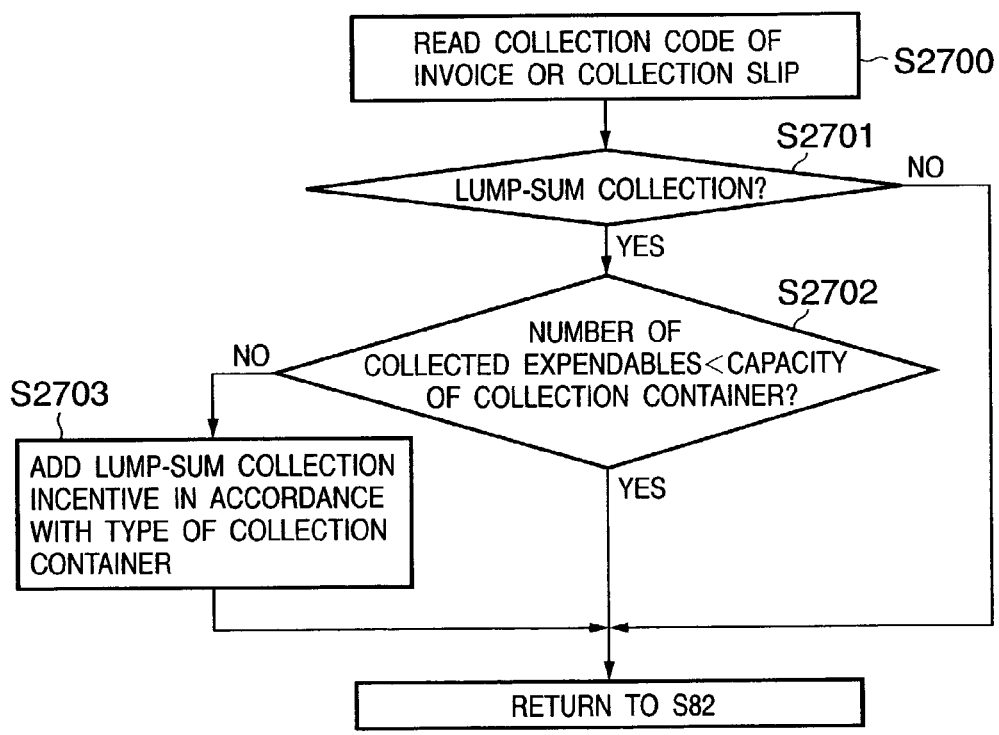
FIG. 28 is a flow chart showing processing in reading collection slips after waste expendables have arrived.

When waste expendables have arrived at the collection center, the collection code recorded on each collection slip is read (S81) and input to the AP server 15. If the collection code is a bar code, it is read by a reader 17 connected to the PC 16 shown in FIG. 1, and the data is sent to the AP server 15. FIG. 28 shows details of step S81. In step S81, the collection code attached to the collection container is read (S2700). In accordance with information representing lump-sum collection, which contained in the read collection code, it is determined whether it is lump-sum collection (step S2701). If YES in step S2701, processing of causing the server to recognize whether the actual number of collected expendables is smaller than the capacity of the collection container is executed in step S2702. In step S2702, an operator in the collection center visually confirms and determines, and input YES/NO to the server from a keyboard or the like. In this case, an image which prompts the operator to confirm is displayed on the window of the PC 16. Alternatively, Yes/No is determined in accordance with a signal of determination result by image recognition.

When the number of collected expendables is equal to or larger than the capacity of the collection container, a lump-sum collection is added in accordance with the type of collection container in step S2703. The lump-sum collection point is added to a table, which registers a point for each collection container in correspondence with each user and is managed by the database server 15, and managed.

When the collection code is read in step S81, and the processing in FIG. 28 is ended, the AP server 15 reads out collection data (also called collection information in this embodiment) corresponding to the input collection code from the DB server 14 and supplies the collection data to the PC 16 or 18. Pieces of information represented by the collection data, including the user name, request date, expected collection date, region, and the type and quantity of articles to be collected, are displayed on the screen of the PC 16 or 18. The operator can easily determine in step S82 whether the collection data matches the actually collected articles while seeing the screen. The operation of confirming the contents of collected articles may be either manually executed or by using image recognition or an apparatus for automatically reading, e.g., a bar code which sticks to the expendable to describe data related to the expendable.

If the collection data does to match the collected articles, the collection data is corrected (S83). Correction is done by, e.g., input by the operator. Finally, the collected articles are classified into (1) recyclable expendables, (2) unrecyclable expendables, and (3) unrecyclable expendables of products of other makers. The expendables (1) and (2) are further classified into types. For the descriptive convenience, these expendables will be described below as (1) valid collected articles, (2) recycled articles, and (3) other maker products.

Next, the AP server 15 shown in FIG. 1 calculates the collection ratio for each type of collected articles (S84). That is, the cumulative collection data of the user is read out from the DB server 14 and updated in accordance with the current collection data. In addition, the sales data (sales table) of the user is read out from the DB server 14, and the collection ratio for each type of expendables is calculated on the basis of the record of delivery quantity and the cumulative collection data. More specifically, the following calculation is done for each type of expendables.

(quantity of valid collected articles)÷(number of sold articles)=(collection ratio/%) (quantity of recycled articles)÷(quantity of valid collected articles+quantity of recycled articles)=(recycled article ratio/%) (quantity of other maker products)÷(total collection quantity)=(other maker product ratio/%)

It is confirmed whether any type of expendables exhibits a collection ratio more than 100% (S85). If all collection ratios are 100% or less, they are stored in the DB server 14 as the collection ratio for each type of expendables in correspondence with the user (S86).

Subsequently, the AP server 15 averages all the collection ratios of the respective expendable types for the user to calculate the average collection ratio of the user and stores the average collection ratio in the DB server 14 (S87). The database to be updated at this time is the collection ratio table 4650 shown in FIG. 46E. A new record is added to the collection ratio table 4650. As the record, the models of the collected expendables are recorded in the type field 4651, and the calculated average collection ratio for the expendables is recorded in the average collection ratio field 4652.

When the average collection ratio exceeds a predetermined value $\alpha$ (YES in S88), the point as the base of the incentive is determined using the tables shown in FIGS. 36 to 39 (S89). At this time, if the recycled article ratio or other maker product ratio exceeds a predetermined value, the user may be penalized by, e.g., decreasing the point. The determined point is converted into a discount rate or discount amount by looking up the tables shown in FIGS. 40 and 41 and sent to the user by, e.g., e-mail (S90-1). As the notification form, a window shown in FIG. 17 or the like may be displayed.

Next, the AP server 15 calculates the average collection ratio of all users (S90-2). If the average collection ratio has a predetermined value $\beta$ or more (YES in S91), the processing is ended. If the average collection ratio is less than the predetermined value $\beta$, a warning is generated (S92). A measure (to be described later) corresponding to this warning is executed (S93). The calculated average collection ratio is recorded in the average collection ratio field 4607 of the user table (FIG. 46A).

Figure 29:
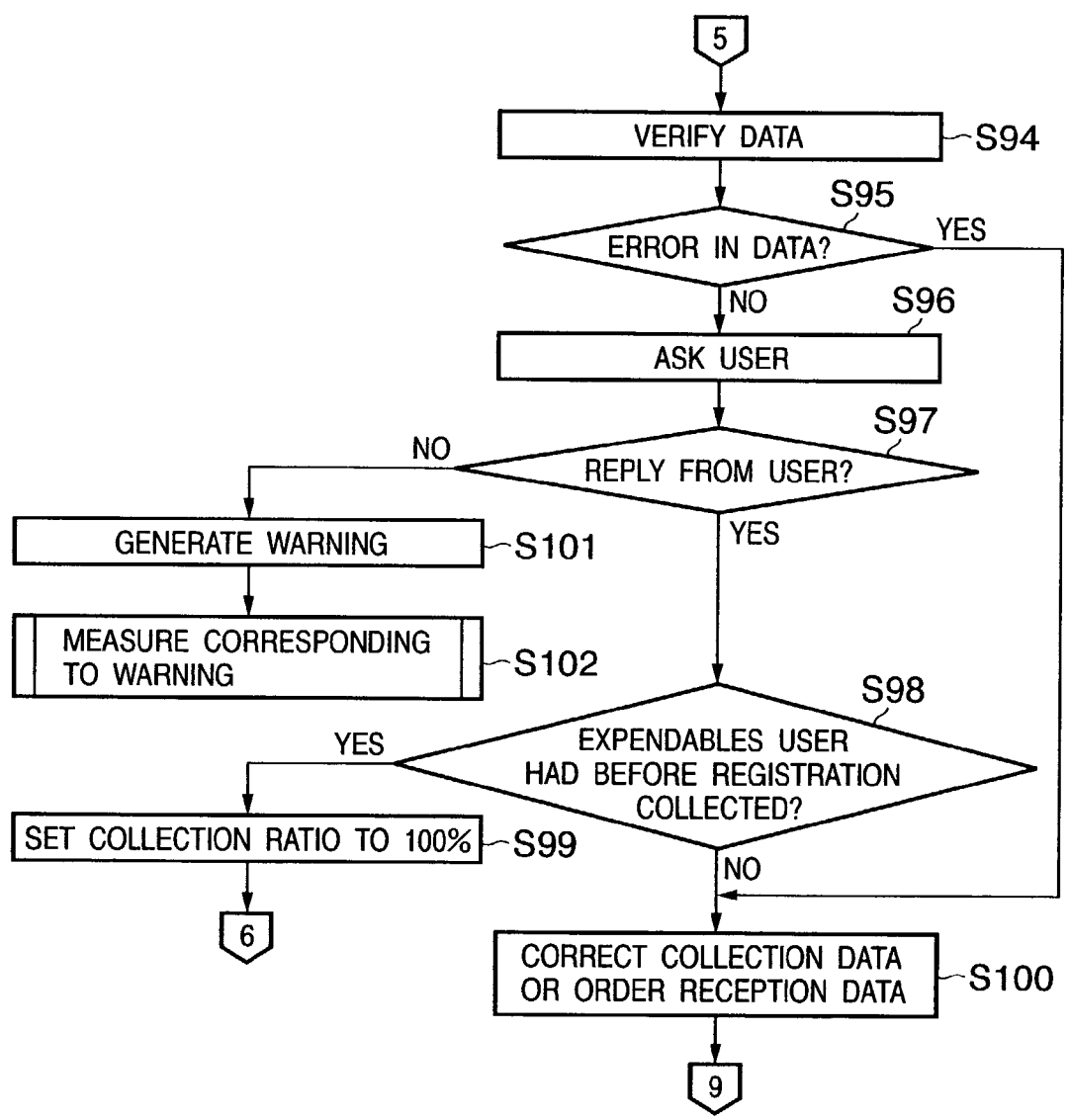
FIG. 29 is a flow chart showing exceptional processing.

On the other hand, if the average collection ratio exceeds 100% in step S85, the flow advances to exceptional processing shown in FIG. 29. Referring to FIG. 29, first, it is verified whether the collection data and the like stored in the DB server 14 have no error (S94). If the data have an error (YES in S95), one or both of the collection data and sales data stored in the DB server 14 are corrected (S100). Then, the processing returns to step S84.

If the collection data and the like stored in the DB server 14 have no error, a detailed reason is investigated (S96). For example, e-mail with a questionnaire or the like is sent to the user, and a reply is received. The followings are possible reasons why the collection ratio exceeds 100%. Reason (3) assumes a case wherein a branch or a department of a company is registered as a user, and expendables received from another branch or department are collected.

Reasons Why the Collection Ratio Exceeds 100%
(1) Expendables that the user had before registration were collected.
(2) Expendables sold through another route were collected.
(3) Expendables received from another office were collected.

If a reply from the user is received in response to the mail transmitted to the user in step S96 (YES in S97), an appropriate measure is taken in accordance with the contents of the reply. For example, when the user has replied the reason (1), no problem is posed. After steps S97 and S98, the collection ratio is set to 100% in step S99, and the processing is returned to step S86. When the user has replied the reason (2) or (3), the data is corrected after talking with the user (S100), and the processing is returned to step S84.

If no reply is received from the user (NO in S97), a warning is issued (S101). The manager or the like in the collection center system 4 investigates the reason why the user does not reply (S102).

Figure 30:
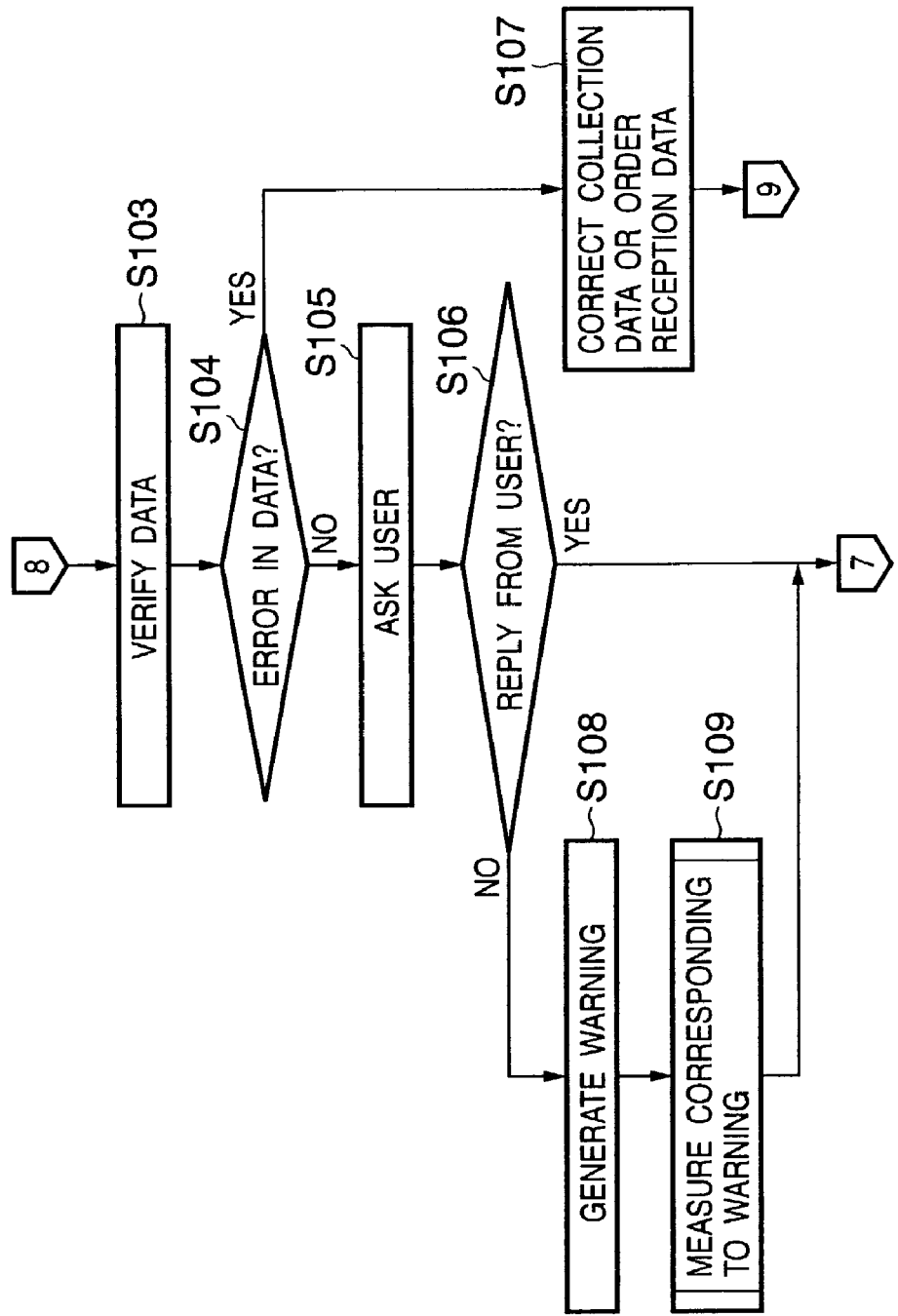
FIG. 30 is a flow chart showing exceptional processing.

In addition, when it is determined in step S88 that the average collection ratio of the user is less than the predetermined value $\alpha$, the flow advances to exceptional processing shown in FIG. 30. First, it is verified whether the collection data and the like stored in the DB server 14 have no error (S103). If the data have an error (YES in S104), one or both of the collection data and sales data stored in the DB server 14 are corrected (S107). Then, the processing returns to step S84.

If the collection data and the like stored in the DB server 14 have no error, a detailed reason is investigated (S105). For example, e-mail with a questionnaire or the like is sent to the user, and a reply is received. The followings are possible reasons why the average collection ratio of the user is less than the predetermined value $\alpha$.

Reasons Why the Collection Ratio is Less Than the Predetermined Value $\alpha$
(4) Waste expendables are discarded.
(5) Another route is used.

If a reply from the user is received (YES in S106), the user is specially asked for being cooperative for collection, or the reason why the user uses another collection route is investigated to obtain information to improve the collection center system 4 and its service in accordance with the contents of the reply.

The processing is returned from step S106 to step S89 without correcting the data.

If no reply is received from the user (NO in S106), a warning is issued (S108). The manager or the like in the collection center system 4 investigates the reason why the user does not reply (S109).

[Measures Against Low Collection Ratio]

When it is detected in step S91 that the average collection ratio of the all user is less than the predetermined value $\beta$, it indicates that collection by the collection center does not sufficiently function. In this case, first, the reason for that is investigated, and a measure corresponding to the results is executed. For example, users are asked for being cooperative for collection, or promotion for promoting collection (e.g., bonus points as shown in the table shown in FIG. 38 are given in accordance with the collection ratio) is executed to increase the average collection ratio. For lump-sum collection as well, lump-sum collection bonus points are given to users in accordance with the types of collection containers by looking up the table shown in FIG. 39. These bonus points are also stored in the database.

The AP server 15 monitors not only the average collection ratio of all users but also the average collection ratio for each type of expendables in all users. When the average collection ratio for each type is less than a predetermined value $\gamma$, a warning is similarly issued. In this case, the users are asked for being cooperative for collection of corresponding expendables, or promotion for promoting collection is executed to increase the average collection ratio.

The collection ratio of a specific type of expendables needs to be increased not only when the collection ratio decreases but also when an increase in demand of waste expendables of a specific type is expected. In this case as well, the users are asked for being cooperative for collection of corresponding expendables, or promotion for promoting collection is executed to increase the average collection ratio.

FIG. 22 is a view showing the sales/collection system login window which is supplied from the Web server 13 to the user's terminal apparatus 24 during a promotion period to promote collection of specific expendables. To increase the total collection ratio, almost the same login window is prepared. It is also effective to display a banner for promotion not only on the login window but also on another window.

When the above-described incentive promotion method is changed depending on the region or country, the incentives can more flexibly be provided.

As described above, with the procedure shown in FIGS. 27 to 30, an incentive that reflects the waste expendable collection result of each user can be provided to the user. The incentive is given in accordance with the collection quantity or collection ratio and also in accordance with the quantity of lump-sum collection. When the above-described mechanism is implemented, the totalized data of the collection result and sales result for each user can immediately be presented to the user in response to a request from him/her. This can provide a problem that data totalization is time-consuming, and the latest collection cooperation situation cannot be immediately grasped or a problem that a long time is taken to know the result of collection cooperation.

[Processing After Collection (2)]

A procedure for collecting waste expendables without any collection request from the user will be briefly described next. The above-described procedure from FIG. 23 assumes that the requester transmits the quantity and type of expendables to be collected to the collection center system 4 and acquires a collection slip in advance, attaches the collection slip to the collected article, and sends them to the collection center. However, the registered user can acquire a collection container independently of collection of expendables. In this case, the requester can send expendables to the collection center using the acquired collection container without requesting collection. At this time, bar codes shown in FIG. 32, on which the types of expendables or the like are recorded, are prepared in the collection center in advance and read at the collection center in correspondence with actually collected expendables, thereby executing processing after collection in accordance with the procedure shown in FIG. 31. The procedure shown in FIG. 31 is also executed by the AP server 15.

Figure 31:
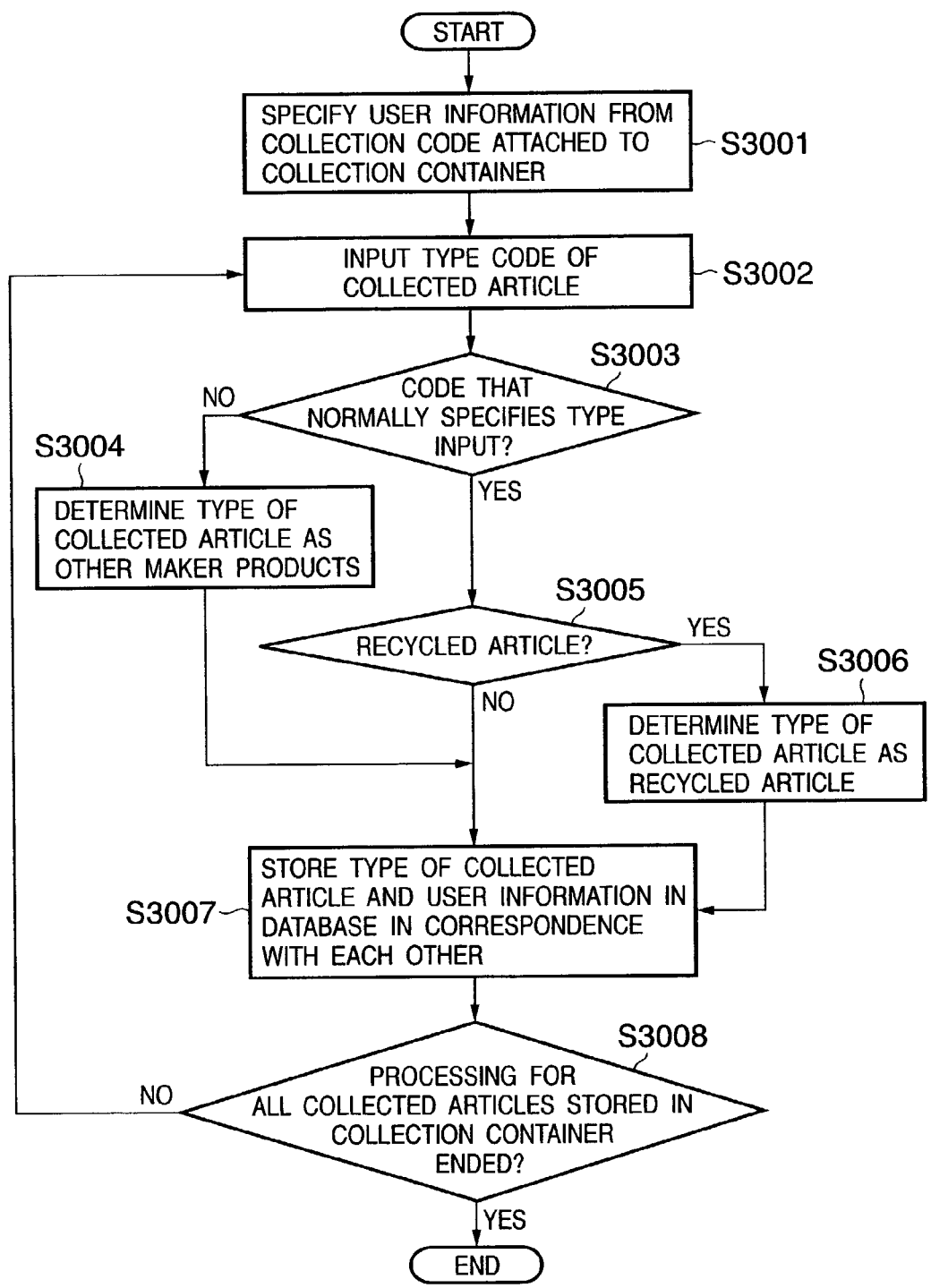
FIG. 31 is a flow chart showing management procedures when expendables that are sent without any collection request are received.

Referring to FIG. 31, first, user information is specified from the collection code attached to the collection container (step S3001). The user information can be specified by, e.g., reading the collection code by a bar code reader or OCR reader and looking up the database in which the user information is registered.

Next, identification information input to the collection server is recognized (step S3002). The identification information is input by reading the information of the collection code attached to the collection container using an input means such as a bar code reading apparatus or causing the operator to input the information through an input means such as a keyboard on the basis of visual determination. For example, the bar code list shown in FIG. 32 is used.

Figure 32:
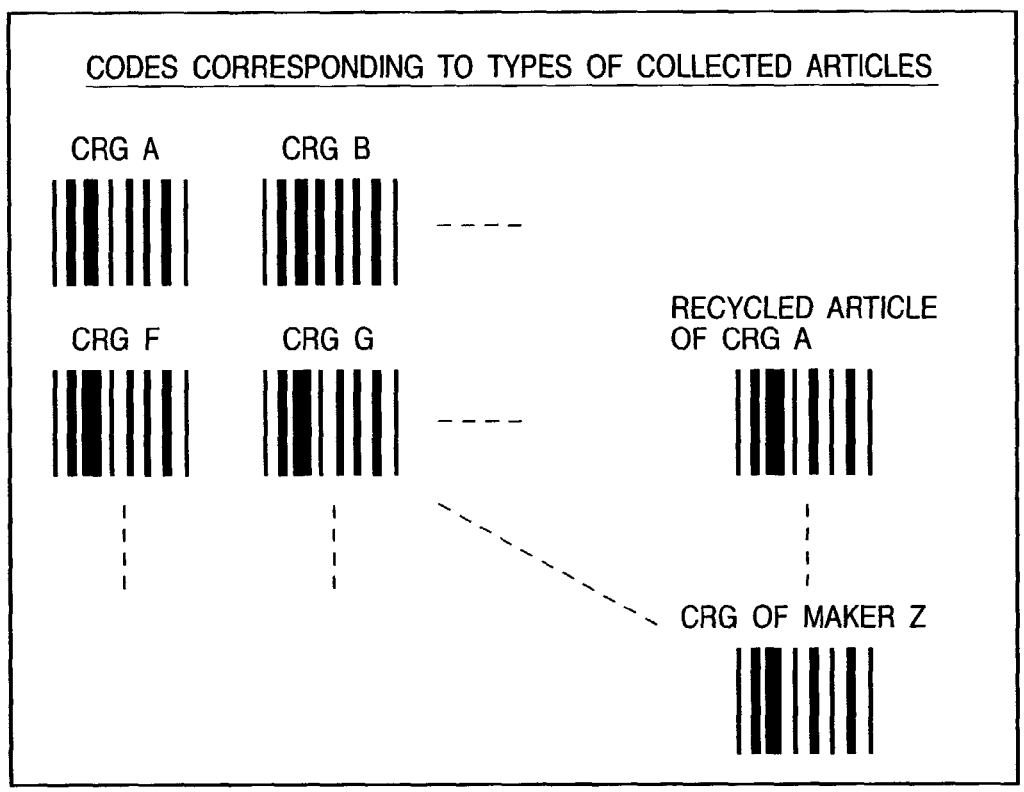
FIG. 32 is a view showing the list of collection codes used in the collection center.

In this case, the operator who executes the collection operation visually confirms the type of waste expendables (collected articles), finds a corresponding code from the bar code list shown in FIG. 32, and inputs the type information of the collected articles to the collection server (AP server) 15 through an input means such as a bar code reading apparatus. The input information is stored in the database server 14 related to the user information (customer information) input in step S3001. The data to be updated is the collection table 4630 shown in FIG. 46C. The collection date and the model and quantity of the collected expendables are recorded as new records.

Although not illustrated, bar codes used to input information representing the collected articles are other maker products or recycled articles are also prepared in FIG. 32. When other maker products or recycled articles are actually collected as collected articles, the operator selects bar code information corresponding to the other maker products or recycled articles from FIG. 32 and inputs the information. Thus, the bar code information is stored in the AP server 15 or database server 14 through the reading apparatus. The processes in steps S3304, S3306, and S3303 are realized by inputting the bar code information shown in FIG. 32 to the AP server 15 and causing the AP server 15 to recognize the information.

It is determined next on the basis of the input information input in step S3002 whether the collected expendables are processible, i.e., valid collected articles (S3003). If the input information is identification information which is attached to the collected articles in advance and corresponds to the collected article stored and managed in the database in advance, the type can be recognized. On the other hand, if the collected articles are other maker products or products that should not be collected, the type of the collected articles cannot be recognized from the input identification information. In this case, an error code is input to the collection server 15. Hence, if NO in step S3003, it is determined in step S3004 that the collected articles are other maker products. The other maker product ratio in the collected articles of the user is calculated and reflected on the database server 14. For other maker products, the quantity of other maker products is added to the other maker product quantity field 4616 of the user record (FIG. 46A). The total number of collected expendables is obtained by adding the sum of the value in the other maker products quantity field 4616 and the value in the quantity field 4631 recorded in the collection table 4630 to the value in the recycled article quantity field 4614. When the number of other maker products is divided by the total number of collected expendables, the other maker product ratio can be obtained. The other maker product ratio field 4615 of the user record is updated to the value of the obtained other maker product ratio.

When the collected articles are recognized as other maker products, a more detailed type is visually determined by the operator in step S3004. The operator inputs identification information through an input means such as a keyboard. In step S3004, the detailed type of other maker products is determined in accordance with the identification information.

When the collected articles are collected articles of a type managed in advance, it is determined in step S3005 whether the collected articles are recycled articles. A recycled article means an article processed for recycle by a third party other than the maker of a waste expendable. For example, a waste toner cartridge that is re-filled with toner corresponds to a recycled article. Since recycled articles are often difficult to further recycle, they are distinguished from expendables other than recycled articles.

Determination about whether the collected articles are recycled articles is visually done by the operator. The operator determines on the basis of a signal obtained by inputting the confirmation result whether the articles are recyclable. Alternatively, it may also be determined on the basis of a read of information which is stored in a nonvolatile storage means provided in the waste expendables to identify whether the waste expendables are recyclable.

When it is determined that the collected articles are recycled articles, the type of collected articles is determined as recycled articles in step S3006. The recycled article ratio of the collected articles of the user is calculated and reflected on the recycled article quantity field 4614 of the user record (FIG. 46A). The total number of collected expendables is obtained by adding the sum of the value in the other maker products quantity field 4616 and the value in the quantity field 4631 recorded in the collection table 4630 to the value in the recycled article quantity field 4614. When the number of recycled articles is divided by the total number of collected expendables, the recycled article ratio can be obtained. The recycled article ratio field 4613 of the user record is updated to the value of the obtained recycled article ratio.

When the collected expendables are subjects of collection and not recycled articles, the type of collected articles and use information are stored in the database in correspondence with each other in step S3007. At this time, a point is given to the user and stored in the database in accordance with the type and quantity of collected articles. This processing needs to have the same contents as in the processing in steps S84 to S93 in FIG. 26.

Finally, it is determined in step S3008 whether the processing from step S3002 is ended for all collected articles. If NO in step S3008, the flow returns to step S3002.

With the above procedure, expendables whose collection is not requested can be handled in the collection center, and the collection result such as the collection ratio of each user can be managed. In addition, various kinds of incentives can be given to the user.

As described above, when the processing of the flow chart shown in FIG. 31 is executed, the collection result can more easily be realized while omitting the labor of the user and the operator in the recycle plant.

As a preferred form different from the above-described form, identification information used to identify the type as shown in FIG. 32 may be attached to or recorded on each collected article in advance, and the identification information may be read by a reading means such as a bar code reading apparatus and stored and managed in the database in correspondence with user information read from the collection container. For collected articles such as other maker products to which no identification information used to identify the collected articles is not attached, identification information as shown in FIG. 32 may be prepared in advance, and information representing that collected articles such as other maker products that should not be collected are collected may be managed in the database in correspondence with user information.

As another form, information stored in a nonvolatile storage means arranged in a collected article and representing that product may be read and managed in the database in correspondence with user information. If user information and the like are also stored in the nonvolatile storage means, the collection result of each user can be unitarily managed without issuing any collection code for identifying specific user information.

[Calculation of Incentive]

Incentive calculation executed in step S89 in FIG. 27 will be described next. This processing is executed also in generating the information of the confirmation window transmitted from the AP server 15 to the PC 24 in step S2401 in FIG. 25. An incentive can be given as an amount or a discount rate. The incentive given as an amount can be cash back or a discount in purchasing merchandise. All the incentives are presented to the user. The user uses an incentive by a method selected from those presented. This selection is done through the window shown in FIG. 7. The selected method is recorded in the incentive providing method field 4612 of the user record.

(Calculation of Amount)

FIG. 36 shows a sales point table which represents points given at the time of sale of expendables for the respective types of expendables. In the sales point table, a sales point per unit quantity (normally one item), a sales campaign point added for expendables as a subject of sales campaign, a sales campaign subject flag representing that the expendables are a subject of campaign, and a campaign period are set in correspondence with each type of expendables. These settings are done in advance by the manager or the like.

FIG. 37 shows a collection point table which represents points given at the time of collection of waste expendables for the respective types of expendables. In the collection point table, a collection point per unit quantity (normally one item), a collection campaign point added for expendables as a subject of collection campaign, a collection campaign subject flag representing that the expendables are a subject of campaign, and a campaign period are set in correspondence with each type of expendables.

FIG. 38 shows a collection ratio point table which represents the relationship between the collection ratio and the bonus point given for each collection ratio. FIG. 39 shows a lump-sum collection point table which represents the correspondence between the type of container and a lump-sum collection bonus point given for each type of collection containers. These tables are stored in the DB server 14. If unrecyclable articles such as recycled articles or other maker products are collected, a table in which predetermined values are set to decrease the incentive of the user is looked up.

The AP server 15 can obtain points corresponding to the collection ratio, sales quantity, collection quantity, lump-sum collection quantity of expendables on the basis of the sales quantity, collection quantity, and valid collection ratio of expendables and the types and quantities of lump-sum-collected containers, which are stored in the database for each user by looking up the tables shown in FIGS. 37 to 39. For example, the points for a given user of interest are calculated in the following way.

First, a record of interest is extracted from the start of the sales table 4620, and a model that matches the model in the record of interest is searched for in the sales point table shown in FIG. 36. If a corresponding model is registered in the sales point table, a sales campaign subject flag 3604 corresponding to the model is tested. If this flag is not set ("−" in FIG. 36), the value of a sales point 3602 is read as a point per unit quantity.

If the sales campaign subject flag 3604 is set ("○" in FIG. 36), it is determined whether the value in the sales date field 4623 of the record of interest is in the period described in a campaign period 3605. If the value is outside the period, the value of the sales point 3602 is read as a point per unit quantity.

If the value in the sales date field 4623 is in the period described in the campaign period 3605, the value of a campaign point 3603 is read as a point per unit quantity.

When the point per unit quantity is thus obtained, the point is multiplied by the value in a quantity field 4622 in the record of interest. This result indicates the sales point for expendables corresponding to the record of interest.

The above procedure is executed for all records while changing the record of interest. Points for expendables of the same model are accumulated. As a result, a sales point is calculated for each type of expendables sold to the user. The sum of sales points for all expendables is the sales point given to the user of interest.

The above procedure is also applied to the collection point table shown in FIG. 37. In this case, the collection table 4630 is used in place of the sales table 4620, and the collection point table (FIG. 37) is used in place of the sales point table. Thus, a collection point is obtained for the user of interest.

To obtain a bonus point given for the collection ratio, a collection ratio range including the value in an average collection ratio field 6007 of the user record is searched for in the collection ratio bonus point table shown in FIG. 38. The point in the corresponding column is the collection ratio bonus point.

A lump-sum collection bonus point is obtained from the lump-sum collection table 4640 shown in FIG. 46D and the lump-sum collection bonus point table shown in FIG. 39. First, for each record in the lump-sum collection table 4640, the value 4641 in the container type field in the record of interest is searched for in the lump-sum collection bonus point table. The corresponding point is multiplied by the value in the quantity field 4642 in the record of interest. The value thus obtained is the bonus point for the container of interest. In this way, bonus points are obtained for all container types and totalized. The sum value is the lump-sum collection bonus point.

The sum of the sales point, collection point, collection ratio bonus point, and lump-sum collection bonus point obtained in the above manner is the total point given to the user of interest.

This sum is converted into an amount on the basis of the conversion table shown in FIG. 40 or 41. FIG. 40 shows a conversion table that is usually used. FIG. 41 shows a conversion table used during a campaign. Whether it is a campaign period can be determined from a separately prepared flag or the like. In either table, a conversion rate for a discount in purchasing merchandise and that for cash back are described. In converting a point into an amount, both a discount amount and a cash back amount are obtained using both the conversion rate for purchase of merchandise and that for cash back.

(Calculation of Discount Rate)

As described above, any point is converted into a discount amount or a cash back amount. Alternatively, as an incentive for a user, a discount rate may be given in accordance with the sales quantity, collection ratio, or the like. In this case, using the set of tables shown in FIGS. 33 and 34 or the set of tables shown in FIGS. 35 and 34, a discount rate is calculated from the calculated collection ratio and sales quantity and used as an incentive.

Usually, the tables shown in FIGS. 33 and 34 are used. FIG. 33 shows a collection ratio—discount rate table used to determine a discount rate from the type of expendables and their collection ratio. For a given user of interest, each record is extracted from the start of the collection ratio table 4650 of the user of interest. The discount rate is obtained in the column located at the intersection between the value in the model field 4651 and the value in the collection ratio field 4652 of the record of interest in the table shown in FIG. 33.

FIG. 34 shows a sales quantity—discount rate table used to determine a discount rate from the type and sales quantity of expendables. For a given user of interest, each record is extracted from the start of the sales table 4620 of the user of interest. The discount rate is obtained in the column located at the intersection between the value in the model field 4621 and the value in the quantity field 4622 of the record of interest in the table shown in FIG. 34.

The sum of the discount rate obtained from FIG. 33 and that obtained from FIG. 34 is the incentive to be given to the user of interest. This discount rate is recorded in the incentive field 4617 of the user record.

FIG. 35 shows a collection ratio—discount rate table used during a campaign. During a campaign, the table shown in FIG. 35 is used for discount rate calculation in place of the table shown in FIG. 33.

The incentive obtained in the above way, i.e., the discount amount, cash back amount, and discount rate are presented to the user by the confirmation windows shown in FIGS. 17 to 21 or a notification issued in step S90-2 in FIG. 27.

In this manner, the AP server 15 can obtain points corresponding to the collection ratio, sales quantity, collection quantity, and lump-sum collection quantity of expendables on the basis of the sales quantity, collection quantity, and valid collection ratio of expendables and the types and quantities of lump-sum-collected containers, which are accumulated in the database for each user by looking up the tables shown in FIGS. 33 to 41. When these data are totalized, a discount amount or discount rate is obtained. When the discount rate is designated as the incentive providing method, the value of the discount rate is displayed on the purchase window shown in FIG. 10.

As described above, according to this embodiment, a mechanism capable of providing an advantage corresponding to cooperation in collection to the customer can be provided. In addition, when a means for realizing an appropriate incentive in return for customer's cooperation in collection is provided, the customer's cooperation in collection can be further promoted. Since the compensation is calculated in return for a plurality of elements including the sales quantity of expendables, collection cooperation quantity, collection ratio, and lump-sum collection cooperation of the customer, a more flexible and rational incentive can be realized for both the customer side and the collection operation side. Furthermore, since inappropriate collection from a customer can be prevented, and an incentive can be provided to a user who is cooperative in lump-sum collection in a correct manner, collection of waste expendables can be further promoted.

[Use of Point]

When the user selects "discount equivalent to the point amount" as the incentive providing method, the point given to the user is consumed by using it. When the point is used, the user record is managed in the following way.

In this embodiment, the point itself is not recorded in the user record. Hence, the latest date when the point has been used is managed in the user record. Point calculation is limited to the contents of the user records obtained in transactions such as sales and collections after that date. The date is not shown in FIG. 46A. In this case, the point cannot be divisionally used. According to this method, point calculation only needs to be executed for transactions after the latest date of point use, resulting in simple processing. Since transactions before the latest date of point use are not used for point calculation, the collection table and the like can easily be rearranged.

As another method, the value of used point may be recorded in the user record. In this case, the user can divisionally use the point. In this method, the collection table, sales table, and the like must be rearranged in accordance with the consumed point value. When the incentive is to be presented to the user, the consumed point is presented. The discount amount and the like are calculated on the basis of a value obtained by subtracting the consumed point from the total point.

In the above-described way, the database is updated when the point is used.

When the point is held in the sales table or the like, and the point is used, the consumed point is subtracted from the held point. In this case, the consumed point is subtracted from the point in the record at the oldest transaction date. If the consumed point is larger, the shortage is subtracted from the point in the second oldest record. If points for collection, lump-sum collection, and sales are recorded at the same date, the consumed point is reflected on the user record while switching the tables such that the point decreases from that given at the same date. In this case, the contents of a record with a point "0" is not presented to the user.

[Analysis of Shipment and Collection Intervals]

The sales data and collection data are accumulated in the DB server 14 of the above-described sales/collection system for each user and for each type of expendables. The shipment and collection intervals for each type of expendables can be predicted from these data.

Figure 42:
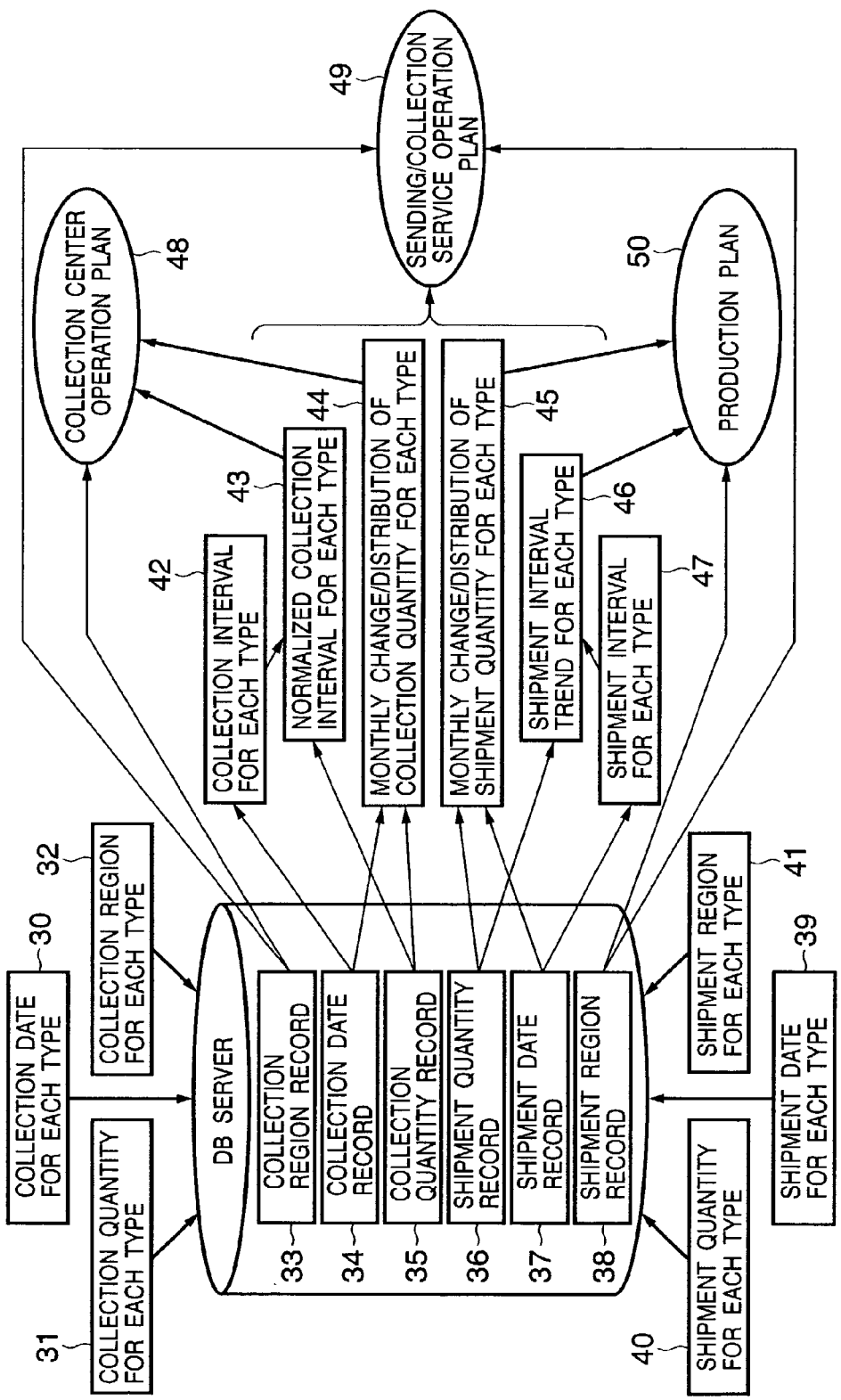
FIG. 42 is a view for explaining the collection and shipment prediction sequence.

FIG. 42 is a view for explaining the collection and shipment prediction sequence.

A collection date 30, collection quantity 31, and collection region 32 for each type are obtained by processing in steps S81 to S83 in FIG. 26. These data are stored in the database server 14 as a collection date record 34, collection quantity record 35, and collection region record 33 independently of the above-described collection data.

Hence, when the collection date record 34 is analyzed, a collection interval 42 for each type, such as "CRG-2s are collected every fourth day", is obtained. In addition, when the collection interval 42 for each type and the collection quantity record 35 are combined, a normalized collection interval 43 for each type, such as "one CRG-2 is collected at an interval of 1.2 day", is obtained.

A monthly change/distribution 44 of the collection quantity for each type is obtained from the collection date record 34 and collection quantity record 35. The thus obtained normalized collection interval 43 for each type, monthly change/distribution 44 of the collection quantity, and the collection region record 33 are reflected on an operation plan 48 of the collection center 4.

This also applies to shipment. A shipment date 39, shipment quantity 40, and shipment region 41 for each type are obtained by processing in steps S81 to S83 in FIG. 26. These data are stored in the database server 14 as a shipment date record 37, shipment quantity record 36, and shipment region record 38 independently of the above-described shipment data.

Hence, when the shipment date record 37 is analyzed, a shipment interval 47 for each type, such as "CRG-3s are shipped every eighth day", is obtained. In addition, when the shipment interval 47 for each type and the shipment quantity record 36 are combined, a shipment interval trend 46 for each type, such as "one CRG-2 is shipped at an interval of 0.7 day", is obtained.

A monthly change/distribution 45 of the shipment quantity for each type is obtained from the shipment date record 37 and shipment quantity record 36. The thus obtained shipment interval trend 46 for each type, monthly change/distribution 45 of the shipment quantity, and the shipment region record 38 are reflected on a production plan 50 of the maker of the expendables.

The data obtained by the above analysis, i.e., the collection region record 33 and shipment region record 38 are also used for an operation plan 49 of the service for delivering expendables customers and collecting waste expendables from customers, thereby efficiently operating the service.

As described above, according to the expendable collection system of this embodiment, when a collection code recorded on a collection slip attached to a collected expendable or a collection slip attached to a collection container is read, access to corresponding collection data can be facilitated.

Hence, data totalization at the collection center 4 which collects various kinds of expendables, i.e., calculation of collection ratio or average collection ratio for each user and each type is facilitated. In addition, an incentive can immediately be obtained from the obtained collection ratio by looking up the tables. For this reason, the operation efficiency at the collection center 4 can greatly be increased.

When the operation efficiency at the collection center 4 increases, the service for users can also be improved by, e.g., increasing the incentives.

When viewed from the user side, since the data totalization can be done in a short time, and the latest collection cooperation situation can immediately be grasped, the result of cooperation in collection is immediately reflected on the incentive. Hence, the users can be more cooperative, and an increase in collection ratio can be expected.

In addition, any decrease in collection ratio can immediately be detected, and a measure against it can be taken. Hence, any decrease in collection ratio can be prevented. Especially, not only a decrease in collection ratio for all users or all expendables but also a decrease in collection ratio for each user and each type of expendables can be detected. Hence, the above-described measures can be taken for every case.

Since recycled articles or other maker products may generate a loss in the incentive, collection of unrecyclable articles can also be prevented.

Example of Expendable

Figure 43:
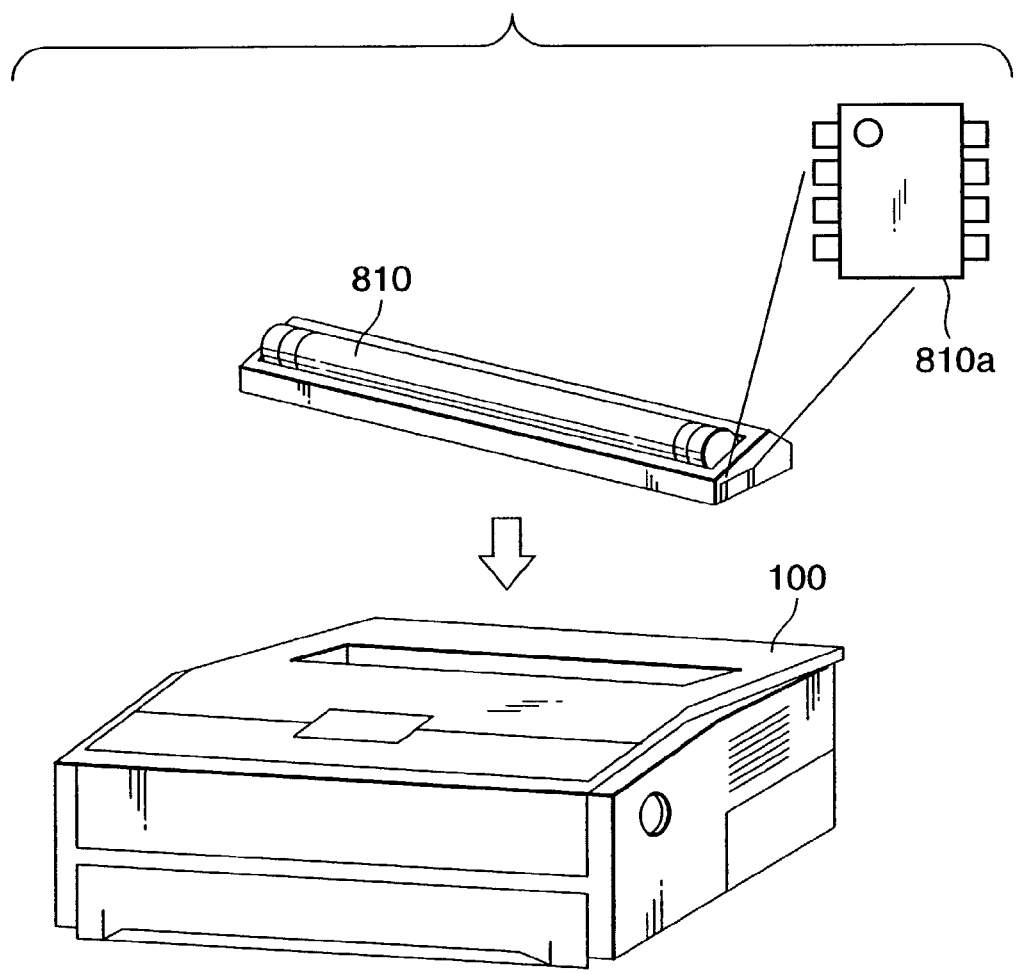
FIG. 43 is a view showing a cartridge used in a printer.

FIG. 43 is a view showing a cartridge 810 used in a printer 100.

A semiconductor memory 810*a* is incorporated in the cartridge 810. When the cartridge 810 is attached to the printer 100, the semiconductor memory 810*a* is electrically connected to the controller of the printer 100 to be read- and write-accessible.

Although not illustrated in FIG. 43, the cartridge 810 may have a display panel for displaying a type ID representing the type of the cartridge 810, a serial number, the total number of printed pages, and the remaining toner amount. The type ID and serial number are determined at the time of manufacture and kept unchanged, they may be printed on the case of the cartridge 810. On the other hand, the total number of printed pages and the remaining toner amount change as the cartridge 810 is used. Hence, a display panel for displaying them is necessary.

As the display panel, a small liquid crystal display panel including its control circuit and backup power supply can be used. When an EEPROM or flash memory is used as the semiconductor memory 810*a*, and a display device capable of maintaining display even after power off, such as a display panel using a ferroelectric liquid crystal, is used, power needs to be supplied from an external device (e.g., printer 100) only when the data in the semiconductor memory 810*a* is to be rewritten. Even the backup power supply can be omitted.

When the identification information of the cartridge 810, such as the type ID or serial number, is held and displayed by the cartridge 810 itself, the cartridge 810 can easily and accurately be identified from its outer appearance or by reading out the data from the semiconductor memory 810*a*.

In addition, when information related to the use state of the cartridge 810, such as the remaining toner amount or the number of printed pages, is held and displayed by the cartridge 810 itself, whether the cartridge 810 has not been used yet can easily and accurately be determined from its outer appearance or by reading out the data from the semiconductor memory 810*a*.

Figure 44:
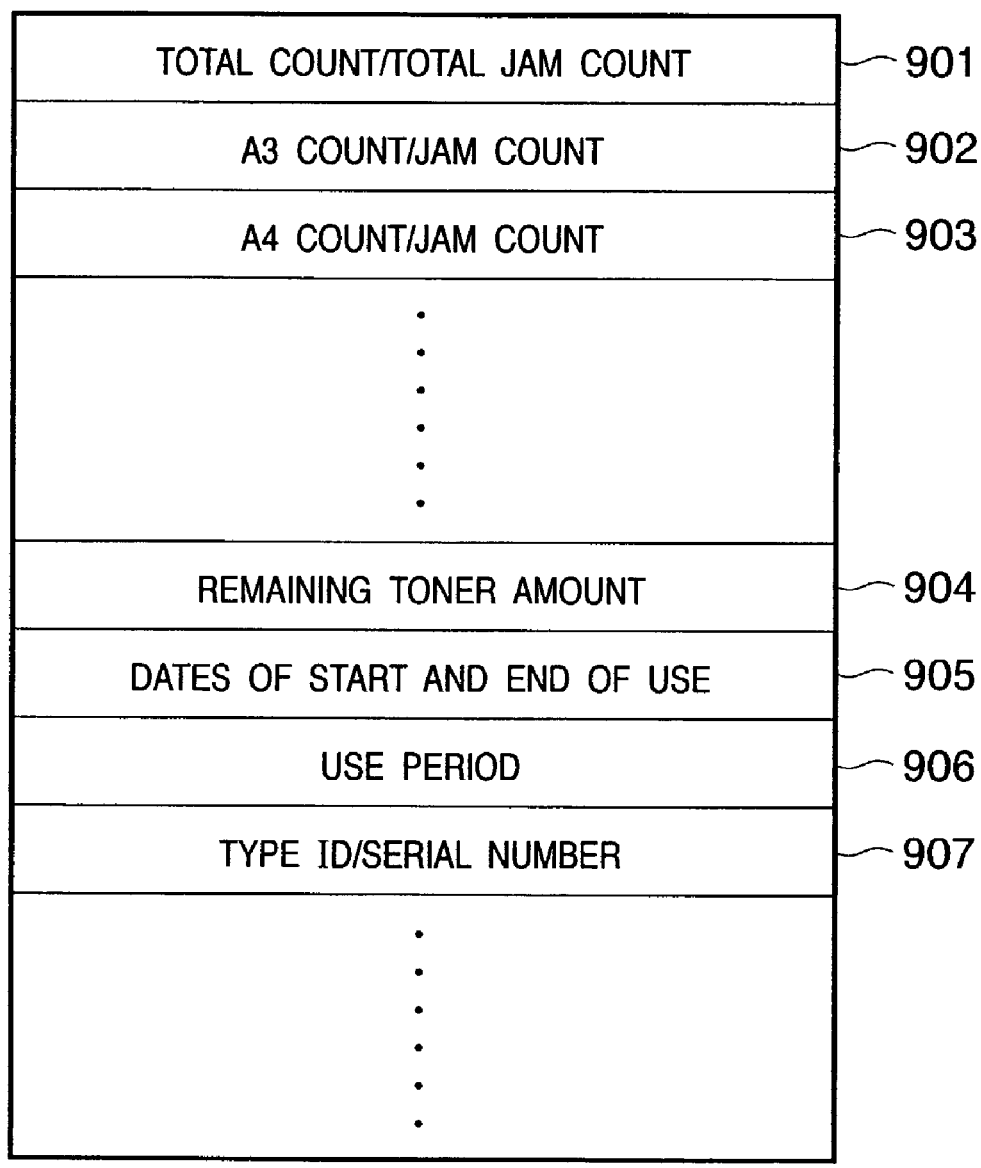
FIG. 44 is a view showing data stored in the memory of the cartridge.

FIG. 44 is a view showing data stored in the memory 810*a*.

The memory 810*a* stores data 901 representing the total number of pages printed using the cartridge 810 and the total number of jammed pages, data 902 and 903 representing the number of printed pages and the number of jammed pages for the respective paper sizes, and the like. Referring to FIG. 44, the number of printed pages or the number of pages is described as a "count". These data are incremented every time one page is printed by the printer 100 to which the cartridge 810 is attached.

The memory 810*a* also stores data 904 representing the remaining toner amount. The data 904 may be a value representing the remaining toner amount itself. Alternatively, the data 904 may be a flag representing an output, i.e., a so-called toner low output from a sensor that detects that the toner amount has decreased to a predetermined amount.

The memory 810*a* also stores data 905 representing the user start and end dates and data 906 representing the use period. The printer 100 normally has a sensor for detecting the open/closed state of the cover of the cartridge attachment section. For example, when the open/closed state of the cover is detected, the controller of the printer 100 compares the serial number of the cartridge 810, which is stored in a nonvolatile memory, with the serial number read from the cartridge 810 after detection of the cover. If the serial numbers do not match, the controller determines that the cartridge has been exchanged. Data representing that date is written in the memory 810*a* as the use start date. Every power-on time or every 24 hrs, data representing that date is written in the memory 810*a* as a use end date. In addition, data representing the use period is written in the memory 810*a*.

The memory 810*a* also stores data 907 representing the above-described identification information, i.e., the type ID and serial number. The data 907 may also contain data representing a service center that should be notified that the toner has been used up.

Detailed Example of Device Using Expendable

Figure 45:
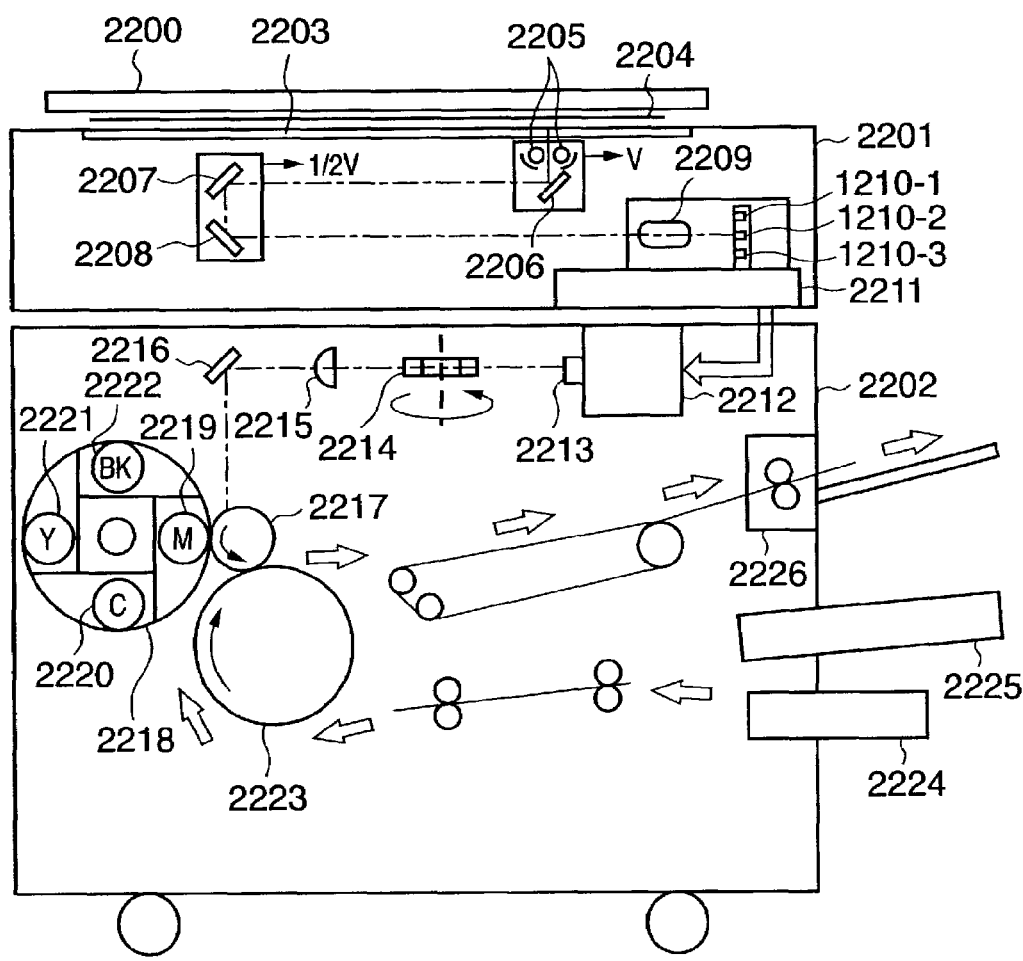
FIG. 45 is a schematic view showing the arrangement of a laser beam printer.

FIG. 45 is a schematic view showing the arrangement of a laser beam printer (LBP) in which the expendables of this embodiment are mounted.

Referring to FIG. 45, an image scanner 2201 reads an original image and executes digital image processing for the original image. A printer 2202 forms an image corresponding to the original image read by the image scanner 2201 on a printing paper sheet and outputs the image.

In the image scanner 2201, reference numeral 2200 denotes an original cover; and 2203, an original glass table (platen glass). An original 2204 is placed with its printed surface facing down and fixed by the original cover 2200. Light emitted from a fluorescent lamp 2205 is reflected by the original 2204, guided to mirrors 2206, 2207, and 2208, and forms an image on a linear CCD image sensor (to be referred to as a "CCD" hereinafter) 2210 through a lens 2209. The lens 2209 has an infrared cut filter. The CCD 2210 separates the reflected light from the original 2204 into red (R), green (G), an blue (B) and read the light components. Obtained analog image signals are sent to an image processing section 2211. The unit having the fluorescent lamp 2205 and mirror 2206 is mechanically moved in the sub-scanning direction perpendicular to the CCD 2210 at a speed V while the unit having the mirrors 2207 and 2208 is mechanically moved in the sub-scanning direction, thereby reading the entire original 2204.

The CCD 2210 has, e.g., three lines (1210-1 to 1210-3) of light-receiving pixels including about 7,500 pixels for each of the R, G, and B. The CCD 2210 can read the 297-mm short side of an A3 original at a resolution of 600 dpi. To read the 297-mm short side of an A3 original at a resolution of 400 dpi, a linear image sensor having about 5,000 pixels for each of R, G, and B.

The image processing section 2211 converts the analog image signals output from the CCD 2210 into digital image signals, forms yellow (Y), magenta (M), cyan (C), and black (BK) color component images corresponding to the toner colors for printing, and sends the images to the printer 2202. In addition, one of the Y. M, C, and BK color component images is sent to the printer 2202 every one original scanning cycle (one sub-scanning cycle) in the image scanner 2201. Hence, four color components images are sequentially sent to the printer 2202 in four original scanning cycles, thus completing one print. If the image processing section 2211 has a necessary and sufficient internal memory, image signals obtained in one original scanning cycle may be stored in that memory. In this case, the remaining three original scanning cycles can be omitted.

The image signals of the Y, M, C, and BK color components sequentially sent from the image processing section 2211 are input to a laser driver 2212 in the printer 2202. The laser driver 2212 causes a laser diode 2213 to emit light in accordance with an input image signal. A laser beam emitted from the laser diode 2213 scans the surface of a photosensitive drum 2217 through a polygon mirror 2214, f-θ lens 2215, and mirror 2216 and forms an electrostatic latent image on the photosensitive drum 2217.

Electrostatic latent images formed on the photosensitive drum by the laser beam are developed by developing units 2219 to 2222 having yellow, magenta, cyan, and black toners. That is, the four developing units 2219 to 2222 sequentially abut against the photosensitive drum 2217 to develop the image by color toners.

A printing paper sheet supplied from a recording paper cassette 2224 or 2225 is wound around a transfer drum 2223 by the action of static electricity. The toner images on the photosensitive drum 2217 are transferred onto the printing paper sheet. In print processing using four color toners, the color toners are superposed and transferred onto the printing paper sheet by rotating the transfer drum 2223 by four revolutions. After that, the printing paper sheet is separated from the transfer drum 2223. The toner images are fixed by a fixing unit 2226. Then, the printing paper sheet is discharged from the apparatus.

In such an LBP, the toners or cartridges stored in the photosensitive drum 2217 and developing units 2219 to 2222, and the printing paper sheets stored in the recording paper cassettes 2224 and 2225 are expendables.

Although not illustrated, the laser beam printer shown in FIG. 45 has an interface to an external device such as a personal computer. Hence, an image based on image data sent from the external device can be printed on a printing medium.

Figure 59:
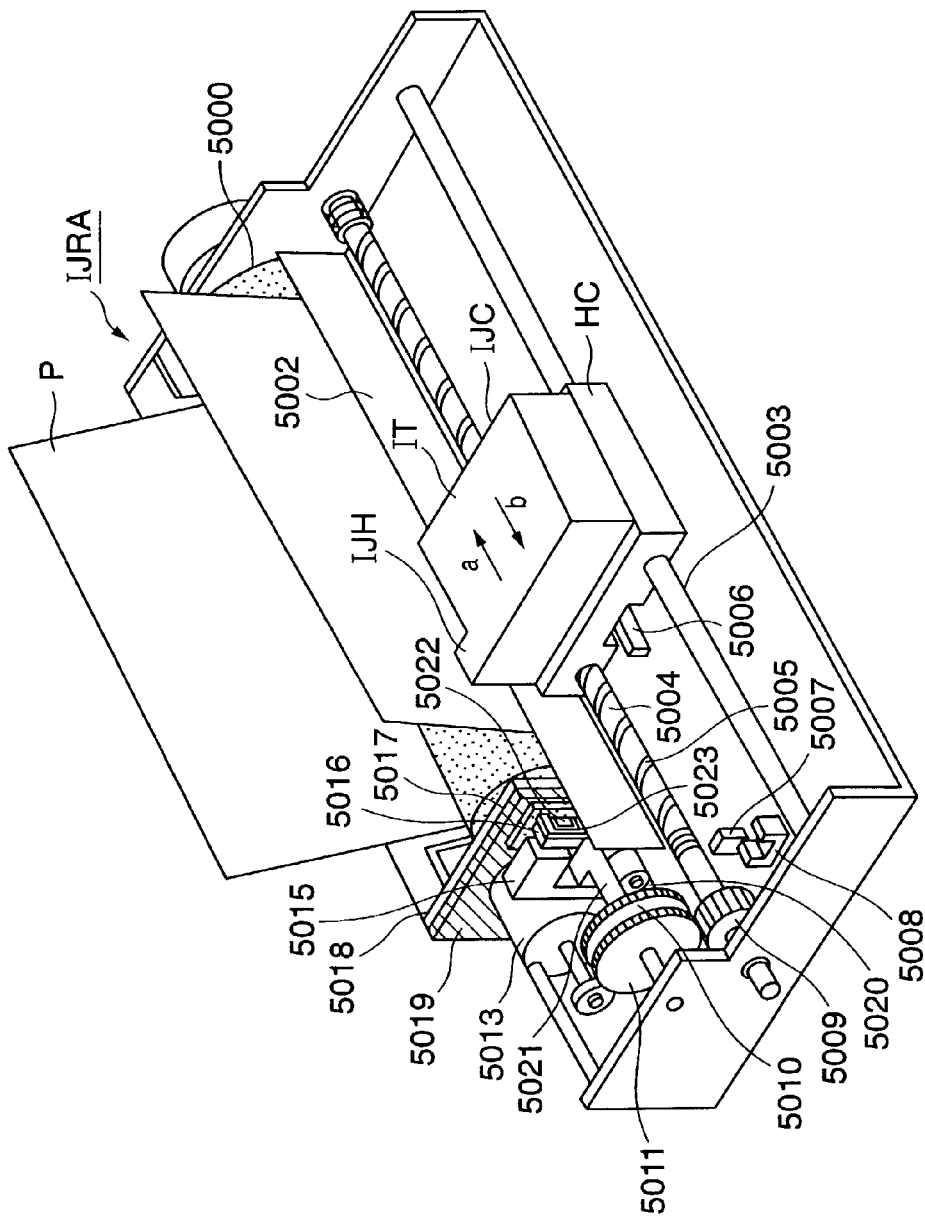
FIG. 59 is a perspective view showing the arrangement of an inkjet printer.

FIG. 59 is a perspective view showing the arrangement of an inkjet printer (IJRA) in which the expendables of this embodiment are mounted.

Referring to FIG. 59, a carriage HC engaging with a helical groove 5005 of a lead screw 5004 which rotates through driving force transmission gears 5011 and 5509 in synchronism with the forward/reverse rotation of a driving motor 5013 has a pin (not shown) and reciprocally moved in directions indicated by arrows a and b. An inkjet cartridge IJC is mounted in the carriage HC.

A paper press 5002 presses a recording paper sheet P against a platen 5000 across the moving direction of the carriage HC. Photosensors 5007 and 5008 serve as a home position detection section which confirms whether a lever 5006 of the carriage HC is present in the sensor region to switch the direction of rotation of the motor 5013. A member 5016 supports a cap member 5022 that caps the front surface of a printhead IJH. A suction unit 5015 sucks the internal atmosphere in the cap to execute vacuum recovery of the printhead IJH through an in-cap opening 5023.

Reference numeral 5017 denotes a cleaning blade; and 5019, a member for moving the blade back and forth. These members are supported by a main body support plate 5018. The cleaning blade is not limited to this form. Any other known cleaning blade can be applied to this embodiment. A lever 5021 is used to start suction of vacuum recovery. The lever 5021 moves as a cam 5020 engaging with the carriage HC moves. The movement of the lever 5021 is controlled by a known transmission section such as clutch switching of the driving force from the driving motor 5013.

For these capping, cleaning, and vacuum recovery, when the carriage HC enters the home-position-side region, desired processing is done at a corresponding position by the action of a lead screw 5004. Desired operation is executed at a known timing.

In such an IJRA, the inkjet cartridge IJC and ink stored in the inkjet cartridge IJC are expendables.

As described above, according to the present invention, data totalization in collecting expendables can easily and accurately be done. In addition, points that can be used for a service can be calculated and provided to customers in accordance with waste expendable collection results managed for the respective customers.

The user can immediately grasp the collection situation, and the result of cooperation in collection can immediately be reflected.

The expendables to be collected can be grasped in advance.

The incentive to be given to the customer can flexibly be provided in accordance with the collected articles.

A more quick response to an expendable collection request from the requester to the collection center becomes possible.

Second Embodiment

The second embodiment will be described next. The basic arrangement of the second embodiment is the same as that of the first embodiment. For example, the arrangement shown in FIG. 1 and the processing procedures shown in FIGS. 3, 23, 24, and 26 to 31 are the same as in the first embodiment. However, the second embodiment is different from the first embodiment in how to give an incentive to a user, details of the procedures shown in FIGS. 24 and 27 are different. In addition, the second embodiment is different from the first embodiment also in the structures of user records (FIGS. 46A to 46E) held in the database.

The second embodiment will be described mainly about the points different from the first embodiment.

The structure of a user record held in a DB server 14 will be described first. FIG. 60A is a view of the user record in this embodiment. A customer number 6001 to average collection ratio 6007 are the same as in FIG. 46A. A pointer 6008 to the sales table indicates the sales table shown in FIG. 60B. A pointer 6009 to the collection table indicates the collection table shown in FIG. 60C. A pointer 601A to the other maker product table indicates the other maker product table shown in FIG. 60D.

Referring to FIG. 60B, a model 6011 of a sold expendable and a sales cumulative quantity 6012 of each model are recorded in a sales table 6010.

Referring to FIG. 60C, a model 6021 of a collected expendable, a valid quantity 6023 of each model, a recycled article quantity 6024 of each model, and a valid collection ratio 6014 are recorded in a collection table 6020. A valid quantity 6022 is the cumulative quantity of normal unrecycled products that are collected. The quantity 6023 of recycled articles are the cumulative quantity of collected recycled articles. The collection ratio 6024 is the collection ratio for each expendable. This value is stored in the collection table 6020 in step S86 in FIG. 27.

Referring to FIG. 60D, the quantity of collected other maker products is recorded for each type.

The sales table and collection table of this embodiment have no transaction date fields. That is, the sales or collection quantity is cumulatively recorded not for each date but for each model. In this embodiment, collection management of waste expendables and incentive giving are executed in the following way using the database.

(1) Confirmation of Incentive.

When a [confirm collection ratio and incentive] button 904 is selected through the window shown in FIG. 9, the following processing is executed in this embodiment.

Figure 51:
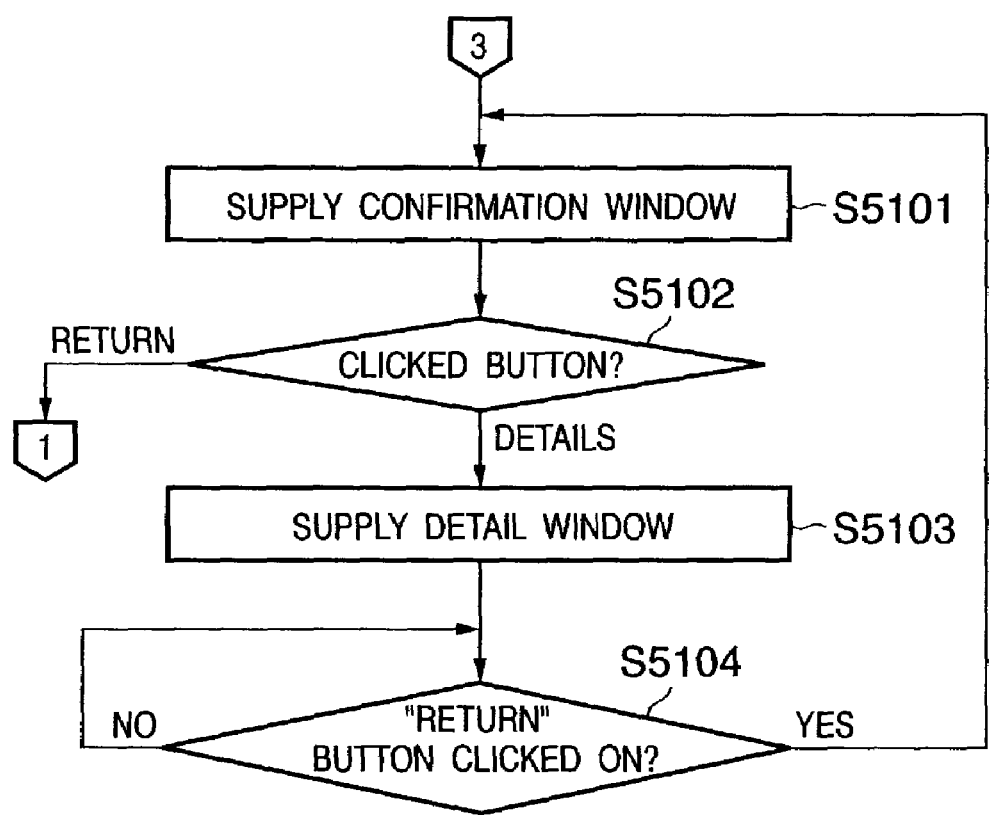
FIG. 51 is a flow chart for explaining the processing of the sales/collection system in the second embodiment.

Referring to FIG. 23, when a Web server 13 receives through a communication line information for instructing the [confirm collection ratio and incentive] via the window shown in FIG. 9, which is displayed on the display section of a customer terminal 6 ("confirm" in S2205), the flow branches to step S5101 in FIG. 51. FIG. 51 shows the procedure executed in this embodiment in place of FIG. 25 of the first embodiment.

Referring to FIG. 51, an AP server 15 supplies the confirmation window shown in FIG. 47 to a PC 24 through the Web server 13 (step S5101). In this window, an expendable collection ratio 4703 for the user in operation, a sales quantity 4704, a valid collection quantity 4705, a sum 4706 of the numbers of collected recycled articles and other maker products, and an incentive 4707 to be given to the user are displayed.

As the value of the collection ratio 4703, the value in an average collection ratio field 6007 of the user record shown in FIG. 60A is used. As the value of the sales quantity 4704, the sum for the entire table, which is stored in the quantity field 6012 of the sales table 6010, is used. As the value of the valid collection quantity 4705, the sum for the entire table, which is stored in the valid quantity field 6022 of the collection table 6020, is used. As the value of the sum 4706 of the numbers of collected recycled articles and other maker products, the sum of the value in a quantity field 6032 of the other maker product table and the number of recycled articles recorded in the collection table 6020 is used. The sum of the number of recycled articles recorded in the collection table 6020 is the sum of the values in the recycled article quantity field 6023 for the entire table. The value of the incentive 4707 is determined on the basis of the collection result/sales result for each user, which is managed by the database server 14, and the tables shown in FIGS. 33, 34, and 35 common to the first embodiment and in FIGS. 52, 53, 54, 55, and 56 unique to this embodiment. The tables used to determine the incentive from the collection result and the like will be described later in detail. Management of the collection result is realized by executing the processing procedures shown in FIGS. 27, 28, 29, 30, and 31 common to the first embodiment by the AP server 15. When the above-described mechanism is provided, the user can immediately grasp the collection situation and immediately be notified of the result of cooperation in collection.

When the user clicks on a [details] button 4701 on the window shown in FIG. 47, a signal indicating that is received by the Web server 13. Upon receiving the information from the Web server 13, the AP server 15 determines the type of clicked button (step S5102). As the determination result, when the AP server 15 recognizes that the [details] button is clicked on ("details" in step S5102), the AP server 15 supplies the information of the detailed window shown in FIG. 48 to the PC 24 through the Web server 13 (step S5103). The window shown in FIG. 48 is displayed on the PC 24.

Referring to FIG. 48, as the sales quantity, the value in the quantity field 6012 of the sales table 6010 is displayed. As the valid collection quantity, the value in the valid quantity field 6022 of the collection table 6020 is displayed. As the recycled article quantity, the value in the recycled article quantity field 6023 of the collection table 6020 is displayed. In addition, as the valid collection ratio, the value in the collection ratio field 6024 of the collection table 6020 is displayed. Note that the valid collection ratio can also be obtained from the valid quantity 6022 and the quantity 6012 in the sales table 6010. As the recycled article ratio, a value obtained by dividing the value in the recycled article field 6023 of the collection table 6020 by the sum of the value in the valid quantity field 6022 and the value in the recycled article field 6023 is displayed. As the incentive, a value obtained in accordance with the procedure to be described later is displayed.

"Average discount rate 1.5%" in FIG. 47 and the "incentive average value −1.5%" in FIG. 48 have the same meaning. That is, the negative sign in FIG. 48 means that a discount is given to the user as an incentive.

Referring to FIG. 47, when a [return] button 4702 is clicked on, the processing returns to step S2203 in FIG. 23, and the selection window shown in FIG. 9 is supplied to the PC 24 through the Web server 13 again. When a user 6 clicks on a [logout] button 905 that indicates the end of desired processing, the AP server 15 receives the instruction through the Web server 13 and execute logout processing (S2204).

As described above, the average collection ratio and incentive of the user are displayed on the confirmation window shown in FIG. 47. The collection ratio and incentive for each expendable for which the sales result of the user is present, and an average value obtained by totalizing data related to the individual expendables are displayed on the detail window shown in FIG. 48.

(2) Processing After Collection

Processing in the collection center system 4 after collection of expendables is also different from the first embodiment. At the time of collection, the processing procedure shown in FIG. 27 is executed, as in the first embodiment. In steps S81 to S86, the same processing as in the first embodiment is executed. Hence, the processing in FIGS. 28 and 29 is also common to the first embodiment. Processing from step S87 is different from the first embodiment, though as the flow chart, processing shown in FIG. 27 can also be applied to the second embodiment.

In this embodiment, after processing in step S86, the AP server 15 averages all the user's collection ratios for each type to calculate the average collection ratio of the user and store it in the DB server 14 (S87). The storage location is the average collection ratio field 6007 of the user record. If the average collection ratio exceeds a predetermined value a (YES in S88), the incentive is calculated using an incentive conversion table (to be described later) (S89). Even when the recycled article ratio and other maker product ratio exceed a predetermined value, the incentive is calculated using the incentive conversion table (to be described later) (S89). The user is notified of the calculated incentive by a means such as e-mail (S90-1). FIGS. 49 and 50 show incentive notification by e-mail. FIG. 49 shows a case wherein expendables of recycled articles or other maker products are included in the collected articles. FIG. 50 shows a case wherein collected articles include neither recycled articles nor other maker products.

A result obtained by totalizing the incentives for the respective valid collected articles shown in FIG. 48 is displayed in the column that notifies the user of the valid incentive in FIGS. 49 and 50. A result obtained by totalizing the incentives for the recycled articles and other maker products shown in FIG. 48 is displayed in the column that notifies the user of another incentive in FIGS. 49 and 50. A result obtained by totalizing all the incentives shown in FIG. 48 is displayed in the column that notifies the user of the latest incentive. A detailed incentive calculation method will be described later. Alternatively, the windows shown in FIGS. 47 and 48 may be displayed at the terminal 24 of the user.

Referring to FIGS. 49 and 50, the value calculated from the user record in the database is the value displayed in the row "sum/average". For the value displayed in the row "latest", the sales quantity, the total quantity of collected articles for only newly collected expendables, and the valid quantity thereof are calculated in the procedure in steps S81 to S86 in FIG. 27 and displayed.

[Calculation of Incentive]

In this embodiment, the incentive is given to the user as a discount rate corresponding to the collection ratio and the like.

FIG. 33 shows a table used to determine the discount rate from the type and collection ratio of expendables. FIG. 34 shows a table used to determine the discount rate from the type and sales quantity of expendables. FIG. 52 shows a table used to determine the discount rate from the type of collected expendables and the recycled article ratio for each type of expendables. FIG. 53 shows a table used to determine the discount rate from the type and ratio of collected other maker products.

These tables are stored in the DB server 14. To decrease the incentive for the user if unrecyclable articles such as recycled articles or other maker products are collected, predetermined values are set in the tables shown in FIGS. 52 and 53 to decrease the discount rate. For example, in FIG. 52, it is defined that the incentive should be decreased by 1% for any expendable if the recycled article ratio is 30% to 50%.

The AP server 15 obtains an incentive corresponding to the collection ratio, sales quantity, and recycled article ratio of each type of expendables by looking up the tables shown in FIGS. 33, 34, and 52 and an incentive corresponding to the other maker product ratio in all the collected articles by looking up the table shown in FIG. 53. These data are totalized to determine the discount rate to be provided to the user. The determined value is displayed on the confirmation window shown in FIG. 47 or 48. As described above, according to the system of this embodiment, different incentives can be determined in accordance with whether the type of collected waste expendables is a type to be recycled (appropriate type except articles not to be recycled) which is stored in the database in advance or a type not to be recycled (recycled articles or other maker products in this embodiment).

In addition, the AP server 15 can obtain a discount rate corresponding to the collection ratio, sales quantity, and recycled article ratio of each type of expendables and a discount rate corresponding to the other maker product ratio in all the collected articles by looking up the tables shown in FIGS. 33, 34, 52, and 53. These data are totalized to determine the discount rate for the user. Then, the data of the value of the discount rate to be displayed on the sales window shown in FIG. 7 is generated.

An example of discount rate calculation will be described below. However, the calculation scheme is not limited to this.

First, the collection quantities of CRG-A, CRG-, and other maker products shown in FIG. 33 are set to the following values.
(i) The number of valid collected articles of CRG-A is 50.
(ii) The number of recycled articles of CRG-A is 0.
(iii) The number of valid collected articles of CRG-B is 20.
(iv) The number of recycled articles of CRG-B is 20.
(v) The number of other maker products is 10.

Equations used to obtain these values are as follows.

Valid collection ratio for each type of expendables (%)=quantity of valid collected articles for each type÷(quantity of valid collected articles for each type+quantity of recycled articles for each type)

Recycled article ratio for each type of expendables (%)=quantity of recycled articles for each type÷(quantity of valid collected articles for each type+quantity of recycled articles for each type)

Other maker product ratio (%)=quantity of other maker products÷sum of quantities of all collected articles In the above equations, the quantity of valid collected articles for each type is given by the valid quantity field 6022 in the collection table 6020. The quantity of recycled articles for each type is given by the recycled article quantity field 6023. The quantity of other maker products is given by the quantity field 6032 in the other maker product table 6030 shown in FIG. 60D. The sum of quantities of all collected articles is given as a value obtained by adding, for the entire table, the valid quantity field 6022 and recycled article quantity field 6023 in the collection table 6020 and the quantity field 6032 in the other maker product table 6030.

When calculation is performed in accordance with the above equations, (i-1) the valid collection ratio of CRG-A is 100%, (ii-1) the recycled article ratio of CRG-A is 0%, (iii-1) the valid collection ratio of CRGB is 50%, (iv-1) the recycled article ratio of CRG-B is 50%, and (v-1) the other maker product ratio is 10%.

The discount rate for the thus obtained valid collection ratio for each type is acquired from FIG. 33. In addition, the discount rate for the recycled article ratio for each type is acquired from FIG. 52. Furthermore, the discount rate for the other maker product ratio for each type is acquired from FIG. 53. A weighted mean value of these values is obtained as the incentive. For the weighted mean, "discount rate for valid collection ratio"×"valid collection quantity" and "discount rate for recycled article collection ratio"×"recycled article quantity" are calculated for each type of collected expendables. These calculations are executed for all types of expendables. For other maker products as well, "discount rate for other maker products"×"quantity of other maker products" is calculated. All values obtained in the above way are added, and the sum is divided by the sum of quantities of collected expendables. The result corresponds to the discount rate to be given to the user as the incentive. The value of the incentive is recorded in an incentive field 600B in the user record.

A negative discount rate indicates a discount. For this reason, if the discount rate is obtained as a positive value, it means an extra charge. When a positive discount rate is obtained, the discount rate may be set to 0.

In the above-described example, when incentives for the valid collection ratios and recycled article ratios for CRG-A and CRG-B and the other maker product ratio are obtained from FIGS. 33, 52, and 53, (i-2) the incentive for the valid collection ratio of CRG-A is −3%, (ii-2) the incentive for the recycled article ratio of CRG-A is 0%, (iii-2) the incentive for the valid collection ratio of CRG-B is -1%, (iv-2) the incentive for the recycled article ratio of CRG-B is +1%, and (v-2) the incentive for the other maker product ratio is 0%.

When these incentive values are totalized in accordance with the following equation, the incentive to be provided to the user in this calculation example, i.e., −2.5% can be obtained. This value has the same meaning as that of the average discount rate of 2.5%.

Latest incentive to be provided to user at next transaction (%)=((i-2)×(i)+(ii-2)×(ii)+(iii-2)×(iii)+(iv-2)×(iv)+(v-2)×(v))÷sum of quantities of all collected articles=−0.025

In the above example, the incentive and discount rate are determined in accordance with the collection ratio and transaction scale (amount and quantity) during a predetermined period. However, the incentive and discount rate may be determined in accordance with not only the collection ratio and sales quantity but also the collection quantity, cumulative collection quantity, cumulative sales quantity, model to which expendables correspond, limited collection period, collection region, and the like. That is, the incentive and discount rate only needs to be determined such that a system capable of effectively collecting expendables can be built. For example, in the above-described promotion period that aims at increasing the collection ratio, the table as shown in FIG. 35, in which a large incentive is set, is used in place of the table shown in FIG. 33.

In the above-described example, a discount rate is calculated and presented as the incentive for the user. However, a point may be given as the incentive for the user in accordance with the above-described items such as the sales quantity and collection ratio. An example will be described below.

The tables shown in FIGS. 54, 55, and 56 are used in place of the tables shown in FIGS. 33, 52, and 53. Instead of discount rates, points are described in the columns of the tables. The method of searching the tables is the same as that for FIGS. 33, 52, and 53. A value obtained as a result of search is a point given per unit quantity. Hence, when the obtained point is multiplied by the quantity of type of expendables corresponding to the point, a point for each type is obtained. When the points for the respective points are totalized for all types of expendables, a point to be given to the user can be obtained. This point is recorded in the incentive field 600B in the user record.

The calculated point is converted into a corresponding amount using the table shown in FIG. 57. The amount can be applied to purchase merchandise or used in a form of cash back. During, e.g., a campaign period, the table shown in FIG. 58, in which a large incentive is set, is used in place of the table shown in FIG. 57. Alternatively, when accumulated points reach a predetermined value, one expendable may be presented to the user as a gift.

As described above, according to the expendable collection system of this embodiment, when a collection code recorded on a collection slip attached to collected expendables or a collection slip attached to a collection container is read, access to corresponding collection data can be facilitated.

Hence, data totalization at the collection center 4 which collects various kinds of expendables, i.e., calculation of collection ratio or average collection ratio for each user and each type is facilitated. In addition, an incentive can immediately be obtained from the obtained collection ratio by looking up the tables. For this reason, the operation efficiency at the collection center 4 can greatly be increased.

When the operation efficiency at the collection center 4 increases, the service for users can also be improved by, e.g., increasing the incentives.

When viewed from the user side, since the data totalization can be done in a short time, and the latest collection cooperation situation can immediately be grasped, the result of cooperation in collection is immediately reflected on the incentive. Hence, the users can be more cooperative, and an increase collection ratio can be expected.

In addition, any decrease in collection ratio can immediately be detected, and a measure against it can be taken. Hence, any decrease in collection ratio can be prevented. Especially, not only a decrease in collection ratio for all users or all expendables but also a decrease in collection ratio for each user and each type of expendables can be detected. Hence, the above-described measures can be taken for every case.

Since recycled articles or other maker products may generate a loss in the incentive, collection of unrecyclable articles can also be prevented.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying a storage medium (or recording medium) which records software program codes of procedures shown in FIGS. 22 to 30, which implement the functions of the above-described embodiments, to the system or apparatus and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, the storage medium stores program codes corresponding to the above-described sequence charts or flow charts.

As described above, according to the embodiments, since data totalization for collected expendables can appropriately be executed, a service which more satisfactorily reflects the collection result of expendables of each customer can be provided to each customer. For example, the service can flexibly be provided in accordance with the type of collected articles or the type of collection form.

In addition, since the user can immediately grasp the collection situation, the result of cooperation in collection can immediately be reflected.

Furthermore, since expendables to be collected can be grasped in advance, the recycle activity can more efficiently be done by using, e.g., the system to make a recycle plan in advance.

Also, more quick response to an expendable collection request from the requester to the collection center becomes possible.

In addition, inappropriate collection from the user can be prevented, and a service for the collection request can be efficiently provided to the user.

As many apparently widely different embodiments of the present invention can be made without departing from the spirit and scope thereof, it is to be understood that the invention is not limited to the specific embodiments thereof except as defined in the appended claims.

What is claimed is:

1. A computer system for managing collection information of waste expendables used in an office device, comprising:
  a providing unit for providing collection request window information which causes a terminal apparatus that communicates with the providing unit through a predetermined communication line to display a collection request window for designating waste expendables to be collected and for designating a collection method for collecting the waste expendables from among a plurality of collection methods, including a lump-sum collection of the waste expendables and an individual collection of the waste expendables;
  an issue unit for issuing identification information based on collection request information indicative of a user and a collection method input indicative of a collection method as the lump-sum collection or the individual collection through the collection request window provided by said providing unit;
  an input unit for inputting identification information read from an identification attached to collected articles or a container which is capable of storing a predetermined number of the waste expendables, the identification information read being based on the identification information issued by the issuing unit;
  an incentive determination unit for determining an incentive in accordance with the identification information input by said input unit, wherein an incentive corresponding to the lump-sum collection and an incentive corresponding to the individual collection are different from each other even if the same quantities of the waste expendables are entered by the user through the collection request window for the collection method and collected; and
  a storing unit for storing the incentive determined in a collection history in a database associated with the user.

2. The computer system according to claim 1, further comprising:
  a specifying unit for specifying the user who has logged into said system, and
  a control unit for causing the terminal apparatus to display with a priority a lump-sum collection request window to request lump-sum collection of the waste expendables, on the basis of the user specified by said specifying unit.

3. The computer system according to claim 1, wherein said incentive determination unit further determines the incentive in accordance with whether a type of the collected waste expendables is a type to be recycled, which is stored in the database in advance, or a type not to be recycled.

4. The computer system according to claim 1, further comprising a writing unit for writing the collection history in the database in association with the user in accordance with the identification information input by the input unit, said collection history being indicative of the collection method corresponding to the identification information input by the input unit.

5. The computer system according to claim 1, further comprising an output control unit for controlling output of the incentive determined by said incentive determination unit.

6. A method of managing a computer system for collection information of waste expendables used in an office device, comprising:
  a providing step of a providing unit providing collection request window information which causes a terminal apparatus that communicates through a predetermined communication line with the providing unit to display a collection request window for designating waste expendables to be collected and for designating a collection method for collecting the waste expendables from among a plurality of collection methods, including a lump-sum collection of the waste expendables and an individual collection of the waste expendables;
  an issue step of issuing identification information based on collection request information indicative of a user and a collection method input indicative of a collection method as the lump-sum collection or the individual collection through the collection request window provided by said providing step;
  an input step of inputting identification information read from an identification attached to collected articles or a container which is capable of storing a predetermined number of the waste expendables, the identification information read being based on the identification information issued in the issue step;
  an incentive determination step of determining an incentive in accordance with the information input by said input step, wherein an incentive corresponding to the lump-sum collection and an incentive corresponding to the individual collection are different from each other even if the same quantities of the waste expendables are entered by the user through the collection request window for the collection method and collected; and a storing step of storing the incentive determined in a collection history in a database associated with the user.

7. The method according to claim 6, further comprising:
a specifying step of specifying the user who has logged into said system, and
a control step of causing the terminal apparatus to display with a priority a lump-sum collection request window to request lump-sum collection of the waste expendables, on the basis of the user specified in the specifying step.

8. The method according to claim 6, wherein in the incentive determination step, the incentive is further determined in accordance with whether a type of the collected waste expendables is a type to be recycled, which is stored in the database in advance, or a type not to be recycled.

9. The method according to claim 6, further comprising a writing unit for writing the collection history in the database in association with the user in accordance with the identification information input by the input unit, said collection history being indicative of the collection method corresponding to the identification information input by the input step.

10. The method according to claim 6, further comprising an output control step for controlling to output of the incentive determined by said incentive determination step.

11. A computer-executable program stored on a computer-readable storage medium, the program for causing a computer to manage a computer system for collection of waste expendables used in an office device, the program comprising the steps of:

a providing step of a providing unit providing collection request window information which causes a terminal apparatus that communicates through a predetermined communication line with the providing unit to display a collection request window for designating waste expendables to be collected and for designating a collection method for collecting the waste expendables from among a plurality of collection methods, including a lump-sum collection of the waste expendables and an individual collection of the waste expendables;

an issue step of issuing identification information based on collection request information indicative of a user and a collection method input indicative of a collection method as the lump-sum collection or the individual collection through the collection request window provided by said providing step;

an input step of inputting identification information read from an identification attached to collected articles or a container which is capable of storing a predetermined number of the waste expendables, the identification information read being based on the identification information issued in the issue step;

an incentive determination step of determining an incentive in accordance with the information input by said input step, wherein an incentive corresponding to the lump-sum collection and an incentive corresponding to the individual collection are different from each other even if the same quantities of the waste expendables are entered by the user through the collection request window for the collection method and collected; and a storing step of storing the incentive determined in a collection history in a database associated with the user.

12. The computer-executable program according to claim 11, further comprising a writing unit for writing the collection history in the database in association with the user in accordance with the identification information input by the input unit, said collection history being indicative of the collection method corresponding to the identification information input by the input step.

13. The computer-executable program according to claim 11, further comprising an output control step for controlling to output of the incentive determined by said incentive determination step.

* * * * *

UNITED STATES PATENT AND TRADEMARK OFFICE
CERTIFICATE OF CORRECTION

| | |
|---|---|
| PATENT NO. | : 7,313,602 B2 |
| APPLICATION NO. | : 10/278871 |
| DATED | : December 25, 2007 |
| INVENTOR(S) | : Ono et al. |

It is certified that error appears in the above-identified patent and that said Letters Patent is hereby corrected as shown below:

COLUMN 2:
    Line 2, "comprises" should read -- comprises: --.

COLUMN 3:
    Line 50, "of" should read -- of an --.

COLUMN 5:
    Line 4, "recycles" should read -- recycled --; and
    Line 22, "article" should read -- articles --.

COLUMN 14:
    Line 63, "indicate" should read -- indicates --.

COLUMN 19:
    Line 18, "window" should read -- windows --;
    Line 34, "window" should read -- windows --;
    Line 48, "window" should read -- windows --; and
    Line 63, "window" should read -- windows --.

COLUMN 21:
    Line 34, "to" should be deleted.

COLUMN 22:
    Line 40, "followings" should read -- following --.

COLUMN 23:
    Line 10, "followings" should read -- following --.

UNITED STATES PATENT AND TRADEMARK OFFICE
CERTIFICATE OF CORRECTION

PATENT NO. : 7,313,602 B2
APPLICATION NO. : 10/278871
DATED : December 25, 2007
INVENTOR(S) : Ono et al.

It is certified that error appears in the above-identified patent and that said Letters Patent is hereby corrected as shown below:

COLUMN 33:
    Line 8, "read" should read -- reads --.

COLUMN 39:
    Line 2, "CRGB" should read -- CRG-B --.

COLUMN 42:
    Line 18, "system, and" should read -- system; and --.

COLUMN 43:
    Line 10, "system, and" should read -- system; and --.

Signed and Sealed this

Twenty-ninth Day of July, 2008

JON W. DUDAS
*Director of the United States Patent and Trademark Office*